United States Patent
Liu et al.

(10) Patent No.: US 9,890,909 B2
(45) Date of Patent: *Feb. 13, 2018

(54) LED TUBE LAMP

(71) Applicant: JIAXING SUPER LIGHTING ELECTRIC APPLIANCE CO., LTD, Jiaxing (CN)

(72) Inventors: Xintong Liu, Jiaxing (CN); Tao Jiang, Jiaxing (CN); Aiming Xiong, Jiaxing (CN); Liqin Li, Jiaxing (CN)

(73) Assignee: Jiaxing Super Lighting Electric Appliance Co., Ltd., Xiuzhou Area, Jiaxing, Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,272

(22) Filed: Oct. 20, 2016

(65) Prior Publication Data

US 2017/0038013 A1 Feb. 9, 2017

Related U.S. Application Data

(63) Continuation of application No. 15/066,645, filed on Mar. 10, 2016, now Pat. No. 9,497,821, which is a
(Continued)

(30) Foreign Application Priority Data

Sep. 28, 2014 (CN) .......................... 2014 1 0507660
Sep. 28, 2014 (CN) .......................... 2014 1 0508899
(Continued)

(51) Int. Cl.
H05B 37/00 (2006.01)
H05B 39/00 (2006.01)
(Continued)

(52) U.S. Cl.
CPC ................ *F21K 9/278* (2016.08); *F21K 9/27* (2016.08); *F21K 9/272* (2016.08); *F21V 23/009* (2013.01);
(Continued)

(58) Field of Classification Search
None
See application file for complete search history.

(56) References Cited

U.S. PATENT DOCUMENTS 2,454,049 A    11/1948  Floyd, Jr.
3,294,518 A    12/1966  Laseck
(Continued)

FOREIGN PATENT DOCUMENTS

CN    201014273 Y    1/2008
CN    201437921      4/2010
(Continued)

*Primary Examiner* — Anh Tran
(74) *Attorney, Agent, or Firm* — Muir Patent Law, PLLC

(57) ABSTRACT

An LED tube lamp is provided herein, which implements the safety function for protecting the user from electric shock since it conducts only when both ends thereof have been correctly installed into a lamp socket. The LED tube lamp includes an installation detection module configured in the LED tube lamp to detect an installation state between the LED tube lamp and the lamp socket. The installation detection module includes: a detection pulse generating module, configured to generate a first pulse signal; a detection result latching circuit, configured to receive and output the first pulse signal; a switch circuit, configured to receive the first pulse signal from the detection result latching circuit, and configured to maintain a conductive state of the switch circuit during the first pulse to cause a power loop of the LED tube lamp to be conductive; and a detection determining circuit, configured to detect a first sampling signal on the
(Continued)

US 9,890,909 B2

Page 2 power loop so as to determine the installation state between the LED tube lamp and the lamp socket.

33 Claims, 37 Drawing Sheets

Related U.S. Application Data continuation-in-part of application No. 14/865,387, filed on Sep. 25, 2015, now Pat. No. 9,609,711.

(30) Foreign Application Priority Data

| Nov. 6, 2014 | (CN) | ................ 2014 1 0623355 |
|---|---|---|
| Dec. 5, 2014 | (CN) | ................ 2014 1 0734425 |
| Feb. 12, 2015 | (CN) | ................ 2015 1 0075925 |
| Mar. 10, 2015 | (CN) | ................ 2015 1 0104823 |
| Mar. 25, 2015 | (CN) | ................ 2015 1 0133689 |
| Mar. 26, 2015 | (CN) | ................ 2015 1 0134586 |
| Mar. 27, 2015 | (CN) | ................ 2015 1 0136796 |
| Apr. 3, 2015 | (CN) | ................ 2015 1 0155807 |
| Apr. 14, 2015 | (CN) | ................ 2015 1 0173861 |
| Apr. 22, 2015 | (CN) | ................ 2015 1 0193980 |
| May 19, 2015 | (CN) | ................ 2015 1 0259151 |
| May 22, 2015 | (CN) | ................ 2015 1 0268927 |
| May 29, 2015 | (CN) | ................ 2015 1 0284720 |
| Jun. 10, 2015 | (CN) | ................ 2015 1 0315636 |
| Jun. 17, 2015 | (CN) | ................ 2015 1 0338027 |
| Jun. 26, 2015 | (CN) | ................ 2015 1 0364735 |
| Jun. 26, 2015 | (CN) | ................ 2015 1 0372375 |
| Jun. 26, 2015 | (CN) | ................ 2015 1 0373492 |
| Jun. 29, 2015 | (CN) | ................ 2015 1 0378322 |
| Jul. 2, 2015 | (CN) | ................ 2015 1 0391910 |
| Jul. 10, 2015 | (CN) | ................ 2015 1 0406595 |
| Jul. 20, 2015 | (CN) | ................ 2015 1 0428680 |
| Jul. 27, 2015 | (CN) | ................ 2015 1 0448220 |
| Aug. 7, 2015 | (CN) | ................ 2015 1 0482944 |
| Aug. 8, 2015 | (CN) | ................ 2015 1 0483475 |
| Aug. 8, 2015 | (CN) | ................ 2015 1 0486115 |
| Aug. 14, 2015 | (CN) | ................ 2015 0 499512 |
| Aug. 26, 2015 | (CN) | ................ 2015 1 0530110 |
| Sep. 2, 2015 | (CN) | ................ 2015 1 0555543 |
| Sep. 6, 2015 | (CN) | ................ 2015 1 0557717 |
| Sep. 18, 2015 | (CN) | ................ 2015 1 0595173 |
| Oct. 8, 2015 | (CN) | ................ 2015 1 0645134 |
| Oct. 20, 2015 | (CN) | ................ 2015 1 0680883 |

(51) Int. Cl.

| H05B 41/14 | (2006.01) |
|---|---|
| F21K 9/278 | (2016.01) |
| H05B 33/08 | (2006.01) |
| F21V 23/00 | (2015.01) |
| F21V 29/83 | (2015.01) |
| F21K 9/27 | (2016.01) |
| F21V 23/02 | (2006.01) |
| F21K 9/272 | (2016.01) |
| F21V 25/04 | (2006.01) |
| F21Y 103/10 | (2016.01) |
| F21Y 115/10 | (2016.01) |
| F21Y 101/00 | (2016.01) |

(52) U.S. Cl.

CPC .............. *F21V 23/02* (2013.01); *F21V 25/04* (2013.01); *F21V 29/83* (2015.01); *H05B 33/0809* (2013.01); *H05B 33/0884* (2013.01); *F21Y 2101/00* (2013.01); *F21Y 2103/10* (2016.08); *F21Y 2115/10* (2016.08); *H05B 33/0803* (2013.01); *Y02B 20/341* (2013.01)

(56) References Cited

U.S. PATENT DOCUMENTS

| 4,156,265 | A | 5/1979 | Rose |
|---|---|---|---|
| 4,647,399 | A | 3/1987 | Peters et al. |
| 5,575,459 | A | 11/1996 | Anderson |
| 5,921,660 | A | 7/1999 | Yu |
| 6,118,072 | A | 9/2000 | Scott |
| 6,127,783 | A | 10/2000 | Pashley |
| 6,186,649 | B1 | 2/2001 | Zou et al. |
| 6,211,262 | B1 | 4/2001 | Mejiritski et al. |
| 6,609,813 | B1 | 8/2003 | Showers |
| 6,796,680 | B1 | 9/2004 | Showers |
| 6,860,628 | B2 | 3/2005 | Robertson et al. |
| 6,936,855 | B1 | 8/2005 | Harrah et al. |
| 7,033,239 | B2 | 4/2006 | Cunkelman |
| 7,067,032 | B1 | 6/2006 | Bremont et al. |
| 7,594,738 | B1 | 9/2009 | Lin et al. |
| 8,360,599 | B2 | 1/2013 | Ivey |
| 8,456,075 | B2 | 6/2013 | Axelsson |
| 8,579,463 | B2 | 11/2013 | Clough |
| D761,216 | S | 7/2016 | Jiang |
| 9,447,929 | B2 | 9/2016 | Jiang |
| D768,891 | S | 10/2016 | Jiang et al. |
| 9,625,137 | B2* | 4/2017 | Li ................ F21V 23/002 |
| 2002/0044456 | A1 | 4/2002 | Balestriero |
| 2003/0189829 | A1 | 10/2003 | Shimizu et al. |
| 2003/0231485 | A1 | 12/2003 | Chien |
| 2004/0095078 | A1 | 5/2004 | Leong |
| 2004/0189218 | A1 | 9/2004 | Leong |
| 2005/0128751 | A1 | 6/2005 | Roberge |
| 2005/0162850 | A1 | 7/2005 | Luk |
| 2005/0168123 | A1 | 8/2005 | Taniwa |
| 2005/0185396 | A1 | 8/2005 | Kutler |
| 2005/0207166 | A1 | 9/2005 | Kan |
| 2005/0213321 | A1 | 9/2005 | Lin |
| 2006/0028837 | A1 | 2/2006 | Mrakovich et al. |
| 2007/0001709 | A1 | 1/2007 | Shen |
| 2007/0145915 | A1 | 6/2007 | Roberge |
| 2007/0210687 | A1 | 9/2007 | Axelsson |
| 2007/0274084 | A1 | 11/2007 | Kan |
| 2008/0030981 | A1 | 2/2008 | Mrakovich |
| 2008/0192476 | A1 | 8/2008 | Hiratsuka |
| 2008/0278941 | A1 | 11/2008 | Logan |
| 2008/0290814 | A1 | 11/2008 | Leong et al. |
| 2009/0140271 | A1 | 6/2009 | Sah |
| 2009/0159919 | A1 | 6/2009 | Simon et al. |
| 2009/0161359 | A1 | 6/2009 | Siemiet |
| 2010/0085772 | A1 | 4/2010 | Song et al. |
| 2010/0124054 | A1* | 5/2010 | Chen ................ F21K 9/00 362/221 |
| 2010/0177532 | A1 | 7/2010 | Simon et al. |
| 2010/0201269 | A1* | 8/2010 | Tzou ................ F21V 23/006 315/51 |
| 2010/0220469 | A1 | 9/2010 | Ivey et al. |
| 2010/0253226 | A1 | 10/2010 | Oki |
| 2010/0277918 | A1 | 11/2010 | Chen et al. |
| 2011/0038146 | A1 | 2/2011 | Chen |
| 2011/0057572 | A1 | 3/2011 | Kit et al. |
| 2011/0090684 | A1 | 4/2011 | Logan |
| 2011/0216538 | A1 | 9/2011 | Logan |
| 2012/0049684 | A1 | 3/2012 | Bodenstein et al. |
| 2012/0069556 | A1* | 3/2012 | Bertram ................ F21V 23/02 362/217.14 |
| 2012/0106157 | A1 | 5/2012 | Simon |
| 2012/0146503 | A1 | 6/2012 | Negley et al. |
| 2012/0153873 | A1 | 6/2012 | Hayashi |
| 2012/0169968 | A1 | 7/2012 | Ishimori et al. |
| 2012/0253226 | A1 | 10/2012 | Chun-Ming et al. |
| 2012/0293991 | A1 | 11/2012 | Lin |
| 2012/0319150 | A1 | 12/2012 | Shimomura et al. |
| 2013/0021809 | A1 | 1/2013 | Dellian et al. |
| 2013/0033881 | A1 | 2/2013 | Terazawa et al. |
| 2013/0033888 | A1 | 2/2013 | Wel et al. |

(56) References Cited

U.S. PATENT DOCUMENTS

| | | |
|---|---|---|
| 2013/0050998 A1 | 2/2013 | Chu et al. |
| 2013/0069538 A1 | 3/2013 | So |
| 2013/0094200 A1 | 4/2013 | Dellian et al. |
| 2013/0135852 A1 | 5/2013 | Chan |
| 2013/0170196 A1 | 7/2013 | Huang et al. |
| 2013/0170245 A1 | 7/2013 | Hong |
| 2013/0182425 A1 | 7/2013 | Seki |
| 2013/0215609 A1* | 8/2013 | Liu ............... F21K 9/27 362/223 |
| 2013/0250565 A1 | 9/2013 | Chiang et al. |
| 2013/0256704 A1 | 10/2013 | Hsiao et al. |
| 2013/0258650 A1 | 10/2013 | Sharrah |
| 2013/0293098 A1 | 11/2013 | Li et al. |
| 2014/0071667 A1 | 3/2014 | Hayashi |
| 2014/0153231 A1 | 6/2014 | Bittmann |
| 2014/0203717 A1* | 7/2014 | Zhang ............ H05B 33/0809 315/188 |
| 2014/0225519 A1* | 8/2014 | Yu ............... H05B 33/0809 315/187 |
| 2014/0226320 A1 | 8/2014 | Halliwell |
| 2015/0009688 A1 | 1/2015 | Timmermans |
| 2015/0176770 A1 | 6/2015 | Wilcox et al. |
| 2015/0327368 A1 | 11/2015 | Su |
| 2016/0091147 A1 | 3/2016 | Jiang et al. |
| 2016/0091156 A1 | 3/2016 | Li et al. |
| 2016/0091179 A1 | 3/2016 | Jiang et al. |
| 2016/0102813 A1 | 4/2016 | Ye et al. |
| 2016/0178135 A1 | 6/2016 | Xu et al. |
| 2016/0178137 A1 | 6/2016 | Jiang et al. |
| 2016/0178138 A1 | 6/2016 | Jiang |
| 2016/0198535 A1 | 7/2016 | Ye et al. |
| 2016/0212809 A1 | 7/2016 | Xiong et al. |
| 2016/0215936 A1 | 7/2016 | Jiang |
| 2016/0215937 A1 | 7/2016 | Jiang |
| 2016/0219658 A1 | 7/2016 | Xiong et al. |
| 2016/0219666 A1 | 7/2016 | Xiong et al. |
| 2016/0219672 A1 | 7/2016 | Liu |
| 2016/0223180 A1 | 8/2016 | Jiang |
| 2016/0223182 A1 | 8/2016 | Jiang |
| 2016/0229621 A1 | 8/2016 | Jiang et al. |
| 2016/0255694 A1 | 9/2016 | Jiang et al. |
| 2016/0255699 A1 | 9/2016 | Ye et al. |
| 2016/0270163 A1 | 9/2016 | Hu et al. |
| 2016/0270164 A1 | 9/2016 | Xiong et al. |
| 2016/0270165 A1 | 9/2016 | Xiong et al. |
| 2016/0270166 A1 | 9/2016 | Xiong et al. |
| 2016/0270173 A1 | 9/2016 | Xiong |
| 2016/0270184 A1 | 9/2016 | Xiong et al. |
| 2016/0290566 A1 | 10/2016 | Jiang et al. |
| 2016/0290567 A1 | 10/2016 | Jiang et al. |
| 2016/0290568 A1 | 10/2016 | Jiang et al. |
| 2016/0290569 A1 | 10/2016 | Jiang et al. |
| 2016/0290570 A1 | 10/2016 | Jiang et al. |
| 2016/0290598 A1 | 10/2016 | Jiang |
| 2016/0290609 A1 | 10/2016 | Jiang et al. |
| 2016/0295706 A1 | 10/2016 | Jiang |
| 2016/0309550 A1 | 10/2016 | Xiong et al. |
| 2016/0323948 A1 | 11/2016 | Xiong et al. |
| 2016/0341414 A1 | 11/2016 | Jiang |
| 2016/0356472 A1 | 12/2016 | Liu et al. |
| 2016/0363267 A1 | 12/2016 | Jiang et al. |
| 2016/0381746 A1 | 12/2016 | Ye et al. |
| 2016/0381760 A1 | 12/2016 | Xiong et al. |
| 2017/0001793 A1 | 1/2017 | Jiang et al. |
| 2017/0038012 A1 | 2/2017 | Jiang et al. |
| 2017/0038013 A1 | 2/2017 | Liu et al. |
| 2017/0038014 A1 | 2/2017 | Jiang et al. |
| 2017/0089521 A1 | 3/2017 | Jiang |
| 2017/0089530 A1 | 3/2017 | Jiang |
| 2017/0130911 A1 | 5/2017 | Li et al. |
| 2017/0159894 A1 | 6/2017 | Jiang |
| 2017/0167664 A1 | 6/2017 | Li et al. |

FOREIGN PATENT DOCUMENTS

| | | |
|---|---|---|
| CN | 102052652 | 5/2011 |
| CN | 102116460 | 7/2011 |
| CN | 102121578 | 7/2011 |
| CN | 202125774 | 1/2012 |
| CN | 102518972 | 6/2012 |
| CN | 102720901 | 10/2012 |
| CN | 102777788 | 11/2012 |
| CN | 102889446 | 1/2013 |
| CN | 202791824 U | 3/2013 |
| CN | 203240337 | 10/2013 |
| CN | 203240337 U | 10/2013 |
| CN | 203363984 | 12/2013 |
| CN | 203384716 U | 1/2014 |
| CN | 203413396 U | 1/2014 |
| CN | 203453866 U | 2/2014 |
| CN | 103742875 | 4/2014 |
| CN | 203585876 U | 5/2014 |
| CN | 203615157 | 5/2014 |
| CN | 103851547 | 6/2014 |
| CN | 203771102 | 8/2014 |
| CN | 104033772 | 9/2014 |
| CN | 203927469 | 11/2014 |
| CN | 203963553 U | 11/2014 |
| CN | 204042527 | 12/2014 |
| CN | 204201535 U | 3/2015 |
| CN | 204268162 | 4/2015 |
| CN | 204300737 | 4/2015 |
| CN | 104595765 | 5/2015 |
| CN | 204420636 | 6/2015 |
| CN | 104776332 | 7/2015 |
| CN | 104832813 A | 8/2015 |
| CN | 204573639 | 8/2015 |
| GB | 2523275 | 8/2015 |
| JP | 2008117666 | 5/2008 |
| JP | 2011061056 | 3/2011 |
| JP | 2014154479 | 8/2014 |
| KR | 20120000551 | 1/2012 |
| WO | WO2011/132120 | 10/2011 |
| WO | WO2013/125803 | 8/2013 |
| WO | WO2014/001475 | 1/2014 |
| WO | WO2014/118754 | 8/2014 |
| WO | WO2014117435 | 8/2014 |
| WO | WO2015/036478 | 3/2015 |
| WO | WO2015081809 | 6/2015 |
| WO | WO2016086901 | 6/2016 |

* cited by examiner

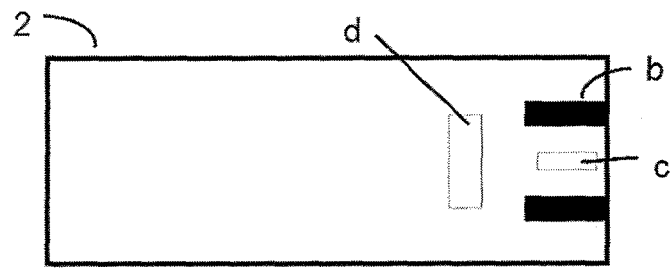
Fig. 9
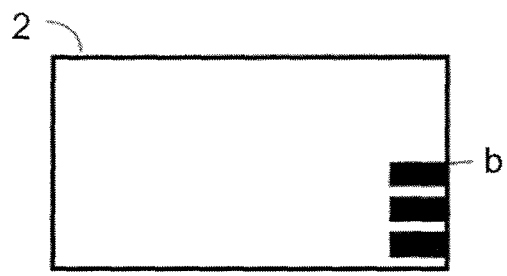 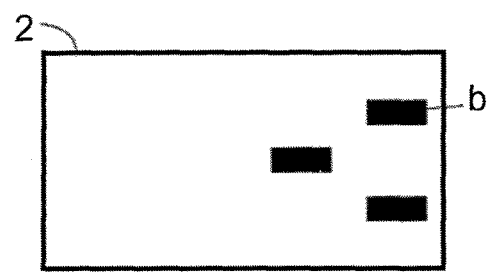
Fig. 10          Fig. 11
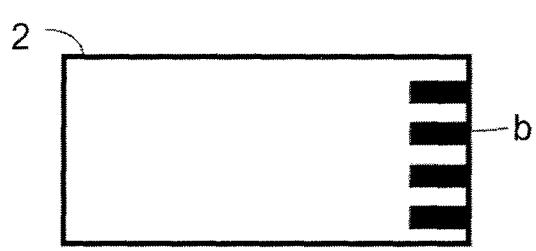 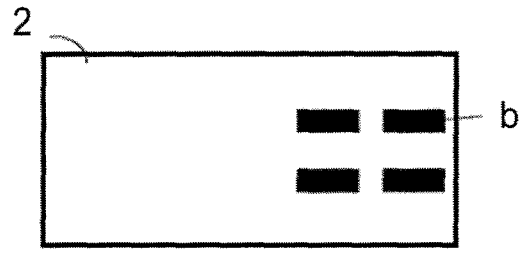
Fig. 12          Fig. 13
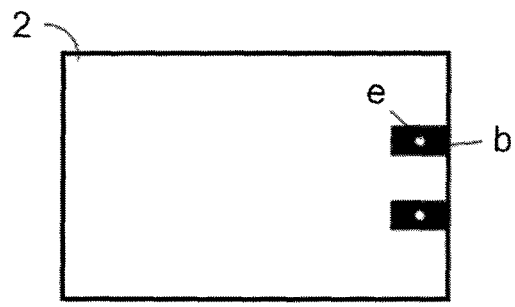
Fig. 14

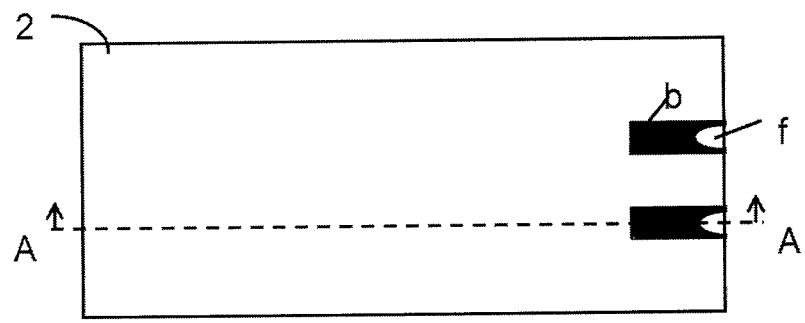
Fig. 17
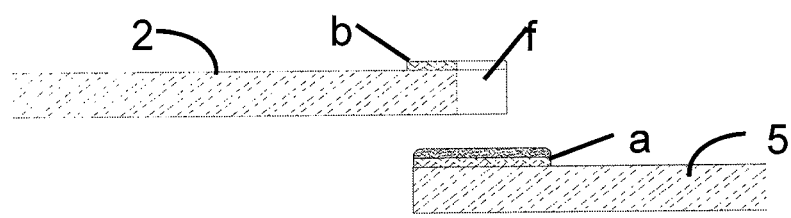
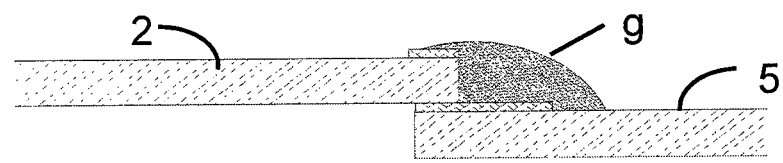
Fig. 18

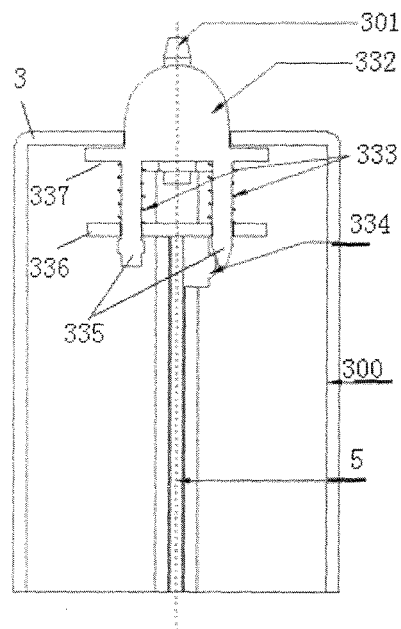
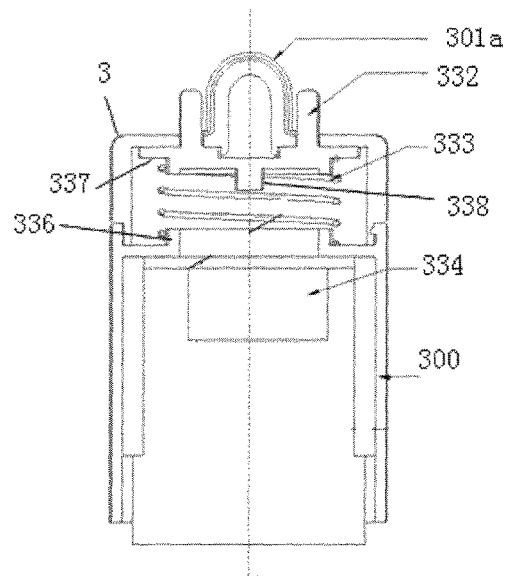
Fig. 40A  Fig. 40B
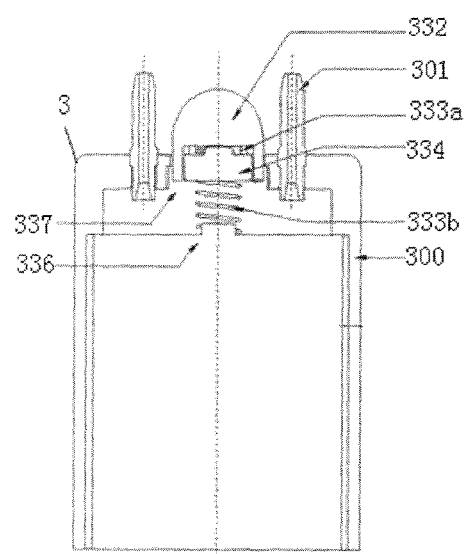
Fig. 40C

LED TUBE LAMP

CROSS-REFERENCE TO RELATED APPLICATIONS

This application is a Continuation application of U.S. patent application Ser. No. 15/066,645, filed on Mar. 10, 2016, the disclosure of which is incorporated in its entirety by reference herein, which is a Continuation-In-Part application of U.S. patent application Ser. No. 14/865,387, filed Sep. 25, 2015, the disclosure of which is incorporated in its entirety herein, which claims priority under 35 U.S.C. 119(e) to Chinese Patent Applications No. CN 201410507660.9 filed on 2014 Sep. 28; CN 201410508899.8 filed on 2014 Sep. 28; CN 201410623355.6 filed on 2014 Nov. 6; CN 201410734425.5 filed on 2014 Dec. 5; CN 201510075925.7 filed on 2015 Feb. 12; No. CN 201510104823.3 filed on 2015 Mar. 10; CN 201510134586.5 filed on 2015 Mar. 26; CN 201510133689.x filed on 2015 Mar. 25; CN 201510136796.8 filed on 2015 Mar. 27; CN 201510155807.7 filed on 2015 Apr. 3; CN 201510173861.4 filed on 2015 Apr. 14; CN 201510193980.6 filed on 2015 Apr. 22; CN 201510372375.5 filed on 2015 Jun. 26; CN 201510259151.3 filed on 2015 May 19; CN 201510268927.8 filed on 2015 May 22; CN 201510284720.x filed on 2015 May 29; CN 201510338027.6 filed on 2015 Jun. 17; CN 201510315636.x filed on 2015 Jun. 10; CN 201510373492.3 filed on 2015 Jun. 26; CN 201510364735.7 filed on 2015 Jun. 26; CN 201510378322.4 filed on 2015 Jun. 29; CN 201510391910.1 filed on 2015 Jul. 2; CN 201510406595.5 filed on 2015 Jul. 10; CN 201510482944.1 filed on 2015 Aug. 7; CN 201510486115.0 filed on 2015 Aug. 8; CN 201510428680.1 filed on 2015 Jul. 20; CN 201510483475.5 filed on 2015 Aug. 8; CN 201510555543.4 filed on 2015 Sep. 2; CN 201510557717.0 filed on 2015 Sep. 6; CN 201510595173.7 filed on 2015 Sep. 18, the disclosures of which are incorporated herein in their entirety by reference. This application also claims priority under 35 U.S.C. 119(e) to Chinese Patent Applications no.: CN 201510530110.3 filed on 2015 Aug. 26; CN 201510499512.1 filed on 2015 Aug. 14; CN 201510448220.5 filed on 2015 Jul. 27; CN 201510645134.3 filed on 2015 Oct. 8; and CN 201510680883.x filed on 2015 Oct. 20, the disclosures of which are incorporated herein in their entirety by reference.

If any terms in this application conflict with terms used in any application(s) to which this application claims priority, or terms incorporated by reference into this application or the application(s) to which this application claims priority, a construction based on the terms as used or defined in this application should be applied.

FIELD OF THE INVENTION

The present disclosure relates to illumination devices, and more particularly to an LED tube lamp and its components including the light sources, electronic components, and end caps.

BACKGROUND

LED lighting technology is rapidly developing to replace traditional incandescent and fluorescent lightings. LED tube lamps are mercury-free in comparison with fluorescent tube lamps that need to be filled with inert gas and mercury. Thus, it is not surprising that LED tube lamps are becoming a highly desired illumination option among different available lighting systems used in homes and workplaces, which used to be dominated by traditional lighting options such as compact fluorescent light bulbs (CFLs) and fluorescent tube lamps. Benefits of LED tube lamps include improved durability and longevity and far less energy consumption; therefore, when taking into account all factors, they would typically be considered as a cost effective lighting option.

Typical LED tube lamps have a lamp tube, a circuit board disposed inside the lamp tube with light sources being mounted on the circuit board, and end caps accompanying a power supply provided at two ends of the lamp tube with the electricity from the power supply transmitting to the light sources through the circuit board. However, existing LED tube lamps have certain drawbacks. For example, the typical circuit board is rigid and allows the entire lamp tube to maintain a straight tube configuration when the lamp tube is partially ruptured or broken, and this gives the user a false impression that the LED tube lamp remains usable and is likely to cause the user to be electrically shocked upon handling or installation of the LED tube lamp.

Further, circuit design of current LED tube lamps mostly doesn't provide suitable solutions for complying with relevant certification standards and for better compatibility with the driving structure using an electronic ballast originally for a fluorescent lamp. For example, since there are usually no electronic components in a fluorescent lamp, it's fairly easy for a fluorescent lamp to be certified under EMI (electromagnetic interference) standards and safety standards for lighting equipment as provided by Underwriters Laboratories (UL). However, there are a considerable number of electronic components in an LED tube lamp, and therefore consideration of the impacts caused by the layout (structure) of the electronic components is important, resulting in difficulties in complying with such standards.

Common main types of electronic ballast include instant-start ballast and program-start ballast. Electronic ballast typically includes a resonant circuit and is designed to match the loading characteristics of a fluorescent lamp in driving the fluorescent lamp. For example, for properly starting a fluorescent lamp, the electronic ballast provides driving methods respectively corresponding to the fluorescent lamp working as a capacitive device before emitting light, and working as a resistive device upon emitting light. But an LED is a nonlinear component with significantly different characteristics from a fluorescent lamp. Therefore, using an LED tube lamp with an electronic ballast impacts the resonant circuit design of the electronic ballast, which may cause a compatibility problem. Generally, a program-start ballast will detect the presence of a filament in a fluorescent lamp, but traditional LED driving circuits cannot support the detection and may cause a failure of the filament detection and thus failure of the starting of the LED tube lamp. Further, electronic ballast is in effect a current source, and when it acts as a power supply of a DC-to-DC converter circuit in an LED tube lamp, problems of overvoltage and overcurrent or undervoltage and undercurrent are likely to occur, resulting in damaging of electronic components in the LED tube lamp or unstable provision of lighting by the LED tube lamp.

Further, the driving of an LED uses a DC driving signal, but the driving signal for a fluorescent lamp is a low-frequency, low-voltage AC signal as provided by an AC powerline, a high-frequency, high-voltage AC signal provided by a ballast, or even a DC signal provided by a battery for emergency lighting applications. Since the voltages and frequency spectrums of these types of signals differ significantly, simply performing a rectification to produce the required DC driving signal in an LED tube lamp may not achieve the LED tube lamp's compatibility with traditional driving systems of a fluorescent lamp.

Moreover, when an LED tube lamp has an architecture with dual-end power supply and one end cap thereof is inserted into a lamp socket but the other is not, an electric shock situation could take place for the user touching the metal or conductive part of the end cap which has been not inserted into the lamp socket.

Nowadays, LED tube lamps used to replace traditional fluorescent lighting devices can be primarily categorized into two types. One is for ballast-compatible LED tube lamps, e.g., T-LED lamp, which directly replaces fluorescent tube lamps without changing any circuit on the lighting device; and the other one is for ballast by-pass LED tube lamps, which omit traditional ballast on their circuit and directly connect the commercial electricity to the LED tube lamp. The latter LED tube lamp is suitable for the new surroundings in fixtures with new driving circuits and LED tube lamps.

SUMMARY OF THE INVENTION

It's specially noted that the present disclosure may actually include one or more inventions claimed currently or not yet claimed, and for avoiding confusion due to unnecessarily distinguishing between those possible inventions at the stage of preparing the specification, the possible plurality of inventions herein may be collectively referred to as "the (present) invention" herein.

Various embodiments are summarized in this section, and are described with respect to the "present invention," which terminology is used to describe certain presently disclosed embodiments, whether claimed or not, and is not necessarily an exhaustive description of all possible embodiments, but rather is merely a summary of certain embodiments. Certain of the embodiments described below as various aspects of the "present invention" can be combined in different manners to form an LED tube lamp or a portion thereof.

The present disclosure provides a novel LED tube lamp, and aspects thereof.

According to certain embodiments, a light-emitting diode (LED) tube lamp includes: a lamp tube; two end caps, each having at least one pin and each coupled to a respective end of the lamp tube, the pins of the two end caps for receiving an external driving signal; a first rectifying circuit, coupled to a pin of one of the two end caps, for rectifying the external driving signal to produce a rectified signal; a second rectifying circuit, coupled to a pin of the other of the two end caps, for simultaneously rectifying the external driving signal with the first rectifier; a filtering circuit, coupled to the first and the second rectifying circuits, for filtering the rectified signal to produce a filtered signal; an LED lighting module, coupled to the filtering circuit, and configured to receive the filtered signal to produce a driving signal, wherein the LED lighting module includes an LED module configured to receive the driving signal and emit light; and an installation detection module, configured to determine whether to cut off the external driving signal passing through the LED tube lamp, wherein the installation detection module includes a first installation detection terminal and a second installation detection terminal, the first installation detection terminal is coupled to the first and/or the second rectifying circuits, the second installation detection terminal is coupled to the filtering circuit, wherein the installation detection module is configured such that when a current passing through the first and the second installation detection terminals is bigger than or equal to a specific current value, the installation detection module conducts to make the LED tube lamp operate in a conductive state; and when the current passing through the first and the second installation detection terminals is smaller than the specific current value, the installation detection module cuts off to make the LED tube lamp enter in a non-conducting state.

In some embodiments, the installation detection module includes a switch circuit, a detection pulse generating module, a detection result latching circuit, and a detection determining circuit, wherein the detection determining circuit is coupled to the detection result latching circuit, the first and the second installation detection terminals, and is configured to detect a signal between the first and the second installation detection terminals to transmit a detection result signal to the detection result latching circuit, wherein the detection pulse generating module is coupled to the detection result latching circuit, and is configured to inform the detection result latching circuit of a time point for latching the detection result, wherein the detection result latching circuit is coupled to the switch circuit and latches a detection result according to the detection result signal, and further transmits the detection result to the switch circuit, wherein the switch circuit controls the state between conducting or cut off between the first and the second installation detection terminals according to the detection result.

In some embodiments, the detection pulse generating module includes a first capacitor, a second capacitor, a first resistor, a second resistor, a first buffer, an inverter, a diode, and an OR gate, wherein one end of the first resistor is coupled to an input terminal of the inverter, one end of the second resistor is coupled to an input terminal of the first buffer, a cathode of the diode is coupled to the input terminal of the first buffer and the diode is coupled with the second resistor in parallel, one ends of the first and the second capacitors are jointly coupled, the other ends of the first and the second capacitors are correspondingly coupled to the input terminal of the inverter and the input terminal of the first buffer, an output terminal of the inverter and an output terminal of the first buffer are coupled to two input terminals of the OR gate, respectively, an output terminal of the OR gate is coupled to the detection result latching circuit.

In some embodiments, when the one end cap of the LED tube lamp inserts a lamp socket and the other end cap thereof is electrically coupled to a human body or both the end caps insert the lamp socket, and the another end of the first resistor is coupled to a driving voltage, the another end of the second resistor is coupled to a reference voltage, and a joint connection node of the first and the second capacitors is coupled to the driving voltage, the driving voltage at the joint connection node of the first and the second capacitors is processed to produce an input pulse signal on the joint connection node, wherein during a high logic level of the input pulse signal inputting the joint connection node, the OR gate outputs a first pulse signal at the output terminal thereof for the detection result latching circuit latching a detection result based on the detection result signal and the first pulse signal, further, when the input terminal of the first buffer receives a low logic level of the input pulse signal from the output terminal of the OR gate, the first pulse signal on the output terminal thereof transferring into a low logic level signal.

In some embodiments, a width of the input pulse signal received by the joint connection node is equal to one time period, and the input pulse signal keeps a low logic level after the time period is over, wherein from the time period is over and the joint connection node receiving the high logic level of the input pulse signal and then transferring into the low logic level signal, the output terminal of the inverter has a high logic level signal to make the OR gate output a high logic level of a second pulse signal for the detection result latching circuit latching the detection result based on the detection result signal and the second pulse signal.

In some embodiments, the pulse width of the first or the second pulse signal is from 10 us to 1 ms.

In some embodiments, from the output terminal of the inverter transferring into the high logic level and when the voltage on the input terminal of the inverter rises and is equal to the driving voltage or a high logic level, the output terminal of the inverter transfers from the high logic level into a low logic level to make the OR gate stop outputting the second pulse signal or become to output a low logic level.

In some embodiments, the pulse width of the second pulse signal is determined based on the capacitance of the first capacitor and the resistance of the first resistor.

In some embodiments, a time difference between productions of the first and second pulse signals or an interval with a defined time between both of them includes as following: the interval=(X+Y)(T/2), wherein T represents a cycle of the external driving signal, X is a natural number, and 0<Y<1. In some embodiments, a range for Y is from about 0.05-0.95. And further, in some embodiments, a range for Y is from about 0.15-0.85.

In some embodiments, the pulse width of the first pulse signal output by the OR gate is decided by the capacitance of the second capacitor and the resistance of the second resistor.

In some embodiments, the time difference between the productions of the first and the second pulse signals is not equal to multiple times of half one cycle of the external driving signal, and not corresponding to a multiple of 180 degrees phase difference of the external driving signal.

In some embodiments, the detection pulse generating module further includes a third capacitor, a third resistor, and a second buffer, wherein a connection node of the third capacitor and the third resistor is coupled to an input terminal of the second buffer, an output terminal of the second buffer is coupled to the joint connection node of the first and the second capacitors, the third capacitor and the third resistor are coupled in serial between a driving voltage and a reference voltage, wherein the third capacitor, the third resistor, and the second buffer are configured to process the driving voltage to generate an input pulse signal at the joint connection node, wherein a width of the input pulse signal is equal to one time period and a low logic level on the joint connection node is output after the time period being over.

In some embodiments, the time period is determined by the capacitance of the third capacitor and the resistance of the third resistor.

In some embodiments, the detection determining circuit is coupled to the first installation detection terminal through a switch circuit coupling terminal and the switch circuit and is coupled to the detection result latching circuit via a detection result terminal, wherein the detection determining circuit includes a comparator, and a resistor, wherein a negative input terminal of the comparator receives a reference voltage, a positive input terminal thereof is coupled to the switch circuit coupling terminal and is coupled to the second installation detection terminal through the resistor, an output terminal of the comparator includes the detection result terminal. In some embodiments, when a current of the signal between the first and the second installation detection terminals passes through the resistor and makes a voltage on the positive input terminal higher than the reference voltage, the comparator produces a high logic level of the detection result signal and outputs to the detection result terminal, wherein the comparator generates a low logic level of the detection result signal and outputs to the detection result terminal when a current between the first and the second installation detection terminals passing through the resistor is insufficient to make the voltage on the positive input terminal higher than the reference voltage.

In some embodiments, the signal between the first and the second installation detection terminals inputs form the first installation detection terminal and passes through the switch circuit, the switch circuit coupling terminal, and the detection determining circuit.

In some embodiments, the detection result latching circuit is coupled to the detection determining circuit via a detection result terminal, to the switch circuit via a detection result latching terminal, and to the detection pulse generating module via a pulse signal output terminal, wherein the detection result latching circuit includes a D flip-flop, a resistor, and an OR gate, wherein the D flip-flop has a CLK input terminal coupled to the detection result terminal, and a D input terminal coupled to a driving voltage, one end of the resistor is coupled to a Q output terminal of the D flip-flop and the other end thereof is coupled to a reference voltage, the OR gate has two input terminals respectively coupled to the pulse signal output terminal and the Q output terminal of the D flip-flop, and has an output terminal coupled to the detection result latching terminal. In some embodiments, when the D input terminal of the D flip-flop is coupled to a driving voltage and the another end of the resistor is coupled to a reference voltage, and further when the detection result terminal outputs a low logic level of the detection result signal to the CLK input terminal, the D flip-flop outputs a low logic level signal at the Q output terminal thereof, but the D flip-flop outputs a high logic level signal at the Q output terminal thereof when the detection result terminal outputs a high logic level of the detection result signal to the CLK input terminal, wherein when the OR gate receives a pulse signal from the pulse signal output terminal or receives a high logic level signal from the Q output terminal of the D flip-flop, the OR gate outputs a high logic level of the detection result latching signal at the detection result latching terminal.

In some embodiments, the switch circuit is coupled to the first installation detection terminal, to the detection result latching circuit via a detection result latching terminal, and to the detection determining circuit via a switch circuit coupling terminal, the switch circuit includes a transistor coupled to the first installation detection terminal, to the detection result latching terminal, and to the switch circuit coupling terminal.

In some embodiments, when the detection pulse generating module produces a pulse signal, the transistor conducts to allow the detection determining circuit to perform detection for determining the detection result latching signal output by the detection result latching circuit at the detection result latching terminal to be high logic level or low logic level, and when the detection result latching signal is high logic level, the transistor conducts to make the first and the second installation detection terminals conducting, and when the detection result latching signal is low logic level, the transistor cuts off to make the first and the second installation detection terminals cutting off.

In some embodiments, the transistor includes a bipolar junction transistor being a power transistor, the bipolar junction transistor has a collector coupled to the first installation detection terminal, a base coupled to the detection result latching terminal, and an emitter coupled to the switch circuit coupling terminal.

In some embodiments, when the one end cap of the LED tube lamp is inserted into the lamp socket and the another floats or electrically couples to a human body, the detection determining circuit outputs a low logic level of the detection result signal to the detection result latching circuit, and then the detection pulse generating module outputs a low logic level signal to the detection result latching circuit to make the detection result latching circuit output a low logic level of a detection result latching signal to make the switch circuit cutting off, wherein the switch circuit cutting off makes the first and the second installation detection terminals blocking so as to make the LED tube lamp be in a non-conducting state.

In some embodiments, when the two end caps of the LED tube lamp are correctly inserted into the lamp socket, the detection determining circuit outputs a high logic level of the detection result signal to the detection result latching circuit to make the detection result latching circuit output a high logic level of the detection result latching signal to make the switch circuit conducting, wherein the switch circuit conducting makes the first and the second installation detection terminals conducting so as to make the LED tube lamp operate in a conducting state.

According to some embodiments of the LED tube lamp described herein, the end cap assembly will not conduct before being correctly inserted into the lamp socket so as to provide a safety protection for the user from electric shock.

According to some embodiments, a light-emitting diode (LED) tube lamp includes a lamp tube; two end caps, each having at least one pin, and each coupled to a respective end of the lamp tube, the pins of the two end caps for receiving a driving signal; an LED module coupled to the two end caps, and configured to emit light in response to the driving signal; and an installation detection circuit configured to determine whether to cut off a current generated from the driving signal from reaching the LED module, the installation detection circuit having an input terminal and output terminal. The installation detection circuit may be configured such that when a current passing through the input terminal and the output terminal is bigger than or equal to a specific current value, the installation detection circuit conducts to make the LED module operate in a conductive state, and when the current passing through the input terminal and output terminal is smaller than the specific current value, the installation detection circuit cuts off to make the LED module enter in a non-conducting state.

In some embodiments, the installation detection circuit further comprises: a first circuit configured to output two pulse signals, the first pulse signal output at a first time and the second pulse signal output at a second time after the first time; and a switch configured to receive the driving signal and to receive the two pulse signals. In some embodiments, the two pulse signals control turning on and off of the switch to control whether the LED module operates in a conductive state or in a non-conducting state.

According to some embodiments, the driving signal is an alternating current (AC) signal having a period; and the amount of time between the first time and the second time is not a multiple of half of the period of the driving signal. For example, the first time may be at the beginning of the first pulse signal; and the second time may be at the beginning of the second pulse signal. In some embodiments, a time difference between productions of the first and second pulse signals or an interval with a defined time between both of them is the following: the interval=(X+Y)(T/2), wherein T represents the period of the driving signal, X is a natural number, and 0.05<Y<0.95.

According to some embodiments, the LED tube lamp further includes a first rectifying circuit connected between the input terminal of the installation detection circuit and a first pin of one end cap of the two end caps; and a filtering circuit connected between the output terminal of the installation detection circuit and the lighting module.

The LED tube lamp may further include a second rectifying circuit, coupled to a first pin of the other of the two end caps and coupled to the installation detection circuit.

In some embodiments, the LED tube lamp includes a driving circuit coupled between the LED module and the installation detection circuit.

According to certain embodiments, an LED tube lamp includes an installation detection circuit. The installation detection circuit includes a first circuit configured to output a plurality of pulse signals including a first pulse signal and a second pulse signal, the first pulse signal output at a first time and the second pulse signal output at a second time after the first time; and a switch configured to receive an LED driving signal and to receive the plurality of pulse signals, wherein the plurality of pulse signals control turning on and off of the switch. The installation detection circuit is configured to: during a detection stage, detect during each of the plurality of pulse signals whether the LED tube lamp is properly connected to a lamp socket; when it is not detected during any of the plurality of pulse signals that the LED tube lamp is properly connected to the lamp socket, control the switch to remain in an off state after the detection stage; and when it is detected during at least one of the plurality of pulse signals that the LED tube lamp is properly connected to the lamp socket, control the switch to remain in an on state after the detection stage.

In some embodiments, the LED tube lamp further includes a latch circuit connected to the switch and configured to control turning on and off of the switch.

In some embodiments, the LED driving signal is an AC signal having a period; and the amount of time between the first time and the second time is not a multiple of half of the period of the LED driving signal. For example, the first time may be at the beginning of the first pulse signal; and the second time may be at the beginning of the second pulse signal.

BRIEF DESCRIPTION OF THE DRAWINGS

FIG. 9 is a plane view schematically illustrating the arrangement of the soldering pads of the bendable circuit sheet of the LED light strip of the LED tube lamp according to one embodiment of the present invention;

FIG. 10 is a plane view schematically illustrating a row of three soldering pads of the bendable circuit sheet of the LED light strip of the LED tube lamp according to another embodiment of the present invention;

FIG. 11 is a plane view schematically illustrating two rows of soldering pads of the bendable circuit sheet of the LED light strip of the LED tube lamp according to still another embodiment of the present invention;

FIG. 12 is a plane view schematically illustrating a row of four soldering pads of the bendable circuit sheet of the LED light strip of the LED tube lamp according to yet another embodiment of the present invention;

FIG. 13 is a plane view schematically illustrating two rows of two soldering pads of the bendable circuit sheet of the LED light strip of the LED tube lamp according to yet still another embodiment of the present invention;

FIG. 14 is a plane view schematically illustrating through holes are formed on the soldering pads of the bendable circuit sheet of the LED light strip of the LED tube lamp according to one embodiment of the present invention;

FIG. 17 is a plane view schematically illustrating notches formed on the soldering pads of the bendable circuit sheet of the LED light strip of the LED tube lamp according to one embodiment of the present invention;

FIG. 18 is an exemplary plane cross-sectional view of FIG. 17 taken along a line A-A';

FIGS. 40A-F are several structures of end caps according to some embodiments of the present invention;

DETAILED DESCRIPTION

Figure 1:
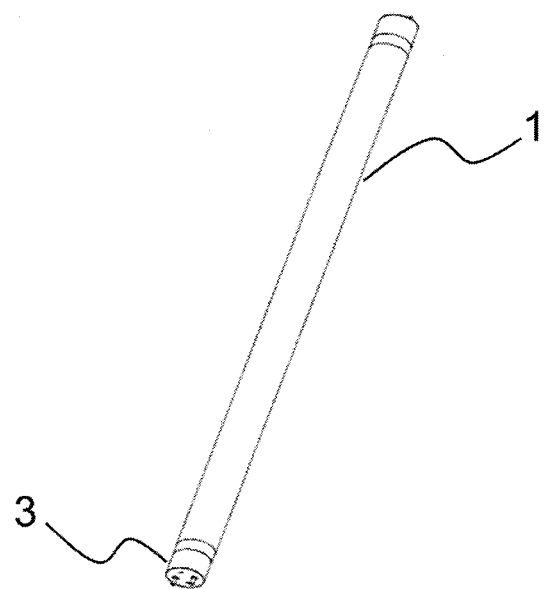
FIG. 1 is a perspective view schematically illustrating an LED tube lamp according to one embodiment of the present invention.

The present disclosure provides a novel LED tube lamp. The present disclosure will now be described in the following embodiments with reference to the drawings. The following descriptions of various embodiments of this invention are presented herein for purpose of illustration and giving examples only. It is not intended to be exhaustive or to be limited to the precise form disclosed. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of components may be exaggerated for clarity. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that, although the terms first, second, third etc. may be used herein to describe various elements, components, regions, layers, or steps, these elements, components, regions, layers, and/or steps should not be limited by these terms. Unless the context indicates otherwise, these terms are only used to distinguish one element, component, region, layer, or step from another element, component, region, or step, for example as a naming convention. Thus, a first element, component, region, layer, or step discussed below in one section of the specification could be termed a second element, component, region, layer, or step in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise.

Embodiments described herein will be described referring to plane views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the invention are not limited.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning.

Terms such as "about" or "approximately" may reflect sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As used herein, items described as being "electrically connected" are configured such that an electrical signal can be passed from one item to the other. Therefore, a passive electrically conductive component (e.g., a wire, pad, internal electrical line, etc.) physically connected to a passive electrically insulative component (e.g., a prepreg layer of a printed circuit board, an electrically insulative adhesive connecting two devices, an electrically insulative underfill or mold layer, etc.) is not electrically connected to that component. Moreover, items that are "directly electrically connected," to each other are electrically connected through one or more passive elements, such as, for example, wires, pads, internal electrical lines, resistors, etc. As such, directly electrically connected components do not include components electrically connected through active elements, such as transistors or diodes.

Components described as thermally connected or in thermal communication are arranged such that heat will follow a path between the components to allow the heat to transfer from the first component to the second component. Simply because two components are part of the same device or board does not make them thermally connected. In general, components which are heat-conductive and directly connected to other heat-conductive or heat-generating components (or connected to those components through intermediate heat-conductive components or in such close proximity as to permit a substantial transfer of heat) will be described as thermally connected to those components, or in thermal communication with those components. On the contrary, two components with heat-insulative materials therebetween, which materials significantly prevent heat transfer between the two components, or only allow for incidental heat transfer, are not described as thermally connected or in thermal communication with each other. The terms "heat-conductive" or "thermally-conductive" do not apply to any material that provides incidental heat conduction, but are intended to refer to materials that are typically known as good heat conductors or known to have utility for transferring heat, or components having similar heat conducting properties as those materials.

Figure 1A:
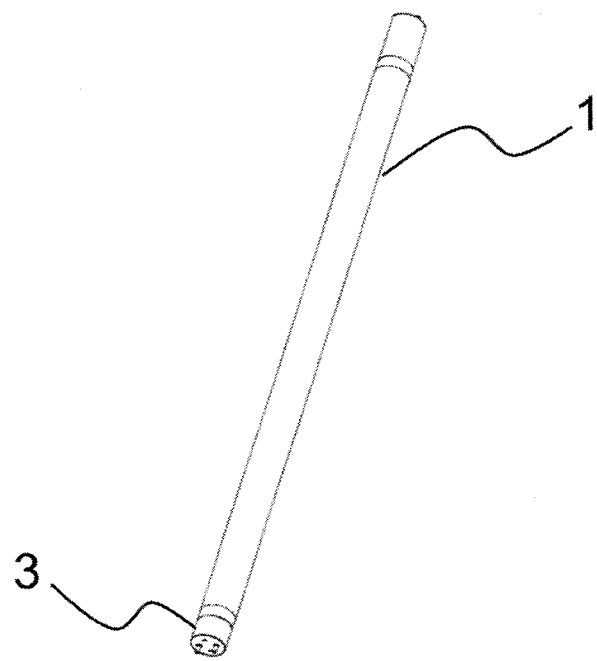
FIG. 1A is a perspective view schematically illustrating the different sized end caps of an LED tube lamp according to another embodiment of the present invention to illustrate.
Figure 2:
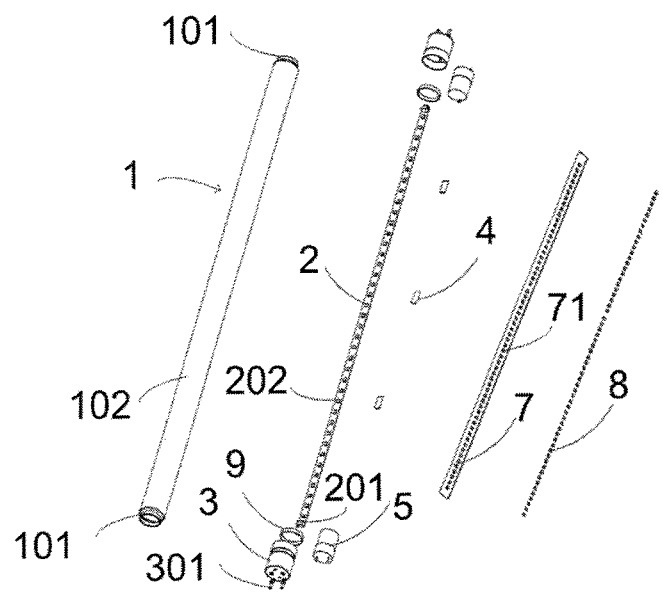
FIG. 2 is an exemplary exploded view schematically illustrating the LED tube lamp shown in FIG. 1.

Referring to FIGS. 1 and 2, an LED tube lamp of one embodiment of the present invention includes a lamp tube 1, an LED light strip 2 disposed inside the lamp tube 1, and two end caps 3 respectively disposed at two ends of the lamp tube 1. The lamp tube 1 may be made of plastic or glass. The sizes of the two end caps 3 may be same or different. Referring to FIG. 1A, the size of one end cap may in some embodiments be about 30% to about 80% times the size of the other end cap.

In one embodiment, the lamp tube 1 is made of glass with strengthened or tempered structure to avoid being easily broken and incurring electric shock that may occur in conventional glass made tube lamps, and to avoid the fast aging process that often occurs in plastic made tube lamps. The glass made lamp tube 1 may be additionally strengthened or tempered by a chemical tempering method or a physical tempering method in various embodiments of the present invention.

Figure 3:
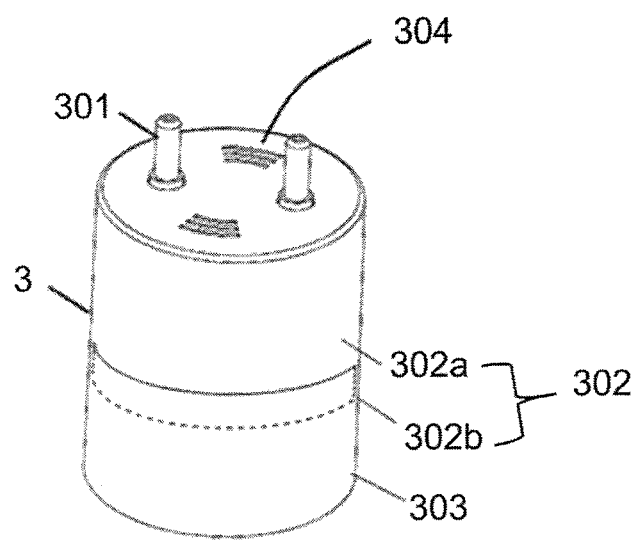
FIG. 3 is a perspective view schematically illustrating front and top of an end cap of the LED tube lamp according to one embodiment of the present invention.
Figure 4:
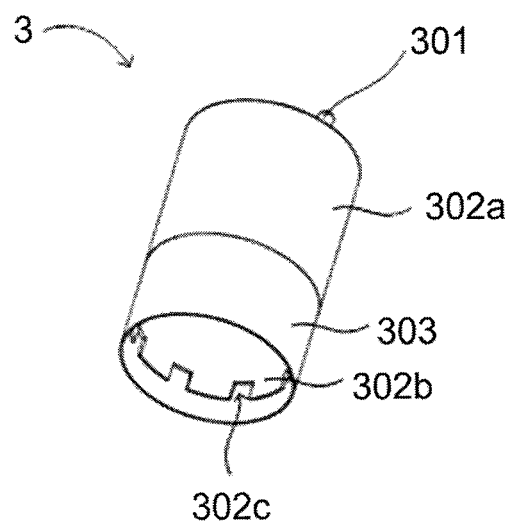
FIG. 4 is an exemplary perspective view schematically illustrating bottom of the end cap as shown in FIG. 3.

Referring to FIGS. 3 and 4, in one embodiment of the invention, each end cap 3 includes an electrically insulating tube 302, a thermal conductive member 303 sleeved over the electrically insulating tube 302, and two hollow conductive pins 301 disposed on the electrically insulating tube 302. The thermal conductive member 303 can be a metal ring that is tubular in shape.

During fabrication of the LED tube lamp, the rear end region 101 (also referred to as an end region 101) of the lamp tube 1 is inserted into one of the end caps 3. In some embodiments, the axial length of the inserted portion of the rear end region 101 of the lamp tube 1 accounts for approximately one-third (⅓) to two-thirds (⅔) of the total axial length of the thermal conductive member 303. One benefit is that, there will be sufficient creepage distance between the hollow conductive pins 301 and the thermal conductive member 303, and thus it is not easy to form a short circuit leading to dangerous electric shock to individuals. On the other hand, the creepage distance between the hollow conductive pin 301 and the thermal conductive member 303 is increased due to the electrically insulating effect of the electrically insulating tube 302, and thus a high voltage is applied to the LED tube lamp without causing electric shocks to people.

Figure 5:
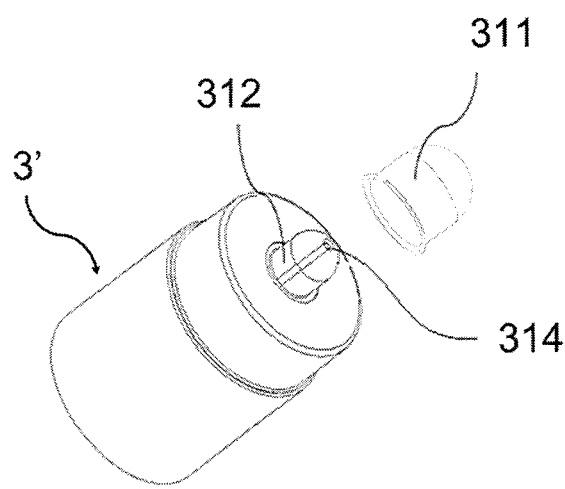
FIG. 5 is a perspective view schematically illustrating still another end cap of an LED tube lamp according to still another embodiment of the present invention.
Figure 22:
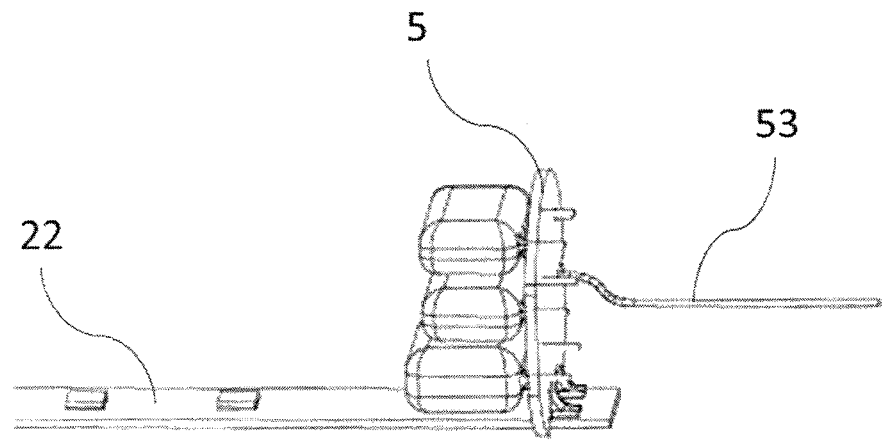
FIG. 22 is a perspective view schematically illustrating the printed circuit board of the power supply, which is perpendicularly adhered to a hard circuit board made of aluminum via soldering according to another embodiment of the present invention.

Referring to FIGS. 5 and 22, in one embodiment, an end cap 3' has a pillar 312 at one end, the top end of the pillar 312 is provided with an opening having a groove 314 of, for example 0.1±1% mm depth at the periphery thereof for positioning a conductive lead 53 as shown in FIG. 22. The conductive lead 53 passes through the opening on top of the pillar 312 and has its end bent to be disposed in the groove 314. After that, a conductive metallic cap 311 covers the pillar 312 such that the conductive lead 53 is fixed between the pillar 312 and the conductive metallic cap 311. In some embodiments, the inner diameter of the conductive metallic cap 311 is 7.56±5% mm, the outer diameter of the pillar 312 is 7.23±5% mm, and the outer diameter of the conductive lead 53 is 0.5±1% mm. Nevertheless, the mentioned sizes are not limited here once that the conductive metallic cap 311 closely covers the pillar 312 without using extra adhesives and therefore completes the electrical connection between the power supply 5 and the conductive metallic cap 311.

Referring to FIGS. 2 and 3, in one embodiment, the end cap 3 may have openings 304 to dissipate heat generated by the power supply modules inside the end cap 3 so as to prevent a high temperature condition inside the end cap 3 that might reduce reliability. In some embodiments, the openings are in a shape of an arc; especially in a shape of three arcs with different size. In one embodiment, the openings are in a shape of three arcs with gradually varying size. The openings on the end cap 3 can be in any one of the above-mentioned shapes or any combination thereof.

In other embodiments, the end cap 3 is provided with a socket (not shown) for installing the power supply module.

In other embodiments, the width of the LED light strip 2 (along the circumferential direction of the lamp tube) can be widened to occupy a circumference area of the inner circumferential surface of the lamp tube 1. Since the LED light strip 2 has on its surface a circuit protective layer made of an ink which can reflect lights, the widened part of the LED light strip 2 functions like the reflective film. In some embodiments, a ratio of the length of the LED light strip 2 along the circumferential direction to the circumferential length of the lamp tube 1 is about 0.3 to 0.5. The light emitted from the light sources could be concentrated by the reflection of the widened part of the LED light strip 2.

Furthermore, the LED light strip 2 may be an elongated aluminum plate, FR 4 board, or a bendable circuit sheet. When the lamp tube 1 is made of glass, adopting a rigid aluminum plate or FR4 board would make a broken lamp tube, e.g., broken into two parts, remain a straight shape so that a user may be under a false impression that the LED tube lamp is still usable and fully functional, and it is easy for him to incur electric shock upon handling or installation of the LED tube lamp. Because of added flexibility and bendability of the flexible substrate for the LED light strip 2, the problem faced by the aluminum plate, FR4 board, or conventional 3-layered flexible board having inadequate flexibility and bendability, are thereby addressed. In certain embodiments, a bendable circuit sheet is adopted as the LED light strip 2 such that an LED light strip 2 would not allow a ruptured or broken lamp tube to maintain a straight shape and therefore would instantly inform the user of the disability of the LED tube lamp and avoid possibly incurred electric shock. The following are further descriptions of an example bendable circuit sheet used as the LED light strip 2.

Figure 7:
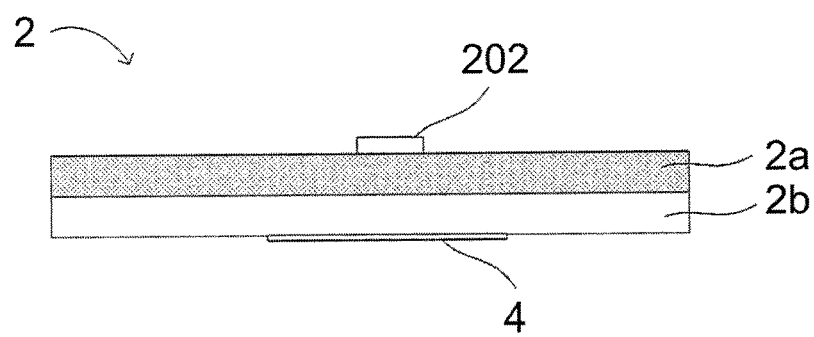
FIG. 7 is a plane cross-sectional view schematically illustrating a bi-layered structure of the bendable circuit sheet of the LED light strip of the LED tube lamp according to an embodiment of the present invention.

Referring to FIG. 7, in one example of the LED light strip 2, a bendable circuit sheet includes a wiring layer 2a with conductive effect. The LED light source 202 is configured on the wiring layer 2a and electrically connect to the power through the wiring layer 2a. The wiring layer with conductive effect, in this specification, is also called a conductive layer. Referring to FIG. 7 again, in one embodiment, the LED light strip 2 includes a bendable circuit sheet having a conductive wiring layer 2a and a dielectric layer 2b that are arranged in a stacked manner, wherein the wiring layer 2a and the dielectric layer 2b have the same areas. The LED light source 202 is disposed on one surface of the wiring layer 2a, the dielectric layer 2b is disposed on the other surface of the wiring layer 2a that is away from the LED light sources 202. The wiring layer 2a is electrically connected to the power supply 5 to carry direct current (DC) signals. Meanwhile, the surface of the dielectric layer 2b away from the wiring layer 2a is fixed to the inner circumferential surface of the lamp tube 1 by means of the adhesive sheet 4. The wiring layer 2a can be a metal layer or a power supply layer including wires such as copper wires.

In another embodiment, the outer surface of the wiring layer 2a or the dielectric layer 2b may be covered with a circuit protective layer made of an ink with function of resisting soldering and increasing reflectivity. Alternatively, the dielectric layer can be omitted and the wiring layer can be directly bonded to the inner circumferential surface of the lamp tube, and the outer surface of the wiring layer 2a is coated with the circuit protective layer. Whether the wiring layer 2a has a one-layered, or two-layered structure, the circuit protective layer can be adopted. In some embodiments, the circuit protective layer is disposed only on one side/surface of the LED light strip 2, such as the surface having the LED light source 202. In some embodiments, the bendable circuit sheet is a one-layered structure made of just one wiring layer 2a, or a two-layered structure made of one wiring layer 2a and one dielectric layer 2b, and thus is more bendable or flexible to curl when compared with the conventional three-layered flexible substrate (one dielectric layer sandwiched with two wiring layers). As a result, the bendable circuit sheet of the LED light strip 2 can be installed in a lamp tube with a customized shape or non-tubular shape, and fitly mounted to the inner surface of the lamp tube. The bendable circuit sheet closely mounted to the inner surface of the lamp tube is preferable in some cases. In addition, using fewer layers of the bendable circuit sheet improves the heat dissipation, lowering the material cost, being more environmental friendly, and has the ability to increase the flexible effect.

Nevertheless, the bendable circuit sheet is not limited to being one-layered or two-layered; in other embodiments, the bendable circuit sheet may include multiple layers of the wiring layers 2a and multiple layers of the dielectric layers 2b, in which the dielectric layers 2b and the wiring layers 2a are sequentially stacked in a staggered manner, respectively. These stacked layers are away from the surface of the outermost wiring layer 2a which has the LED light source 202 disposed thereon and is electrically connected to the power supply 5. Moreover, in some embodiments, the length of the bendable circuit sheet is greater than the length of the lamp tube.

Figure 23:
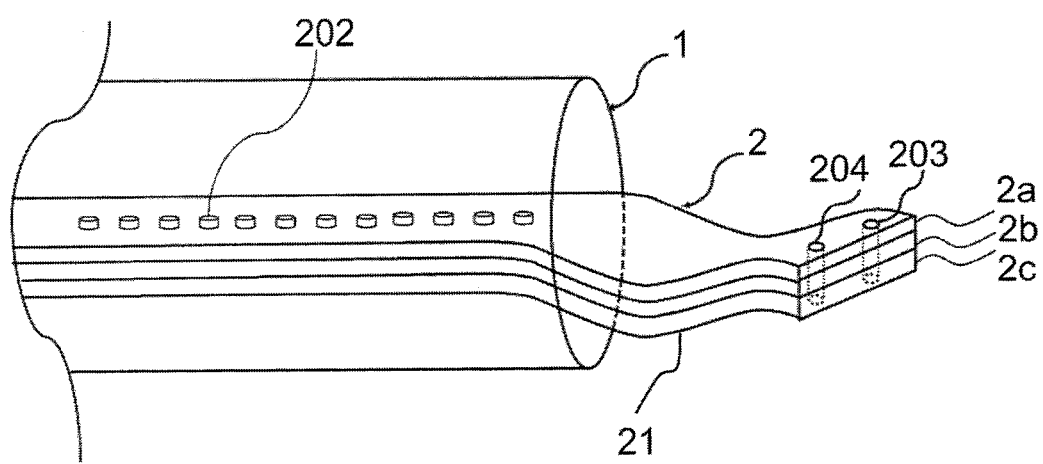
FIG. 23 is a perspective view schematically illustrating the bendable circuit sheet of the LED light strip is formed with two conductive wiring layers according to another embodiment of the present invention.

Referring to FIG. 23, in one embodiment, the LED light strip 2 includes a bendable circuit sheet having in sequence a first wiring layer 2a, a dielectric layer 2b, and a second wiring layer 2c. The thickness of the second wiring layer 2c is greater than that of the first wiring layer 2a, and the length of the LED light strip 2 is greater than that of the lamp tube 1. The end region of the LED light strip 2 extending beyond the end portion of the lamp tube 1 without disposition of the light source 202 is formed with two separate through holes 203 and 204 to respectively electrically communicate between the first wiring layer 2a and the second wiring layer 2c. The through holes 203 and 204 are not in communication with each other to avoid short.

In this way, the greater thickness of the second wiring layer 2c allows the second wiring layer 2c to support the first wiring layer 2a and the dielectric layer 2b, and meanwhile allow the LED light strip 2 to be mounted onto the inner circumferential surface without being liable to shift or deform, and thus the yield rate of products can be improved. In addition, the first wiring layer 2a and the second wiring layer 2c are in electrical communication such that the circuit layout of the first wiring later 2a can be extended downward to the second wiring layer 2c to reach the circuit layout of the entire LED light strip 2. Moreover, since the land for the circuit layout becomes two-layered, the area of each single layer and therefore the width of the LED light strip 2 can be reduced such that more LED light strips 2 can be put on a production line to increase productivity.

Furthermore, the first wiring layer 2a and the second wiring layer 2c of the end region of the LED light strip 2 that extends beyond the end portion of the lamp tube 1 without disposition of the light source 202 can be used to accomplish the circuit layout of a power supply module so that the power supply module can be directly disposed on the bendable circuit sheet of the LED light strip 2.

Referring to FIG. 2, in one embodiment, the LED light strip 2 has a plurality of LED light sources 202 mounted thereon, and the end cap 3 has a power supply 5 installed therein. The LED light sources 202 and the power supply 5 are electrically connected by the LED light strip 2. The power supply 5 may be a single integrated unit (i.e., all of the power supply components are integrated into one module unit) installed in one end cap 3. Alternatively, the power supply 5 may be divided into two separate units (i.e. the power supply components are divided into two parts) installed in two end caps 3, respectively. When only one end of the lamp tube 1 is strengthened by a glass tempering process, it may be preferable that the power supply 5 is a single integrated unit and installed in the end cap 3 corresponding to the strengthened end 101 of the lamp tube 1.

Figure 6:
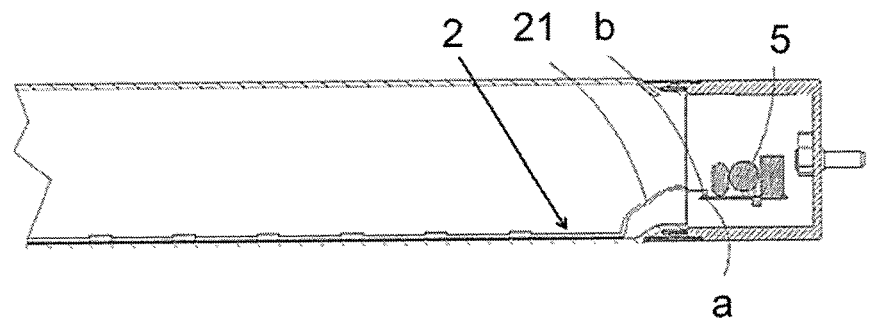
FIG. 6 is a plane cross-sectional view schematically illustrating the LED light strip is a bendable circuit sheet with ends thereof passing across the transition region of the lamp tube of the LED tube lamp to be soldering bonded to the output terminals of the power supply according to one embodiment of the present invention.

The power supply 5 can be fabricated by various ways. For example, the power supply 5 may be an encapsulation body formed by injection molding a silica gel with high thermal conductivity such as being greater than 0.7 w/m·k. This kind of power supply has advantages of high electrical insulation, high heat dissipation, and regular shape to match other components in an assembly. Alternatively, the power supply 5 in the end caps 3 may be a printed circuit board having components (e.g., power converting and/or generating components) that are directly exposed or packaged by a conventional heat shrink sleeve. The power supply 5 according to some embodiments of the present invention can be a single printed circuit board provided with a power supply module as shown in FIG. 6 or a single integrated unit as shown in FIG. 21.

Figure 21:
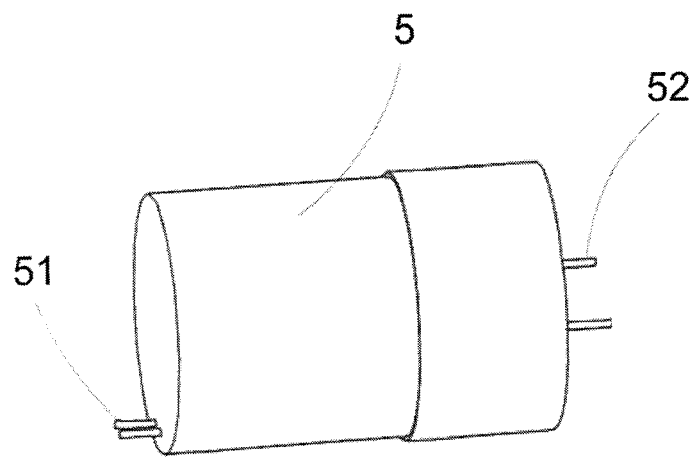
FIG. 21 is a perspective view schematically illustrating a power supply of the LED tube lamp according to one embodiment of the present invention.

Referring to FIGS. 2 and 21, in one embodiment of the present invention, the power supply 5 is provided with a male plug 51 at one end and a metal pin 52 at the other end, one end of the LED light strip 2 is correspondingly provided with a female plug 201, and the end cap 3 is provided with a hollow conductive pin 301 to be connected with an outer electrical power source. Specifically, the male plug 51 is fittingly inserted into the female plug 201 of the LED light strip 2, while the metal pins 52 are fittingly inserted into the hollow conductive pins 301 of the end cap 3. The male plug 51 and the female plug 201 function as a connector between the power supply 5 and the LED light strip 2. Upon insertion of the metal pin 52, the hollow conductive pin 301 is punched with an external punching tool to slightly deform such that the metal pin 52 of the power supply 5 is secured and electrically connected to the hollow conductive pin 301. Upon turning on the electrical power, the electrical current passes in sequence through the hollow conductive pin 301, the metal pin 52, the male plug 51, and the female plug 201 to reach the LED light strip 2 and go to the LED light sources 202. However, the power supply 5 of the present invention is not limited to the modular type as shown in FIG. 21. The power supply 5 may be a printed circuit board provided with a power supply module and electrically connected to the LED light strip 2 via the abovementioned the male plug 51 and female plug 201 combination.

In another embodiment, a traditional wire bonding technique can be used instead of the male plug 51 and the female plug 201 for connecting any kind of the power supply 5 and the light strip 2. That is, a traditional metal wire can be applied to, and one end of the metal wire electrically connects to the power supply and the other end electrically connects to the LED light strip 2. Furthermore, the wires may be wrapped with an electrically insulating tube to protect a user from being electrically shocked. However, the bonded wires tend to be easily broken during transportation and can therefore cause quality issues.

In still another embodiment, the connection between the power supply 5 and the LED light strip 2 may be accomplished via soldering (e.g., tin soldering), rivet bonding, or welding. One way to secure the LED light strip 2 is to provide the adhesive sheet 4 at one side thereof and adhere the LED light strip 2 to the inner surface of the lamp tube 1 via the adhesive sheet 4. Two ends of the LED light strip 2 can be either fixed to or detached from the inner surface of the lamp tube 1.

In case that two ends of the LED light strip 2 are fixed to the inner surface of the lamp tube 1, it may be preferable that the bendable circuit sheet of the LED light strip 2 is provided with the female plug 201 and the power supply is provided with the male plug 51 to accomplish the connection between the LED light strip 2 and the power supply 5. In this case, the male plug 51 of the power supply 5 is inserted into the female plug 201 to establish electrical connection.

In case that two ends of the LED light strip 2 are detached from the inner surface of the lamp tube 1 and that the LED light strip 2 is connected to the power supply 5 via wire-bonding, any movement in subsequent transportation may cause the bonded wires to break. Therefore, a desirable option for the connection between the LED light strip 2 and the power supply 5 could be soldering. Specifically, referring to FIG. 6, the ends of the LED light strip 2 including the bendable circuit sheet are arranged to pass over the strengthened transition region 103 and directly soldering bonded to an output terminal of the power supply 5 such that the product quality is improved without using wires (e.g., wire-bonding wires). In this way, the female plug 201 and the male plug 51 respectively provided for the LED light strip 2 and the power supply 5 are no longer needed.

Figure 8:
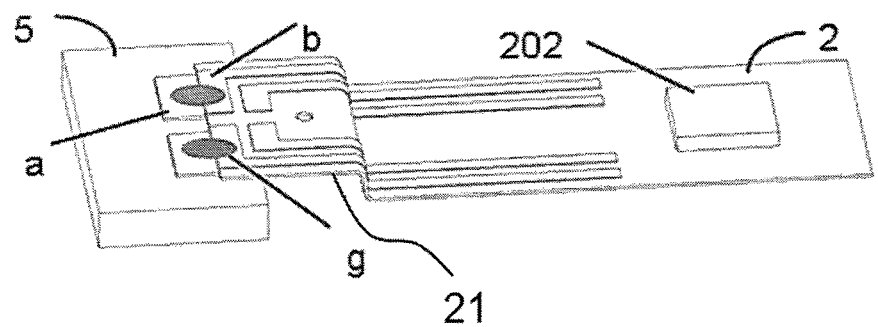
FIG. 8 is a perspective view schematically illustrating the soldering pad of the bendable circuit sheet of the LED light strip for soldering connection with the printed circuit board of the power supply of the LED tube lamp according to one embodiment of the present invention.

Referring to FIG. 8, an output terminal of the printed circuit board of the power supply 5 may have soldering pads "a" provided with an amount of solder (e.g., tin solder) with a thickness sufficient to later form a solder joint. Correspondingly, the ends of the LED light strip 2 may have soldering pads "b". The soldering pads "a" on the output terminal of the printed circuit board of the power supply 5 are soldered to the soldering pads "b" on the LED light strip 2 via the tin solder on the soldering pads "a". The soldering pads "a" and the soldering pads "b" may be face to face during soldering such that the connection between the LED light strip 2 and the printed circuit board of the power supply 5 is the most firm. However, this kind of soldering typically includes that a thermo-compression head presses on the rear surface of the LED light strip 2 and heats the tin solder, i.e. the LED light strip 2 intervenes between the thermo-compression head and the tin solder, and therefore may easily cause reliability problems. Referring to FIG. 14, a through hole may be formed in each of the soldering pads "b" on the LED light strip 2 to allow the soldering pads "b" overlay the soldering pads "b" without being face-to-face and the thermo-compression head directly presses tin solders on the soldering pads "a" on surface of the printed circuit board of the power supply 5 when the soldering pads "a" and the soldering pads "b" are vertically aligned.

Referring again to FIGS. 6 and 8, two ends of the LED light strip 2 detached from the inner surface of the lamp tube 1 are formed as freely extending end portions 21, while most of the LED light strip 2 is attached and secured to the inner surface of the lamp tube 1. Most of the LED light strip 2 is therefore at a first vertical level, while the freely extending end portion 21 extends to a second vertical level, and may be at a plurality of different vertical levels as it extends along a length of the lamp tube 1. The first vertical level may be closer to the lamp tube 1, while the second vertical level may be closer to the printed circuit board of the power supply 5. For example, as can be seen in FIGS. 6 and 8, the freely extending end portions 21 may extend between a first vertical level at which the LED light strip 2 is disposed where the light strip 2 includes light sources 202, and a second vertical level at which a printed circuit board of the power supply 5 is disposed. One of the freely extending end portions 21 has the soldering pads "b" as mentioned above. Upon assembling of the LED tube lamp, the freely extending end portions 21 along with the soldered connection of the printed circuit board of the power supply 5 and the LED light strip 2 would be coiled, curled up or deformed to be fittingly accommodated inside the lamp tube 1. When the bendable circuit sheet of the LED light strip 2 includes in sequence the first wiring layer 2a, the dielectric layer 2b, and the second wiring layer 2c as shown in FIG. 23, the freely extending end portions 21, which are the end regions of the LED light strip 2 extending beyond the lamp tube 1 without disposition of the light sources 202, can be used to accomplish the connection between the first wiring layer 2a and the second wiring layer 2c and arrange the circuit layout of the power supply 5.

In one embodiment, during the connection of the LED light strip 2 and the power supply 5, the soldering pads "b" and the soldering pads "a" and the LED light sources 202 are on surfaces facing toward the same direction (e.g., they may both be facing up in one example) and the soldering pads "b" on the LED light strip 2 are each formed with a through hole "e" as shown in FIG. 14 such that the soldering pads "b" and the soldering pads "a" communicate with each other via the through holes "e". When the freely extending end portions 21 are deformed due to contraction or curling up, the soldered connection of the printed circuit board of the power supply 5 and the LED light strip 2 exerts a lateral tension on the power supply 5. Furthermore, the soldered connection of the printed circuit board of the power supply 5 and the LED light strip 2 also exerts a downward tension on the power supply 5 when compared with the situation where the soldering pads "a" of the power supply 5 and the soldering pads "b" of the LED light strip 2 are face to face. This downward tension on the power supply 5 comes from the tin solders inside the through holes "e" and forms a stronger and more secure electrical connection between the LED light strip 2 and the power supply 5.

Referring to FIG. 9, in one embodiment, the soldering pads "b" of the LED light strip 2 are two separate pads to electrically connect the positive and negative electrodes of the bendable circuit sheet of the LED light strip 2, respectively. The size of the soldering pads "b" may be, for example, about 3.5×2 mm$^2$. The printed circuit board of the power supply 5 is correspondingly provided with soldering pads "a" having reserved tin solders, and the height of the tin solders suitable for subsequent automatic soldering bonding process is generally, for example, about 0.1 to 0.7 mm, in some embodiments about 0.3 to about 0.5 mm, and in some additional embodiments about 0.4 mm. An electrically insulating through hole "c" may be formed between the two soldering pads "b" to isolate and prevent the two soldering pads from electrically shorting during soldering. Furthermore, an extra positioning opening "d" may also be provided behind the electrically insulating through hole "c" to allow an automatic soldering machine to quickly recognize the position of the soldering pads "b".

For the sake of achieving scalability and compatibility, the amount of the soldering pads "b" on each end of the LED light strip 2 may be more than one such as two, three, four, or more than four. When there is only one soldering pad "b" provided at each end of the LED light strip 2, the two ends of the LED light strip 2 are electrically connected to the power supply 5 to form a loop, and various electrical components can be used. For example, a capacitance may be replaced by an inductance to perform current regulation. In this specification, the meaning of "inductance" includes "inductor", the meaning of "capacitance" includes "capacitor", and the meaning of "resistance" includes "resistor". Referring to FIGS. 10 to 13, when each end of the LED light strip 2 has three soldering pads, the third soldering pad can be grounded; when each end of the LED light strip 2 has four soldering pads, the fourth soldering pad can be used as a signal input terminal. Correspondingly, in some embodiments, the power supply 5 should have same amount of soldering pads "a" as that of the soldering pads "b" on the LED light strip 2. In some embodiments, as long as electrical short between the soldering pads "b" can be prevented, the soldering pads "b" should be arranged according to the dimension of the actual area for disposition, for example, three soldering pads can be arranged in a row or two rows. In other embodiments, the amount of the soldering pads "b" on the bendable circuit sheet of the LED light strip 2 may be reduced by rearranging the circuits on the bendable circuit sheet of the LED light strip 2. The lesser the amount of the soldering pads, the easier the fabrication process becomes. On the other hand, a greater number of soldering pads may improve and secure the electrical connection between the LED light strip 2 and the output terminal of the power supply 5.

Referring to FIG. 14, in another embodiment, each soldering pads "b" is formed with a through hole "e" having a diameter generally of about 1 to 2 mm, in some embodiments of about 1.2 to 1.8 mm, and in yet further embodiments of about 1.5 mm. The through hole "e" communicates the soldering pad "a" with the soldering pad "b" so that the tin solder on the soldering pads "a" passes through the through holes "e" and finally reaches the soldering pads "b". A smaller through hole "e" would make it difficult for the tin solder to pass. The tin solder accumulates around the through holes "e" upon exiting the through holes "e" and condenses to form a solder ball "g" with a larger diameter than that of the through holes "e" upon condensing. Such a solder ball "g" functions as a rivet to further increase the stability of the electrical connection between the soldering pads "a" on the power supply 5 and the soldering pads "b" on the LED light strip 2.

Figure 15:
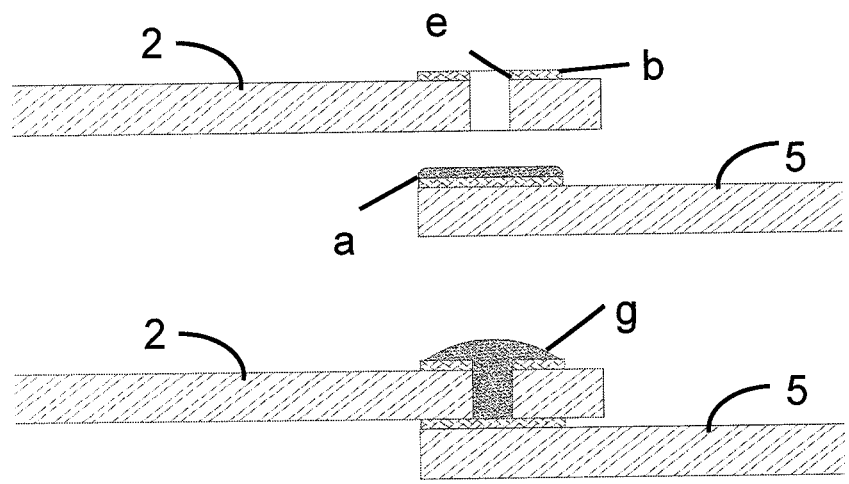
FIG. 15 is a plane cross-sectional view schematically illustrating soldering bonding process utilizing the soldering pads of the bendable circuit sheet of the LED light strip of FIG. 14 taken from side view and the printed circuit board of the power supply according to one embodiment of the present invention.
Figure 16:
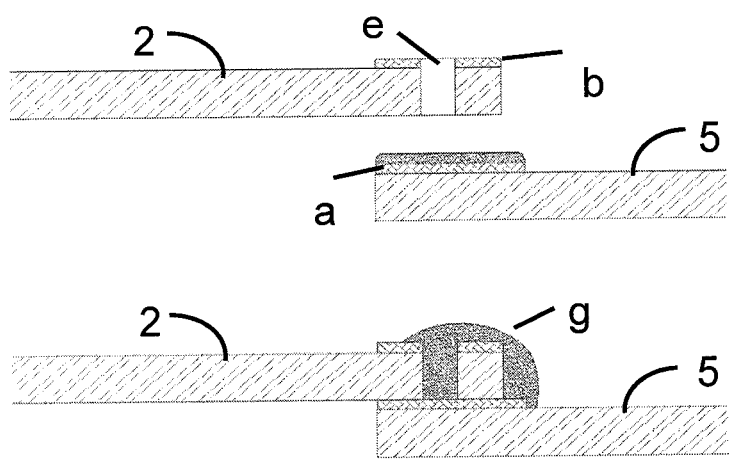
FIG. 16 is a plane cross-sectional view schematically illustrating soldering bonding process utilizing the soldering pads of the bendable circuit sheet of the LED light strip of FIG. 14 taken from side view and the printed circuit board of the power supply according to another embodiment of the present invention, wherein the through hole of the soldering pads is near the edge of the bendable circuit sheet.

Referring to FIGS. 15 to 16, in other embodiments, when a distance from the through hole "e" to the side edge of the LED light strip 2 is less than 1 mm, the tin solder may pass through the through hole "e" to accumulate on the periphery of the through hole "e", and extra tin solder may spill over the soldering pads "b" to reflow along the side edge of the LED light strip 2 and join the tin solder on the soldering pads "a" of the power supply 5. The tin solder then condenses to form a structure like a rivet to firmly secure the LED light strip 2 onto the printed circuit board of the power supply 5 such that reliable electrical connection is achieved. Referring to FIGS. 17 and 18, in another embodiment, the through hole "e" can be replaced by a notch "f" formed at the side edge of the soldering pads "b" to allow the tin solder to easily pass through the notch "f" and accumulate on the periphery of the notch "f" and to form a solder ball with a larger diameter than that of the notch "e" upon condensing. Such a solder ball may be formed like a C-shape rivet to enhance the secure capability of the electrically connecting structure.

The abovementioned through hole "e" or notch "f" might be formed in advance of soldering or formed by direct punching with a thermo-compression head during soldering. The portion of the thermo-compression head for touching the tin solder may be flat, concave, or convex, or any combination thereof. The portion of the thermo-compression head for restraining the object to be soldered such as the LED light strip 2 may be strip-like or grid-like. The portion of the thermo-compression head for touching the tin solder does not completely cover the through hole "e" or the notch "f" to make sure that the tin solder is able to pass through the through hole "e" or the notch "f". The portion of the thermo-compression head being concave may function as a room to receive the solder ball. In other embodiments, the bendable circuit sheet of the LED light strip 2 has a position hole to provide a precisely position recognition for the soldering pads "a" of the power supply 5 to weld the soldering pads "b" on the LED light strip 2 during welding.

Figure 19:
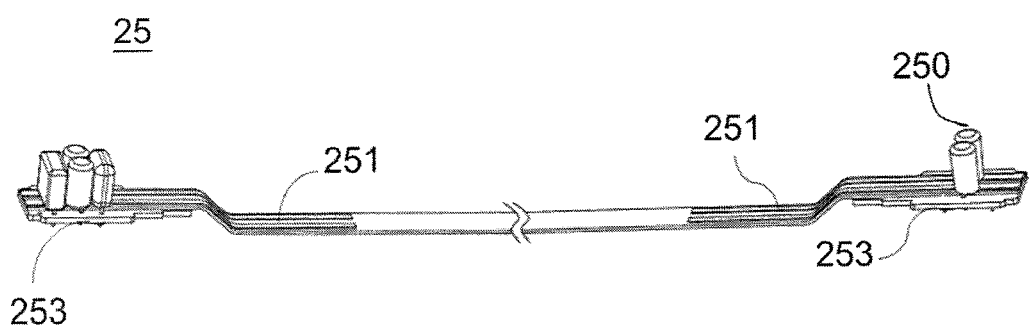
FIG. 19 is a perspective view schematically illustrating a circuit board assembly composed of the bendable circuit sheet of the LED light strip and the printed circuit board of the power supply according to another embodiment of the present invention.
Figure 20:
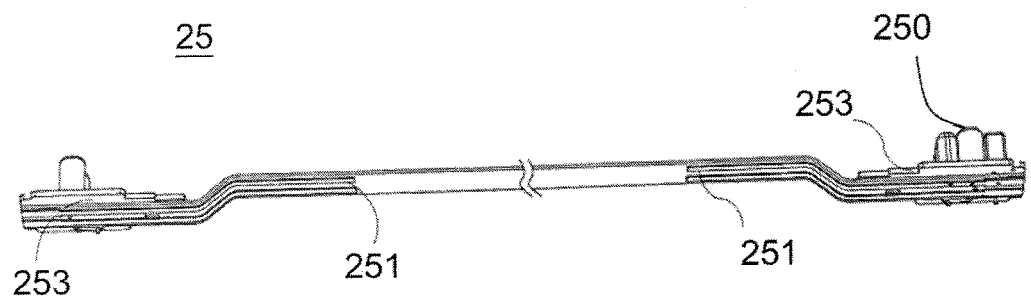
FIG. 20 is a perspective view schematically illustrating another arrangement of the circuit board assembly of FIG. 19.

Referring to FIGS. 19 and 20, in another embodiment, the LED light strip 2 and the power supply 5 may be connected by utilizing a circuit board assembly 25 configured a power supply module 250 instead of soldering bonding. The circuit board assembly 25 has a long circuit sheet 251 and a short circuit board 253 that are adhered to each other with the short circuit board 253 being adjacent to the side edge of the long circuit sheet 251. The short circuit board 253 may be provided with the power supply module 250 to form the power supply 5. The short circuit board 253 is stiffer or more rigid than the long circuit sheet 251 to be able to support the power supply module 250.

The long circuit sheet 251 may be the bendable circuit sheet of the LED light strip 2 including a wiring layer 2a as shown in FIG. 7. The wiring layer 2a of the LED light strip 2 and the power supply module 250 may be electrically connected in various manners depending on the demand in practice. As shown in FIG. 19, the power supply module 250 and the long circuit sheet 251 having the wiring layer 2a on surface are on the same side of the short circuit board 253 such that the power supply module 250 is directly connected to the long circuit sheet 251. As shown in FIG. 20, alternatively, the power supply module 250 and the long circuit sheet 251 including the wiring layer 2a on surface are on opposite sides of the short circuit board 253 such that the power supply module 250 is directly connected to the short circuit board 253 and indirectly connected to the wiring layer 2a of the LED light strip 2 by way of the short circuit board 253.

Figure 24A:
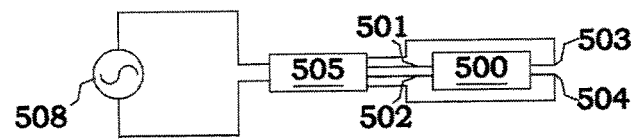
FIG. 24A is a block diagram of an exemplary power supply module in an LED tube lamp according to some embodiments of the present invention.
Figure 24B:
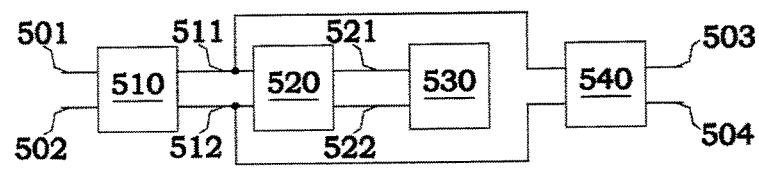
FIG. 24B is a circuit block diagram of an LED lamp according to some embodiments of the present invention.

FIG. 24A is a block diagram of a system including an LED tube lamp including a power supply module according to certain embodiments. Referring to FIG. 24A, an AC power supply 508 is used to supply an AC supply signal. A lamp driving circuit 505 receives the AC supply signal from the AC power supply 508 and then converts it into an AC driving signal. An LED tube lamp 500 receives the AC driving signal from the lamp driving circuit 505 and is thus driven to emit light. In this embodiment, the LED tube lamp 500 is power-supplied at its both end caps respectively having two pins 501 and 502 and two pins 503 and 504, which are coupled to the lamp driving circuit 505 to concurrently receive the AC driving signal to drive an LED unit (not shown) in the LED tube lamp 500 to emit light. However, in other embodiments, each end cap of the LED tube lamp could have only at least one pin for receiving the AC driving signal. That is, it is unnecessary to have two pins used in each end cap for the purpose of passing electricity through the both ends of the LED tube lamp 500. In the present embodiment, the AC power supply 508 could be commercial electricity with 100-277 voltages in frequency of 50 Hz or 60 Hz. The lamp driving circuit 505 receives the AC supply signal from the AC power supply 508 and then converts it into the AC driving signal as an external driving signal. The lamp driving circuit 505 could be an electronic ballast and is used to convert the signal of commercial electricity into high-frequency and high-voltage AC driving signal. The common types of electronic ballast, such as instant-start electronic ballast, program-start electronic ballast, and rapid-start electronic ballast, can be applied to the LED tube lamp of the present invention. In some embodiments, the voltage of the AC driving signal is bigger than 300V and prefers 400-700V with frequency being higher than 10 kHz and preferring 20-50 kHz. FIG. 24B is a block diagram of an LED lamp according to certain embodiments. Referring to FIG. 24B, the power supply module of the LED lamp summarily includes a rectifying circuit 510, a filtering circuit 520, and a rectifying circuit 540, and may comprise a portion of an LED lighting module 530. The power supply module of the LED lamp could be used in the LED tube lamp 500 with a dual-end power supply in FIG. 24A. The rectifying circuit 510 is coupled to pins 501 and 502 to receive and then rectify an external driving signal conducted by pins 501 and 502. The rectifying circuit 540 is coupled to pins 503 and 504 to receive and then rectify an external driving signal conducted by pins 503 and 504. Therefore, the power supply module of the LED lamp may include two rectifying circuits 510 and 540 configured to output a rectified signal at output terminals 511 and 512. The filtering circuit 520 is coupled to the output terminals 511 and 512 to receive and then filter the rectified signal, so as to output a filtered signal to filtering output terminals 521 and 522. The LED lighting module 530 is coupled to the filtering output terminals 521 and 522 to receive the filtered signal and thereby to drive an LED unit (not shown) in the LED lighting module 530 to emit light.

Figure 25A:
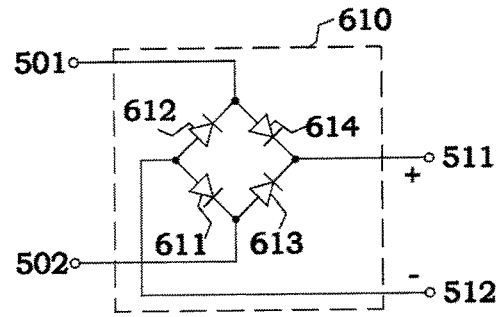
FIG. 25A is a schematic diagram of a rectifying circuit according to some embodiments of the present invention.

FIG. 25A is a schematic diagram of a rectifying circuit according to an embodiment of the present invention. Referring to FIG. 25A, a rectifying circuit 610, i.e. a bridge rectifier, includes four rectifying diodes 611, 612, 613, and 614, configured to full-wave rectify a received signal. The diode 611 has an anode connected to the output terminal 512, and a cathode connected to the pin 502. The diode 612 has an anode connected to the output terminal 512, and a cathode connected to the pin 501. The diode 613 has an anode connected to the pin 502, and a cathode connected to the output terminal 511. The diode 614 has an anode connected to the pin 501, and a cathode connected to the output terminal 511.

When the pins 501 and 502 receive an AC signal, the rectifying circuit 610 operates as follows. During the connected AC signal's positive half cycle, the AC signal is input through the pin 501, the diode 614, and the output terminal 511 in sequence, and later output through the output terminal 512, the diode 611, and the pin 502 in sequence. During the connected AC signal's negative half cycle, the AC signal is input through the pin 502, the diode 613, and the output terminal 511 in sequence, and later output through the output terminal 512, the diode 612, and the pin 501 in sequence. Therefore, during the connected AC signal's full cycle, the positive pole of the rectified signal produced by the rectifying circuit 610 keeps at the output terminal 511, and the negative pole of the rectified signal remains at the output terminal 512. Accordingly, the rectified signal produced or output by the rectifying circuit 610 is a full-wave rectified signal.

When the pins 501 and 502 are coupled to a DC power supply to receive a DC signal, the rectifying circuit 610 operates as follows. When the pin 501 is coupled to the positive end of the DC power supply and the pin 502 to the negative end of the DC power supply, the DC signal is input through the pin 501, the diode 614, and the output terminal 511 in sequence, and later output through the output terminal 512, the diode 611, and the pin 502 in sequence. When the pin 501 is coupled to the negative end of the DC power supply and the pin 502 to the positive end of the DC power supply, the DC signal is input through the pin 502, the diode 613, and the output terminal 511 in sequence, and later output through the output terminal 512, the diode 612, and the pin 501 in sequence. Therefore, no matter what the electrical polarity of the DC signal is between the pins 501 and 502, the positive pole of the rectified signal produced by the rectifying circuit 610 keeps at the output terminal 511, and the negative pole of the rectified signal remains at the output terminal 512.

Therefore, the rectifying circuit 610 in this embodiment can output or produce a proper rectified signal regardless of whether the received input signal is an AC or DC signal.

Figure 25B:
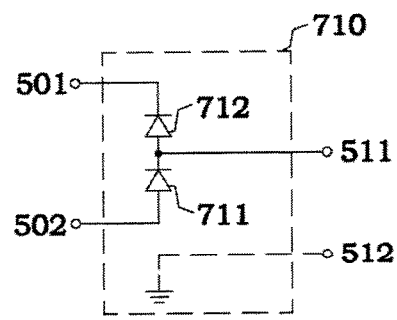
FIG. 25B is a schematic diagram of a rectifying circuit according to some embodiments of the present invention.

FIG. 25B is a schematic diagram of a rectifying circuit according to an embodiment of the present invention. Referring to FIG. 25B, a rectifying circuit 710 includes two rectifying diodes 711 and 712 configured to half-wave rectify a received signal. The diode 711 has an anode connected to the pin 502, and a cathode connected to the output terminal 511. The diode 712 has an anode connected to the output terminal 511, and a cathode connected to the pin 501. The output terminal 512 may be omitted or grounded depending on applications in practice.

Next, exemplary operation(s) of the rectifying circuit 710 is described as follows.

In one embodiment, during a received AC signal's positive half cycle, the electrical potential at the pin 501 is higher than that at the pin 502, so the diodes 711 and 712 are both in a cutoff state as being reverse-biased and make the rectifying circuit 710 stop outputting a rectified signal. During a received AC signal's negative half cycle, the electrical potential at the pin 501 is lower than that at the pin 502, so the diodes 711 and 712 are both in a conducting state as being forward-biased and allow the AC signal to be input through the diode 711 and the output terminal 511, and later to be output through the output terminal 512, a ground terminal, or another end of the LED lamp which is not directly connected to the rectifying circuit 710. Accordingly, the rectified signal produced or output by the rectifying circuit 710 is a half-wave rectified signal.

Figure 25C:
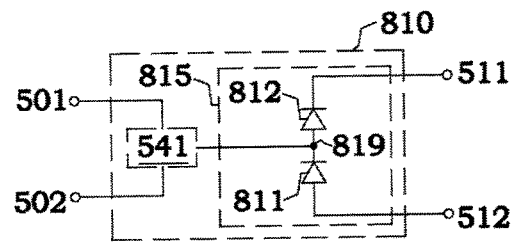
FIG. 25C is a schematic diagram of a rectifying circuit according to some embodiments of the present invention.

FIG. 25C is a schematic diagram of a rectifying circuit according to an embodiment of the present invention. Referring to FIG. 25C, a rectifying circuit 810 includes a rectifying unit 815 and a terminal adapter circuit 541. In this embodiment, the rectifying unit 815 comprises a half-wave rectifier circuit including two diodes 811 and 812, and is configured to half-wave rectification. The diode 811 has an anode connected to an output terminal 512, and a cathode connected to a half-wave node 819. The diode 812 has an anode connected to the half-wave node 819, and a cathode connected to an output terminal 511. The terminal adapter circuit 541 is coupled to the half-wave node 819 and the pins 501 and 502 to transmit a signal received at the pin 501 and/or the pin 502 to the half-wave node 819. By means of the terminal adapting function of the terminal adapter circuit 541, the rectifying circuit 810 allows of two input terminals (connected to the pins 501 and 502) and two output terminals 511 and 512.

Next, in certain embodiments, the rectifying circuit 810 operates as follows.

During a received AC signal's positive half cycle, the AC signal may be input through the pin 501 or 502, the terminal adapter circuit 541, the half-wave node 819, the diode 812, and the output terminal 511 in sequence, and later output through another end or circuit of the LED tube lamp. During a received AC signal's negative half cycle, the AC signal may be input through another end or circuit of the LED tube lamp, and later output through the output terminal 512, the diode 811, the half-wave node 819, the terminal adapter circuit 541, and the pin 501 or 502 in sequence.

It's worth noting that the terminal adapter circuit 541 may include resistor(s), capacitor(s), inductor(s), or any combination thereof, for performing at least one of functions of current/voltage limiting, types of protection, current/voltage regulation, and so forth. Descriptions of these functions are presented below.

Figure 25D:
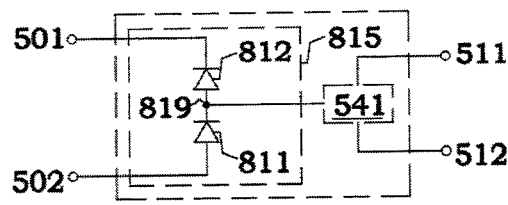
FIG. 25D is a schematic diagram of a rectifying circuit according to some embodiments of the present invention.

In practice, the rectifying unit 815 and terminal adapter circuit 541 may be interchanged in position (as shown in FIG. 25D) without altering the function of half-wave rectification. FIG. 25D is a schematic diagram of a rectifying circuit according to an embodiment of the present invention. Referring to FIG. 25D, the diode 811 has an anode connected to the pin 502 and the diode 812 has a cathode connected to the pin 501. The cathode of diode 811 and the anode of diode 812 are connected to the half-wave node 819. The terminal adapter circuit 541 is coupled to the half-wave node 819 and the output terminals 511 and 512. During a received AC signal's positive half cycle, the AC signal may be input through another end or circuit of the LED tube lamp, and later output through the output terminal 512 or 511, the terminal adapter circuit 541, the half-wave node 819, the diode 812, and the pin 501 in sequence. During a received AC signal's negative half cycle, the AC signal may be input through the pin 502, the diode 811, the half-wave node 819, the terminal adapter circuit 541, and the output terminal 511 or 512 in sequence, and later output through another end or circuit of the LED tube lamp.

It is noticeable that the terminal adapter circuit 541 in embodiments shown in FIGS. 25C and 25D may be omitted and is therefore depicted by a dotted line. If the terminal adapter circuit 541 of FIG. 25C is omitted, the pins 501 and 502 will be coupled to the half-wave node 819. If the terminal adapter circuit 541 of FIG. 25D is omitted, the output terminals 511 and 512 will be coupled to the half-wave node 819.

The rectifying circuit as shown and explained in FIGS. 25A-D can constitute or be the rectifying circuit 540 shown in FIG. 24B, as having the pins 503 and 504 for conducting instead of the pins 501 and 502.

Next, an explanation follows as to choosing embodiments and their combinations of the rectifying circuits 510 and 540, with reference to FIG. 24B.

The rectifying circuits 510 and 540 in embodiments shown in FIG. 24B may each comprise any one of the rectifying circuits in FIGS. 25A-D, and the terminal adapter circuit 541 in FIGS. 25C-D may be omitted without altering the rectification function used by an LED tube lamp. When the rectifying circuits 510 and 540 each comprise a half-wave rectifier circuit described in FIGS. 25B-D, during a received AC signal's positive or negative half cycle, the AC signal may be input to either the rectifying circuit 510 or the rectifying circuit 540, and later output from another. Further, when the rectifying circuits 510 and 540 each comprise the rectifying circuit described in FIG. 25C or 25D, or when they comprise the rectifying circuits in FIGS. 25C and 25D individually, only one terminal adapter circuit 541 may be needed for functions of current/voltage limiting, types of protection, current/voltage regulation, etc. within the rectifying circuits 510 and 540, and another terminal adapter circuit 541 within the rectifying circuit 510 or 540 can be ignored.

Figure 26A:
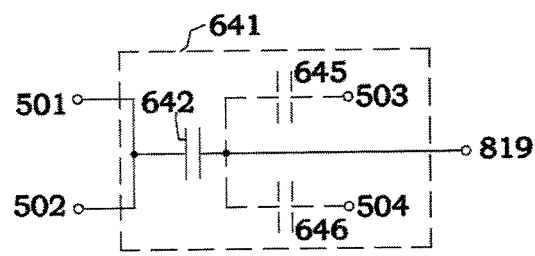
FIG. 26A is a schematic diagram of a terminal adapter circuit according to some embodiments of the present invention.

FIG. 26A is a schematic diagram of the terminal adapter circuit according to an embodiment of the present invention. Referring to FIG. 26A, a terminal adapter circuit 641 includes a capacitor 642 having an end connected to the pins 501 and 502, and the other end thereof connected to the half-wave node 819. The capacitor 642 has an equivalent impedance to an AC signal. This impedance increases as the frequency of the AC signal decreases, and decreases as the frequency increases. Therefore, the capacitor 642 in the terminal adapter circuit 641 in this embodiment works as a high-pass filter. Further, the terminal adapter circuit 641 is connected in series to an LED unit in the LED tube lamp, producing an equivalent impedance of the terminal adapter circuit 641 to perform a current/voltage limiting function on the LED unit, thereby preventing damaging of the LED unit from an excessive voltage across and/or current in the LED unit. In addition, selecting the capacitance value of the capacitor 642 according to the frequency of the AC signal can further enhance current/voltage regulation to the LED assembly.

It's worth noting that the terminal adapter circuit 641 may further include a capacitor 645 and/or capacitor 646. The capacitor 645 has an end connected to the half-wave node 819, and the other end connected to the pin 503. The capacitor 646 has an end connected to the half-wave node 819, and the other end connected to the pin 504. For example, the half-wave node 819 may be a common connection node between the capacitors 645 and 646. And the capacitor 642 acting as a current regulating capacitor is coupled to the common connection node and the pins 501 and 502. In such a structure, the series-connected capacitors 642 and 645 exist between one of the pins 501 and 502 and the pin 503, and/or the series-connected capacitors 642 and 646 exist between one of the pins 501 and 502 and the pin 504. Through equivalent impedances of series-connected capacitors, voltages from the AC signal are divided. The divided voltage on the capacitors 645 and 646 prefers 100-500V, and 300-400V would be a preferred range. Referring to FIGS. 24B and 26A, according to the ratios between equivalent impedances of the series-connected capacitors, the voltages respectively across the capacitor 642 in the rectifying circuit 510, the filtering circuit 520, and the LED lighting module 530 can be controlled to make the current flowing through an LED module in the LED lighting module 530 being limited within a current rating, and then to protect/prevent the filtering circuit 520 and the LED lighting module 530 from being damaged by excessive voltages.

Figure 26B:
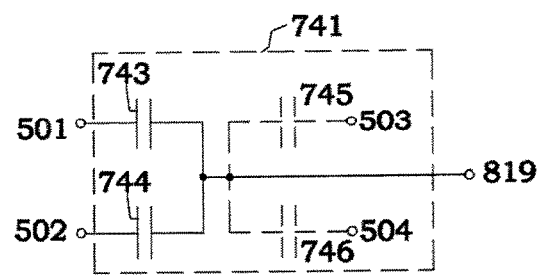
FIG. 26B is a schematic diagram of a terminal adapter circuit according to some embodiments of the present invention.

FIG. 26B is a schematic diagram of the terminal adapter circuit according to an embodiment of the present invention. Referring to FIG. 26B, a terminal adapter circuit 741 includes two capacitors 743 and 744. The capacitor 743 has an end connected to the pin 501, and the other end connected to the half-wave node 819. The capacitor 744 has an end connected to the pin 502, and the other end connected to the half-wave node 819. Compared to the terminal adapter circuit 641 in FIG. 26A, the terminal adapter circuit 741 has the capacitors 743 and 744 in place of the capacitor 642. The capacitance values of the capacitors 743 and 744 may be the same as each other, or may differ from each other depending on the magnitudes of signals received by the pins 501 and 502.

Also, the terminal adapter circuit 741 may further comprise a capacitor 745 and/or a capacitor 746, and two of them are respectively connected to the pins 503 and 504. Thus, each of the pins 501 and 502 and each of the pins 503 and 504 may be connected to a capacitor in series to achieve the functions of voltage division and other protections.

Figure 26C:
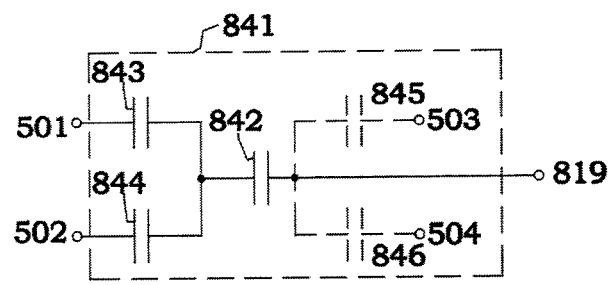
FIG. 26C is a schematic diagram of a terminal adapter circuit according to some embodiments of the present invention.

FIG. 26C is a schematic diagram of the terminal adapter circuit according to an embodiment of the present invention. Referring to FIG. 26C, a terminal adapter circuit 841 includes three capacitors 842, 843, and 844. The capacitors 842 and 843 are connected in series between the pin 501 and the half-wave node 819. The capacitors 842 and 844 are connected in series between the pin 502 and the half-wave node 819. In such a circuit structure, if any one of the capacitors 842, 843, and 844 is shorted, there is still at least one capacitor (of the other two capacitors) between the pin 501 and the half-wave node 819 and between the pin 502 and the half-wave node 819, which performs a current-limiting function. Therefore, in the event that a user accidentally gets an electric shock, this circuit structure will prevent an excessive current from flowing through and then seriously hurting the body of the user.

Likewise, the terminal adapter circuit 841 may further include a capacitor 845 and/or a capacitor 846, and two of them are respectively connected to the pins 503 and 504. Thus, each of the pins 501 and 502 and each of the pins 503 and 504 may be connected to a capacitor in series to achieve the functions of voltage division and other protections.

Figure 26D:
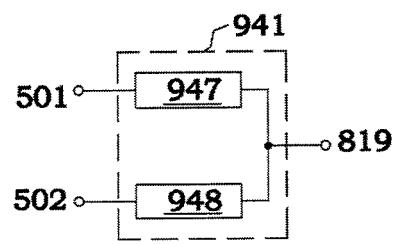
FIG. 26D is a schematic diagram of a terminal adapter circuit according to some embodiments of the present invention.

FIG. 26D is a schematic diagram of the terminal adapter circuit according to an embodiment of the present invention. Referring to FIG. 26D, a terminal adapter circuit 941 includes two fuses 947 and 948. The fuse 947 has an end connected to the pin 501, and the other end connected to the half-wave node 819. The fuse 948 has an end connected to the pin 502, and the other end connected to the half-wave node 819. With the fuses 947 and 948, when the current passing through each of the pins 501 and 502 exceeds the current threshold corresponding to the fuse 947 or 948, the corresponding fuse 947 or 948 will accordingly melt and then break the circuit to achieve overcurrent protection.

Each of the embodiments for the terminal adapter circuits coupled to the pins 501 and 502 mentioned above can be used or included in the rectifying circuit 540 when the pins 503 and 504 and the pins 501 and 502 are interchanged in position.

Capacitance values of the capacitors in the embodiments of the terminal adapter circuits shown and described above, in some embodiments for example, are desirable to be in the range of about 100 pF-100 nF. Also, a capacitor used in the embodiments may be equivalently replaced by two or more capacitors connected in series or parallel. For example, each of the capacitors 642 and 842 may be replaced by two series-connected capacitors, one having a capacitance value chosen from the range of, for example, about 1.0 nF to 2.5 nF and being 1.5 nF in some embodiments, and another having a capacitance value chosen from the range of, such as about 1.5 nF to 3.0 nF and being 2.2 nF in some embodiments.

Figure 27A:
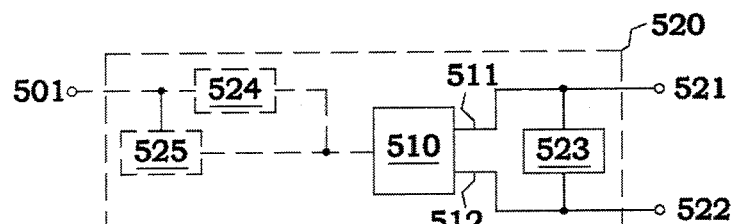
FIG. 27A is a block diagram of a filtering circuit according to some embodiments of the present invention.

FIG. 27A is a block diagram of the filtering circuit according to an embodiment of the present invention. A rectifying circuit 510 is shown in FIG. 27A for illustrating its connection with other components, without intending a filtering circuit 520 to include the rectifying circuit 510. Referring to FIG. 27A, the filtering circuit 520 includes a filtering unit 523 coupled to two rectifying output terminals 511 and 512 to receive and to filter out ripples of a rectified signal from the rectifying circuit 510. Accordingly, the waveform of a filtered signal is smoother than that of the rectified signal. The filtering circuit 520 may further include another filtering unit 524 coupled between a rectifying circuit and a pin correspondingly, for example, between the rectifying circuit 510 and the pin 501, the rectifying circuit 510 and the pin 502, the rectifying circuit 540 and the pin 503, and/or the rectifying circuit 540 and the pin 504. The filtering unit 524 is used to filter a specific frequency, for example, to filter out a specific frequency of an external driving signal. In this embodiment, the filtering unit 524 is coupled between the rectifying circuit 510 and the pin 501. The filtering circuit 520 may further include another filtering unit 525 coupled between one of the pins 501 and 502 and one of the diodes of the rectifying circuit 510, or between one of the pins 503 and 504 and one of the diodes of the rectifying circuit 540 to reduce or filter out electromagnetic interference (EMI). In this embodiment, the filtering unit 525 is coupled between the pin 501 and one of diodes of the rectifying circuit 510 (not shown in FIG. 27A). Since the filtering units 524 and 525 may be present or omitted depending on actual circumstances of their uses, they are depicted by a dotted line in FIG. 27A.

Figure 27B:
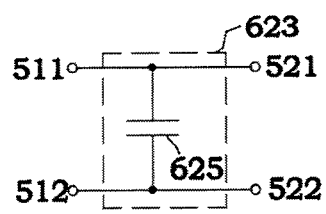
FIG. 27B is a schematic diagram of a filtering unit according to some embodiments of the present invention.

FIG. 27B is a schematic diagram of the filtering unit according to an embodiment of the present invention. Referring to FIG. 27B, a filtering unit 623 includes a capacitor 625 having an end coupled to the output terminal 511 and a filtering output terminal 521 and the other end thereof coupled to the output terminal 512 and a filtering output terminal 522, and is configured to low-pass filter a rectified signal from the output terminals 511 and 512, so as to filter out high-frequency components of the rectified signal and thereby output a filtered signal at the filtering output terminals 521 and 522.

Figure 27C:
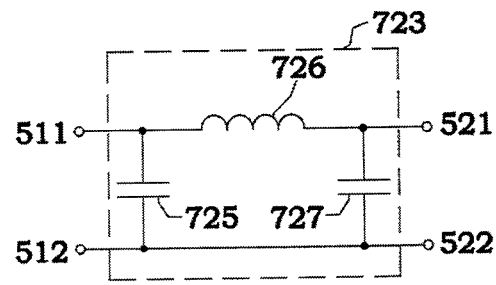
FIG. 27C is a schematic diagram of a filtering unit according to some embodiments of the present invention.

FIG. 27C is a schematic diagram of the filtering unit according to an embodiment of the present invention. Referring to FIG. 27C, a filtering unit 723 includes a pi filter circuit including a capacitor 725, an inductor 726, and a capacitor 727. As is well known, a pi filter circuit looks like the symbol π in its shape or structure. The capacitor 725 has an end connected to the output terminal 511 and coupled to the filtering output terminal 521 through the inductor 726, and has another end connected to the output terminal 512 and the filtering output terminal 522. The inductor 726 is coupled between output terminal 511 and the filtering output terminal 521. The capacitor 727 has an end connected to the filtering output terminal 521 and coupled to the output terminal 511 through the inductor 726, and has another end connected to the output terminal 512 and the filtering output terminal 522.

As seen between the output terminals 511 and 512 and the filtering output terminals 521 and 522, the filtering unit 723 compared to the filtering unit 623 in FIG. 27B additionally has an inductor 726 and a capacitor 727, which perform the function of low-pass filtering like the capacitor 725 does. Therefore, the filtering unit 723 in this embodiment compared to the filtering unit 623 in FIG. 27B has a better ability to filter out high-frequency components to output a filtered signal with a smoother waveform.

The inductance values of the inductor 726 in the embodiments mentioned above are chosen in the range of, for example in some embodiments, about 10 nH to 10 mH. And the capacitance values of the capacitors 625, 725, and 727 in the embodiments stated above are chosen in the range of, for example in some embodiments, about 100 pF to 1 uF.

Figure 27D:
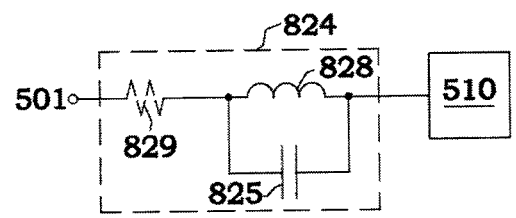
FIG. 27D is a schematic diagram of a filtering unit according to some embodiments of the present invention.

FIG. 27D is a schematic diagram of the filtering unit according to an embodiment of the present invention. Referring to FIG. 27D, a filtering unit 824 includes a capacitor 825 and an inductor 828 connected in parallel. The capacitor 825 has an end coupled to the pin 501, and the other end coupled to the output terminal 511, and is configured to high-pass filter an external driving signal input at the pin 501 so as to filter out low-frequency components of the external driving signal. The inductor 828 has an end coupled to the pin 501 and the other end coupled to the output terminal 511, and is configured to low-pass filter an external driving signal input at the pin 501 so as to filter out high-frequency components of the external driving signal. Therefore, the combination of the capacitor 825 and the inductor 828 works to present high impedance to one or more specific frequencies in an external driving signal. That is, the parallel-connected capacitor and inductor work to present a biggest equivalent impedance to a specific frequency in the external driving signal.

Through appropriately choosing a capacitance value for the capacitor 825 and an inductance value for the inductor 828, a center frequency f on the high-impedance band may be set at a specific value given by $$f = \frac{1}{2\pi\sqrt{LC}},$$

where L denotes inductance of the inductor 828 and C denotes capacitance of the capacitor 825. The center frequency in some embodiments is in the range of about 20-30 kHz, and may be in some cases about 25 kHz. And an LED lamp with filtering unit 824 is able to be certified under safety standards, for a specific center frequency, as provided by Underwriters Laboratories (UL).

It's worth noting that the filtering unit 824 may further include a resistor 829 coupled between the pin 501 and the filtering output terminal 511. In FIG. 27D, the resistor 829 is connected in series to the parallel-connected capacitor 825 and inductor 828. For example, the resistor 829 may be coupled between the pin 501 and the parallel-connected capacitor 825 and inductor 828, or may be coupled between the output terminal 511 and the parallel-connected capacitor 825 and inductor 828. In this embodiment, the resistor 829 is coupled between the pin 501 and the parallel-connected capacitor 825 and inductor 828. Further, the resistor 829 is configured to adjust the quality factor (Q) of the LC circuit comprising the capacitor 825 and the inductor 828 to make the filtering unit 824 adapting to application environments with different quality factor requirements. Since the resistor 829 is an optional component, it is depicted in a dotted line in FIG. 27D.

The capacitance values of the capacitor 825, in some embodiments, are in the range of about 10 nF-2 uF. The inductance values of the inductor 828 are smaller than 2 mH in some embodiments, and may be in some cases smaller than 1 mH. The resistance values of the resistor 829 are bigger than 50 ohms in some embodiments, and may be in some cases bigger than 500 ohms.

In addition to the filtering circuits shown and described in the above embodiments, the traditional low-pass or band-pass filters can also be used as the filtering unit in the filtering circuit for the present invention.

Figure 27E:
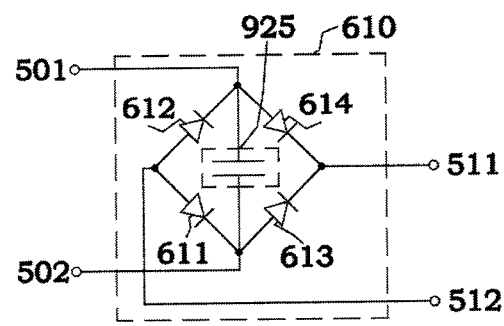
FIG. 27E is a schematic diagram of a filtering unit according to some embodiments of the present invention.

FIG. 27E is a schematic diagram of the filtering unit according to an embodiment of the present invention. Referring to FIG. 27E, in this embodiment, a filtering unit 925 is disposed in the rectifying circuit 610 as shown in FIG. 25A, and is configured for reducing the EMI (Electromagnetic interference) caused by the rectifying circuit 610 and/or other circuits. In this embodiment, the filtering unit 925 includes an EMI-reducing capacitor coupled between the pin 501 and the anode of the rectifying diode 614, and also between the pin 502 and the anode of the rectifying diode 613 to reduce the EMI associated with the positive half cycle of the AC driving signal received at the pins 501 and 502. The EMI-reducing capacitor of the filtering unit 925 is also coupled between the pin 501 and the cathode of the rectifying diode 612, and between the pin 502 and the cathode of the rectifying diode 611 to reduce the EMI associated with the negative half cycle of the AC driving signal received at the pins 501 and 502. In some embodiments, the rectifying circuit 610 includes a full-wave bridge rectifier circuit including four rectifying diodes 611, 612, 613, and 614. The full-wave bridge rectifier circuit has a first filtering node connecting the anode of the diode 613 and the cathode of the diode 611, and a second filtering node connecting the anode of the diode 614 and the cathode of the diode 612. And the EMI-reducing capacitor of the filtering unit 925 is coupled between the first filtering node and the second filtering node.

Similarly, with reference to FIGS. 25C and 26A-C, any capacitor in each of the circuits in FIGS. 26A-C is coupled between the pins 501 and 502 (or the pins 503 and 504) and any diode in FIG. 25C, so any or each capacitor in FIGS. 26A-C can work as an EMI-reducing capacitor to achieve the function of reducing EMI. For example, the rectifying circuit 510 in FIG. 24B may include a half-wave rectifier circuit including two rectifying diodes and having a half-wave node respectively connecting an anode and a cathode of the two rectifying diodes, and any or each capacitor in FIGS. 26A-C may be coupled between the half-wave node and at least one of the pins 501 and 502. And the rectifying circuit 540 in FIG. 24B may include a half-wave rectifier circuit including two rectifying diodes and having a half-wave node respectively connecting an anode and a cathode of the two rectifying diodes, and any or each capacitor in FIGS. 26A-C may be coupled between the half-wave node and at least one of the pins 503 and 504.

However, the filtering unit 925 coupled between the pins 501 and 502 is equal to make them short. Referring to FIGS. 26A-C with the state of the filtering unit 925 making the pins 501 and 502 short, one of the capacitors 645, 646, 745, 746, 845, and 846 in each corresponding embodiment can be ignored. In spite of the external AC signal being output from the pin 501 or 502, the voltage-divided function still can be achieved after omitting one of the capacitors 645, 646, 745, 746, 845, and 846 in each corresponding embodiment.

It's worth noting that the EMI-reducing capacitor in the embodiment of FIG. 27E may also act as the capacitor 825 in the filtering unit 824 shown in FIG. 27D, in combination with the inductor 828, to achieve the functions of reducing EMI and presenting high impedance to an external driving signal at specific frequencies simultaneously. For example, when the rectifying circuit includes a full-wave bridge rectifier circuit, the capacitor 825 of the filtering unit 824 may be coupled between the first filtering node and the second filtering node of the full-wave bridge rectifier circuit. When the rectifying circuit includes a half-wave rectifier circuit, the capacitor 825 of the filtering unit 824 may be coupled between the half-wave node of the half-wave rectifier circuit and at least one of the pins 501 and 502.

Figure 28A:
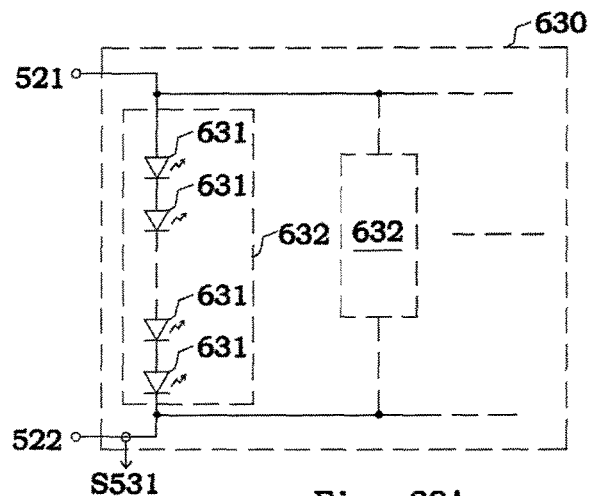
FIG. 28A is a schematic diagram of an LED module according to some embodiments of the present invention.

FIG. 28A is a schematic diagram of an LED module according to an embodiment of the present invention. Referring to FIG. 28A, an LED module 630 has an anode connected to a filtering output terminal 521, a cathode connected to a filtering output terminal 522, and includes at least one LED unit 632, such as the light source mentioned above. When two or more LED units are included, they are connected in parallel. The anode of each LED unit 632 is connected to the anode of LED module 630 to couple with the filtering output terminal 521, and the cathode of each LED unit 632 is connected to the cathode of LED module 630 to couple to the filtering output terminal 522. Each LED unit 632 includes at least one LED 631. When multiple LEDs 631 are included in an LED unit 632, they are connected in series with the anode of the first LED 631 connected to the anode of this LED unit 632 and the cathode of the first LED 631 connected to the next or second LED 631. And the anode of the last LED 631 in this LED unit 632 is connected to the cathode of a previous LED 631 and the cathode of the last LED 631 connected to the cathode of this LED unit 632.

It's noticeable that the LED module 630 may produce a current detection signal S531 reflecting the magnitude of current through the LED module 630 and being used for controlling or detecting the LED module 630.

Figure 28B:
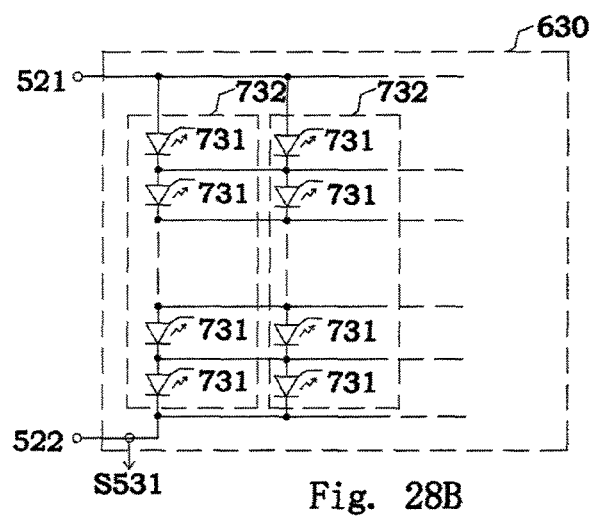
FIG. 28B is a schematic diagram of an LED module according to some embodiments of the present invention.

FIG. 28B is a schematic diagram of an LED module according to an embodiment of the present invention. Referring to FIG. 28B, an LED module 630 has an anode connected to a filtering output terminal 521, a cathode connected to a filtering output terminal 522, and includes at least two LED units 732 with the anode of each LED unit 732 connected to the anode of LED module 630 and the cathode of each LED unit 732 connected to the cathode of LED module 630. Each LED unit 732 includes at least two LEDs 731 connected in the same way as those described in FIG. 28A. For example, the anode of the first LED 731 in an LED unit 732 is connected to the anode of this LED unit 732, the cathode of the first LED 731 is connected to the anode of the next or second LED 731, and the cathode of the last LED 731 is connected to the cathode of this LED unit 732. Further, LED units 732 in an LED module 630 are connected to each other in this embodiment. All of the n-th LEDs 731 in the related LED units 732 thereof are connected by their anodes and cathodes, such as those shown in FIG. 28B but not limit to, where n is a positive integer. In this way, the LEDs in the LED module 630 of this embodiment are connected in the form of a mesh.

Compared to the embodiments of FIGS. 29A-G, the LED lighting module 530 in the above embodiments includes the LED module 630, but doesn't include a driving circuit for the LED module 630.

Also, the LED module 630 in this embodiment may produce a current detection signal S531 reflecting the magnitude of current through the LED module 630 and being used for controlling or detecting the LED module 630.

Besides, in fact, the number of LEDs 731 included by an LED unit 732 in some embodiments is in the range of 15-25, and may be in some embodiments in the range of 18-22.

Figure 28C:
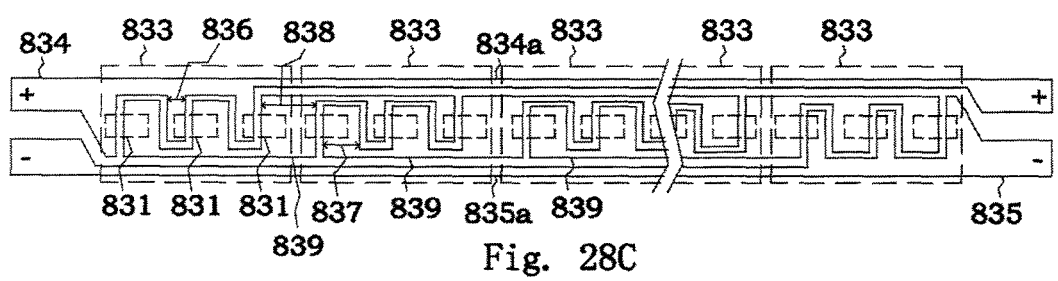
FIG. 28C is a plan view of a circuit layout of the LED module according to some embodiments of the present invention.

FIG. 28C is a plan view of a circuit layout of the LED module according to an embodiment of the present invention. Referring to FIG. 28C, in this embodiment, multiple LEDs 831 are connected in the same way as described in FIG. 28B, and three LED units are assumed in the LED module 630 and described as follows for illustration. A positive conductive line 834 and a negative conductive line 835 are to receive a driving signal for supplying power to the LEDs 831. For example, the positive conductive line 834 may be coupled to the filtering output terminal 521 of the filtering circuit 520 described above, and the negative conductive line 835 coupled to the filtering output terminal 522 of the filtering circuit 520 to receive a filtered signal. For the convenience of illustration, all three of the n-th LEDs 831 in the three related LED units thereof are grouped as an LED set 833 in FIG. 28C.

The positive conductive line 834 connects the three first LEDs 831 of the leftmost three related LED units thereof, that is, connects the anodes on the left sides of the three first LEDs 831 as shown in the leftmost LED set 833 of FIG. 28C. The negative conductive line 835 connects the three last LEDs 831 of the rightmost three corresponding LED units thereof, that is, connects the cathodes on the right sides of the three last LEDs 831 as shown in the rightmost LED set 833 of FIG. 28C. The cathodes of the three first LEDs 831, the anodes of the three last LEDs 831, and the anodes and cathodes of all the remaining LEDs 831 are connected by conductive lines or parts 839.

For example, the anodes of the three LEDs 831 in the leftmost LED set 833 may be connected together by the positive conductive line 834, and their cathodes may be connected together by a leftmost conductive part 839. The anodes of the three LEDs 831 in the second leftmost LED set 833 are also connected together by the leftmost conductive part 839, whereas their cathodes are connected together by a second leftmost conductive part 839. Since the cathodes of the three LEDs 831 in the leftmost LED set 833 and the anodes of the three LEDs 831 in the second leftmost LED set 833 are connected together by the same leftmost conductive part 839, the cathode of the first LED 831 in each of the three LED units is connected to the anode of the next or second LED 831. As for the remaining LEDs 831 are also connected in the same way. Accordingly, all the LEDs 831 of the three LED units are connected to form the mesh as shown in FIG. 28B.

It's worth noting that, in this embodiment, the length 836 of a portion of each conductive part 839 that connects to the anode of an LED 831 is smaller than the length 837 of another portion of each conductive part 839 that connects to the cathode of an LED 831. This makes the area of the latter portion connecting to the cathode larger than that of the former portion connecting to the anode. Moreover, the length 837 may be smaller than a length 838 of a portion of each conductive part 839 that connects the cathode of an LED 831 and the anode of the next LED 831 in two adjacent LED sets 833. This makes the area of the portion of each conductive part 839 that connects a cathode and an anode larger than the area of any other portion of each conductive part 839 that connects to only a cathode or an anode of an LED 831. Due to the length differences and area differences, this layout structure improves heat dissipation of the LEDs 831.

In some embodiments, the positive conductive line 834 includes a lengthwise portion 834a, and the negative conductive line 835 includes a lengthwise portion 835a, which are conducive to make the LED module have a positive "+" connective portion and a negative "−" connective portion at each of the two ends of the LED module, as shown in FIG. 28C. Such a layout structure allows for coupling any of other circuits of the power supply module of the LED lamp, including e.g. the filtering circuit 520 and the rectifying circuits 510 and 540, to the LED module through the positive connective portion and/or the negative connective portion at each or both ends of the LED lamp. Thus the layout structure increases the flexibility in arranging actual circuits in the LED lamp.

Figure 28D:
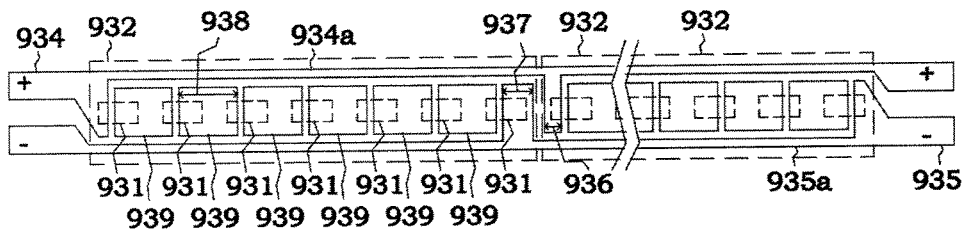
FIG. 28D is a plan view of a circuit layout of the LED module according to some embodiments of the present invention.

FIG. 28D is a plan view of a circuit layout of the LED module according to another embodiment of the present invention. Referring to FIG. 28D, in this embodiment, multiple LEDs 931 are connected in the same way as described in FIG. 28A, and three LED units each including 7 LEDs 931 are assumed in the LED module 630 and described as follows for illustration. A positive conductive line 934 and a negative conductive line 935 are to receive a driving signal for supplying power to the LEDs 931. For example, the positive conductive line 934 may be coupled to the filtering output terminal 521 of the filtering circuit 520 described above, and the negative conductive line 935 is coupled to the filtering output terminal 522 of the filtering circuit 520, so as to receive a filtered signal. For the convenience of illustration, all seven LEDs 931 of each of the three LED units are grouped as an LED set 932 in FIG. 28D. Thus there are three LED sets 932 corresponding to the three LED units.

The positive conductive line 934 connects the anode on the left side of the first or leftmost LED 931 of each of the three LED sets 932. The negative conductive line 935 connects the cathode on the right side of the last or rightmost LED 931 of each of the three LED sets 932. In each LED set 932 of each two adjacent LEDs 931, the LED 931 on the left has a cathode connected by a conductive part 939 to an anode of the LED 931 on the right. By such a layout, the LEDs 931 of each LED set 932 are connected in series.

It's also worth noting that the conductive part 939 may be used to connect an anode and a cathode of two consecutive LEDs 931 respectively. The negative conductive line 935 connects the cathode of the last or rightmost LED 931 of each of the three LED sets 932. And the positive conductive line 934 connects the anode of the first or leftmost LED 931 of each of the three LED sets 932. Therefore, as shown in FIG. 28D, the length of the conductive part 939 is larger than that of the portion of negative conductive line 935 connecting to a cathode, which length is then larger than that of the portion of positive conductive line 934 connecting to an anode. For example, the length 938 of the conductive part 939 may be larger than the length 937 of the portion of negative conductive line 935 connecting a cathode of an LED 931, which length 937 is then larger than the length 936 of the portion of the positive conductive line 934 connecting an anode of an LED 931. Such a layout structure improves heat dissipation of the LEDs 931 in LED module 630.

The positive conductive line 934 may include a lengthwise portion 934a, and the negative conductive line 935 may include a lengthwise portion 935a, which are conducive to make the LED module have a positive "+" connective portion and a negative "−" connective portion at each of the two ends of the LED module, as shown in FIG. 28D. Such a layout structure allows for coupling any of other circuits of the power supply module of the LED lamp, including e.g. the filtering circuit 520 and the rectifying circuits 510 and 540, to the LED module through the positive connective portion 934a and/or the negative connective portion 935a at each or both ends of the LED lamp. Thus the layout structure increases the flexibility in arranging actual circuits in the LED lamp.

Further, the circuit layouts as shown in FIGS. 28C and 28D may be implemented with a bendable circuit sheet or substrate, which may even be called flexible circuit board depending on its specific definition used. For example, the bendable circuit sheet may comprise one conductive layer where the positive conductive line 834, the positive lengthwise portion 834a, the negative conductive line 835, the negative lengthwise portion 835a, and the conductive parts 839 shown in FIG. 28C, and the positive conductive line 934, the positive lengthwise portion 934a, the negative conductive line 935, the negative lengthwise portion 935a, and the conductive parts 939 shown in FIG. 28D are formed by the method of etching.

Figure 28E:
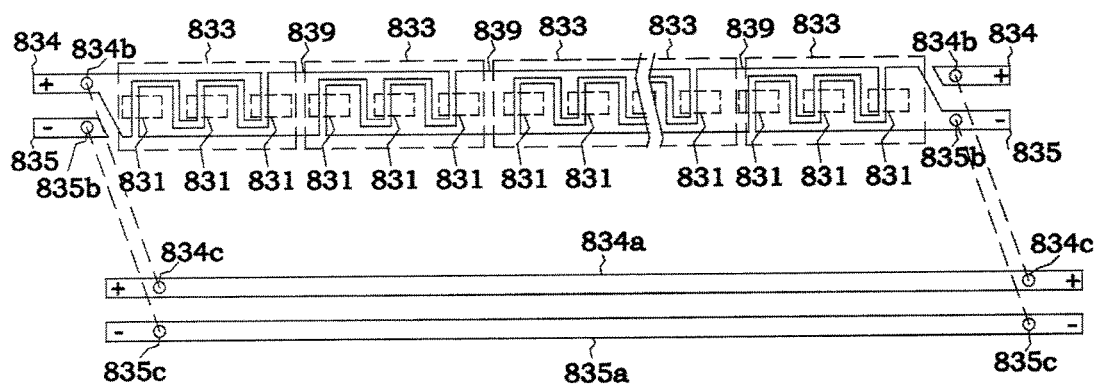
FIG. 28E is a plan view of a circuit layout of the LED module according to some embodiments of the present invention.

FIG. 28E is a plan view of a circuit layout of the LED module according to another embodiment of the present invention. The layout structures of the LED module in FIGS. 28E and 28C correspond to the same way of connecting the LEDs 831 as those shown in FIG. 28B, but the layout structure in FIG. 28E comprises two conductive layers instead of only one conductive layer for forming the circuit layout as shown in FIG. 28C. Referring to FIG. 28E, the main difference from the layout in FIG. 28C is that the positive conductive line 834 and the negative conductive line 835 have a lengthwise portion 834a and a lengthwise portion 835a, respectively, that are formed in a second conductive layer instead. The difference is elaborated as follows.

Referring to FIGS. 28E and 23, the bendable circuit sheet of the LED module comprises a first conductive layer 2a and a second conductive layer 2c electrically insulated from each other by a dielectric layer 2b (not shown). Of the two conductive layers, the positive conductive line 834, the negative conductive line 835, and the conductive parts 839 in FIG. 28E are formed in first conductive layer 2a by the method of etching for electrically connecting the plurality of LED components 831 e.g. in a form of a mesh, whereas the positive lengthwise portion 834a and the negative lengthwise portion 835a are formed in second conductive layer 2c by etching for electrically connecting (the filtering output terminal of) the filtering circuit. Further, the positive conductive line 834 and the negative conductive line 835 in the first conductive layer 2a have via points 834b and via points 835b, respectively, for connecting to second conductive layer 2c. And the positive lengthwise portion 834a and the negative lengthwise portion 835a in second conductive layer 2c have via points 834c and via points 835c, respectively. The via points 834b are positioned corresponding to the via points 834c, for connecting the positive conductive line 834 and the positive lengthwise portion 834a. The via points 835b are positioned corresponding to the via points 835c, for connecting the negative conductive line 835 and the negative lengthwise portion 835a. An exemplary desirable way of connecting the two conductive layers is to form a hole connecting each via point 834b and a corresponding via point 834c, and to form a hole connecting each via point 835b and a corresponding via point 835c, with the holes extending through the two conductive layers and the dielectric layer in-between. And the positive conductive line 834 and the positive lengthwise portion 834a can be electrically connected by welding metallic part(s) through the connecting hole(s), and the negative conductive line 835 and the negative lengthwise portion 835a can be electrically connected by welding metallic part(s) through the connecting hole(s).

Similarly, the layout structure of the LED module in FIG. 28D may alternatively have the positive lengthwise portion 934a and the negative lengthwise portion 935a disposed in a second conductive layer to constitute a two-layered layout structure.

It's worth noting that the thickness of the second conductive layer of a two-layered bendable circuit sheet is, in some embodiments, larger than that of the first conductive layer in order to reduce the voltage drop or loss along each of the positive lengthwise portion and the negative lengthwise portion disposed in the second conductive layer. Compared to a one-layered bendable circuit sheet, since a positive lengthwise portion and a negative lengthwise portion are disposed in a second conductive layer in a two-layer bendable circuit sheet, the width (between two lengthwise sides) of the two-layered bendable circuit sheet is or can be reduced. On the same fixture or plate in a production process, the number of bendable circuit sheets each with a shorter width that can be laid together at most is larger than the number of bendable circuit sheets each with a longer width that can be laid together at most. Thus adopting a bendable circuit sheet with a shorter width can increase the efficiency of production of the LED module. And reliability in the production process, such as the accuracy of welding position when welding (materials on) the LED components, can also be improved, because a two-layer bendable circuit sheet can better maintain its shape.

As a variant of the above embodiments, a type of LED tube lamp is provided that has at least some of the electronic components of its power supply module disposed on a light strip of the LED tube lamp. For example, the technique of printed electronic circuit (PEC) can be used to print, insert, or embed at least some of the electronic components onto the light strip.

In one embodiment, all electronic components of the power supply module are disposed on the light strip. The production process may include or proceed with the following steps: preparation of the circuit substrate (e.g. preparation of a flexible printed circuit board); ink jet printing of metallic nano-ink; ink jet printing of active and passive components (as of the power supply module); drying/sintering; ink jet printing of interlayer bumps; spraying of insulating ink; ink jet printing of metallic nano-ink; ink jet printing of active and passive components (to sequentially form the included layers); spraying of surface bond pad(s); and spraying of solder resist against LED components.

In certain embodiments, if all electronic components of the power supply module are disposed on the LED light strip, electrical connection between the terminal pins of the LED tube lamp and the light strip may be achieved by connecting the pins to conductive lines which are welded with ends of the light strip. In this case, another substrate for supporting the power supply module is not required, thereby allowing of an improved design or arrangement in the end cap(s) of the LED tube lamp. In some embodiments, (components of) the power supply module are disposed at two ends of the light strip, in order to significantly reduce the impact of heat generated from the power supply module's operations on the LED components. Since no substrate other than the light strip is used to support the power supply module in this case, the total amount of welding or soldering can be significantly reduced, improving the general reliability of the power supply module.

Another case is that some of all electronic components of the power supply module, such as some resistors and/or smaller size capacitors, are printed onto the light strip, and some bigger size components, such as some inductors and/or electrolytic capacitors, are disposed in the end cap(s). The production process of the light strip in this case may be the same as that described above. And in this case disposing some of all electronic components on the light strip is conducive to achieving a reasonable layout of the power supply module in the LED tube lamp, which may allow of an improved design in the end cap(s).

As a variant embodiment of the above, electronic components of the power supply module may be disposed on the LED light strip by a method of embedding or inserting, e.g. by embedding the components onto a bendable or flexible light strip. In some embodiments, this embedding may be realized by a method using copper-clad laminates (CCL) for forming a resistor or capacitor; a method using ink related to silkscreen printing; or a method of ink jet printing to embed passive components, wherein an ink jet printer is used to directly print inks to constitute passive components and related functionalities to intended positions on the light strip. Then through treatment by ultraviolet (UV) light or drying/sintering, the light strip is formed where passive components are embedded. The electronic components embedded onto the light strip include for example resistors, capacitors, and inductors. In other embodiments, active components also may be embedded. Through embedding some components onto the light strip, a reasonable layout of the power supply module can be achieved to allow of an improved design in the end cap(s), because the surface area on a printed circuit board used for carrying components of the power supply module is reduced or smaller, and as a result the size, weight, and thickness of the resulting printed circuit board for carrying components of the power supply module is also smaller or reduced. Also in this situation since welding points on the printed circuit board for welding resistors and/or capacitors if they were not to be disposed on the light strip are no longer used, the reliability of the power supply module is improved, in view of the fact that these welding points are most liable to (cause or incur) faults, malfunctions, or failures. Further, the length of conductive lines needed for connecting components on the printed circuit board is therefore also reduced, which allows of a more compact layout of components on the printed circuit board and thus improving the functionalities of these components.

Next, methods to produce embedded capacitors and resistors are explained as follows.

Usually, methods for manufacturing embedded capacitors employ or involve a concept called distributed or planar capacitance. The manufacturing process may include the following step(s). On a substrate of a copper layer a very thin insulation layer is applied or pressed, which is then generally disposed between a pair of layers including a power conductive layer and a ground layer. The very thin insulation layer makes the distance between the power conductive layer and the ground layer very short. A capacitance resulting from this structure can also be realized by a conventional technique of a plated-through hole. Basically, this step is used to create this structure comprising a big parallel-plate capacitor on a circuit substrate.

Of products of high electrical capacity, certain types of products employ distributed capacitances, and other types of products employ separate embedded capacitances. Through putting or adding a high dielectric-constant material, such as barium titanate, into the insulation layer, the high electrical capacity is achieved.

A usual method for manufacturing embedded resistors employ conductive or resistive adhesive. This may include, for example, a resin to which conductive carbon or graphite is added, which may be used as an additive or filler. The additive resin is silkscreen printed to an object location, and is then after treatment laminated inside the circuit board. The resulting resistor is connected to other electronic components through plated-through holes or microvias. Another method is called Ohmega-Ply, by which a two metallic layer structure of a copper layer and a thin nickel alloy layer constitutes a layer resistor relative to a substrate. Then through etching the copper layer and nickel alloy layer, different types of nickel alloy resistors with copper terminals can be formed. These types of resistor are each laminated inside the circuit board.

In an embodiment, conductive wires/lines are directly printed in a linear layout on an inner surface of the LED glass lamp tube, with LED components directly attached on the inner surface and electrically connected by the conductive wires. In some embodiments, the LED components in the form of chips are directly attached over the conductive wires on the inner surface, and connective points are at terminals of the wires for connecting the LED components and the power supply module. After being attached, the LED chips may have fluorescent powder applied or dropped thereon, for producing white light or light of other color by the operating LED tube lamp.

In some embodiments, luminous efficacy of the LED or LED component is 80 lm/W or above, and in some embodiments, it may be 120 lm/W or above. Certain more optimal embodiments may include a luminous efficacy of the LED or LED component of 160 lm/W or above. White light emitted by an LED component in the invention may be produced by mixing fluorescent powder with the monochromatic light emitted by a monochromatic LED chip. The white light in its spectrum has major wavelength ranges of 430-460 nm and 550-560 nm, or major wavelength ranges of 430-460 nm, 540-560 nm, and 620-640 nm.

Figure 29A:
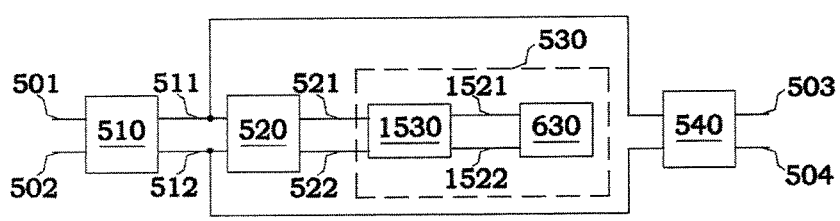
FIG. 29A is a block diagram of an exemplary power supply module in an LED lamp according to some embodiments of the present invention.

FIG. 29A is a block diagram of a power supply module in an LED lamp according to an embodiment of the present invention. As shown in FIG. 29A, the power supply module of the LED lamp includes two rectifying circuits 510 and 540, a filtering circuit 520, and a driving circuit 1530. In this embodiment, a driving circuit 1530 and an LED module 630 compose the LED lighting module 530. The driving circuit 1530 comprises a DC-to-DC converter circuit, and is coupled to the filtering output terminals 521 and 522 to receive a filtered signal and then perform power conversion for converting the filtered signal into a driving signal at the driving output terminals 1521 and 1522. The LED module 630 is coupled to the driving output terminals 1521 and 1522 to receive the driving signal for emitting light. In some embodiments, the current of LED module 630 is stabilized at an objective current value. Descriptions of this LED module 630 are the same as those provided above with reference to FIGS. 28A-D.

Figure 29B:
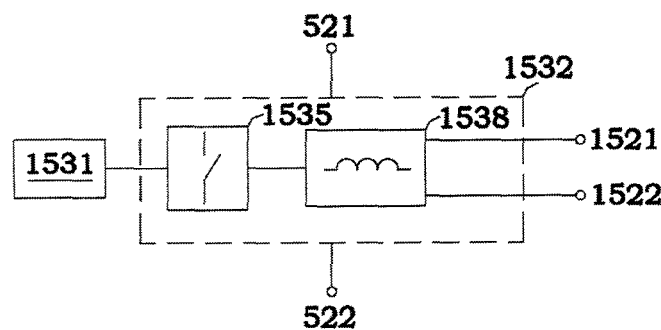
FIG. 29B is a block diagram of a driving circuit according to some embodiments of the present invention.

FIG. 29B is a block diagram of the driving circuit according to an embodiment of the present invention. Referring to FIG. 29B, a driving circuit includes a controller 1531, and a conversion circuit 1532 for power conversion based on a current source, for driving the LED module to emit light. The conversion circuit 1532 includes a switching circuit 1535 and an energy storage circuit 1538. And the conversion circuit 1532 is coupled to the filtering output terminals 521 and 522 to receive and then convert a filtered signal, under the control by the controller 1531, into a driving signal at the driving output terminals 1521 and 1522 for driving the LED module. Under the control by the controller 1531, the driving signal output by the conversion circuit 1532 comprises a steady current, making the LED module emitting steady light.

Figure 29C:
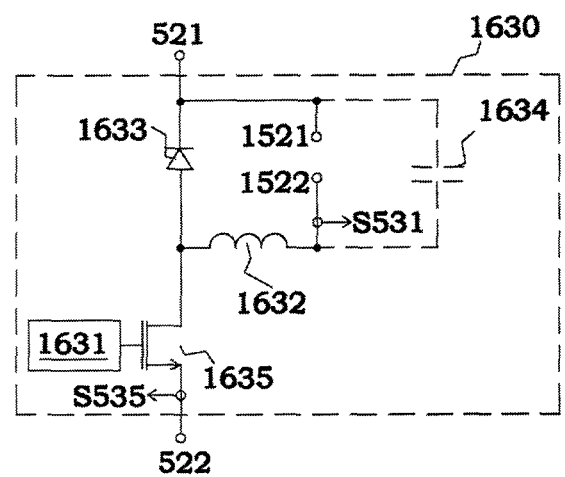
FIG. 29C is a schematic diagram of a driving circuit according to some embodiments of the present invention.

FIG. 29C is a schematic diagram of the driving circuit according to an embodiment of the present invention. Referring to FIG. 29C, a driving circuit 1630 in this embodiment comprises a buck DC-to-DC converter circuit having a controller 1631 and a converter circuit. The converter circuit includes an inductor 1632, a diode 1633 for "freewheeling" of current, a capacitor 1634, and a switch 1635. The driving circuit 1630 is coupled to the filtering output terminals 521 and 522 to receive and then convert a filtered signal into a driving signal for driving an LED module connected between the driving output terminals 1521 and 1522.

In this embodiment, the switch 1635 comprises a metal-oxide-semiconductor field-effect transistor (MOSFET) and has a first terminal coupled to the anode of freewheeling diode 1633, a second terminal coupled to the filtering output terminal 522, and a control terminal coupled to the controller 1631 used for controlling current conduction or cutoff between the first and second terminals of switch 1635. The driving output terminal 1521 is connected to the filtering output terminal 521, and the driving output terminal 1522 is connected to an end of the inductor 1632, which has another end connected to the first terminal of switch 1635. The capacitor 1634 is coupled between the driving output terminals 1521 and 1522 to stabilize the voltage between the driving output terminals 1521 and 1522. The freewheeling diode 1633 has a cathode connected to the driving output terminal 1521.

Next, a description follows as to an exemplary operation of the driving circuit 1630.

The controller 1631 is configured for determining when to turn the switch 1635 on (in a conducting state) or off (in a cutoff state) according to a current detection signal S535 and/or a current detection signal S531. For example, in some embodiments, the controller 1631 is configured to control the duty cycle of switch 1635 being on and switch 1635 being off in order to adjust the size or magnitude of the driving signal. The current detection signal S535 represents the magnitude of current through the switch 1635. The current detection signal S531 represents the magnitude of current through the LED module coupled between the driving output terminals 1521 and 1522. According to any of current detection signal S535 and current detection signal S531, the controller 1631 can obtain information on the magnitude of power converted by the converter circuit. When the switch 1635 is switched on, a current of a filtered signal is input through the filtering output terminal 521, and then flows through the capacitor 1634, the driving output terminal 1521, the LED module, the inductor 1632, and the switch 1635, and then flows out from the filtering output terminal 522. During this flowing of current, the capacitor 1634 and the inductor 1632 are performing storing of energy. On the other hand, when the switch 1635 is switched off, the capacitor 1634 and the inductor 1632 perform releasing of stored energy by a current flowing from the freewheeling diode 1633 to the driving output terminal 1521 to make the LED module continuing to emit light.

It's worth noting that the capacitor 1634 is an optional element, so it can be omitted and is thus depicted in a dotted line in FIG. 29C. In some application environments, the natural characteristic of an inductor to oppose instantaneous change in electric current passing through the inductor may be used to achieve the effect of stabilizing the current through the LED module, thus omitting the capacitor 1634.

Figure 29D:
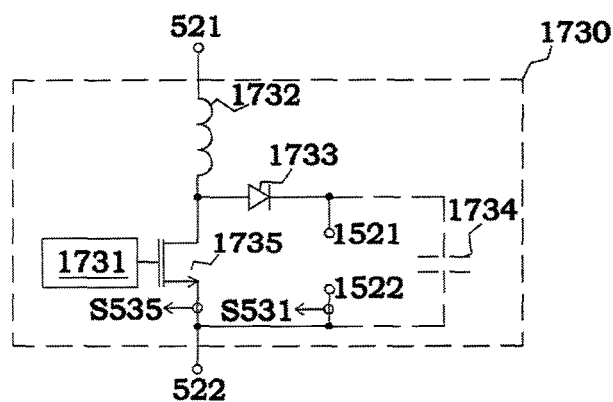
FIG. 29D is a schematic diagram of a driving circuit according to some embodiments of the present invention.

FIG. 29D is a schematic diagram of the driving circuit according to an embodiment of the present invention. Referring to FIG. 29D, a driving circuit 1730 in this embodiment comprises a boost DC-to-DC converter circuit having a controller 1731 and a converter circuit. The converter circuit includes an inductor 1732, a diode 1733 for "freewheeling" of current, a capacitor 1734, and a switch 1735. The driving circuit 1730 is configured to receive and then convert a filtered signal from the filtering output terminals 521 and 522 into a driving signal for driving an LED module coupled between the driving output terminals 1521 and 1522.

The inductor 1732 has an end connected to the filtering output terminal 521, and another end connected to the anode of freewheeling diode 1733 and a first terminal of the switch 1735, which has a second terminal connected to the filtering output terminal 522 and the driving output terminal 1522. The freewheeling diode 1733 has a cathode connected to the driving output terminal 1521. And the capacitor 1734 is coupled between the driving output terminals 1521 and 1522.

The controller 1731 is coupled to a control terminal of switch 1735, and is configured for determining when to turn the switch 1735 on (in a conducting state) or off (in a cutoff state), according to a current detection signal S535 and/or a current detection signal S531. When the switch 1735 is switched on, a current of a filtered signal is input through the filtering output terminal 521, and then flows through the inductor 1732 and the switch 1735, and then flows out from the filtering output terminal 522. During this flowing of current, the current through the inductor 1732 increases with time, with the inductor 1732 being in a state of storing energy, while the capacitor 1734 enters a state of releasing energy, making the LED module continuing to emit light. On the other hand, when the switch 1735 is switched off, the inductor 1732 enters a state of releasing energy as the current through the inductor 1732 decreases with time. In this state, the current through the inductor 1732 then flows through the freewheeling diode 1733, the capacitor 1734, and the LED module, while the capacitor 1734 enters a state of storing energy.

It's worth noting that the capacitor 1734 is an optional element, so it can be omitted and is thus depicted in a dotted line in FIG. 29D. When the capacitor 1734 is omitted and the switch 1735 is switched on, the current of inductor 1732 does not flow through the LED module, making the LED module not emit light; but when the switch 1735 is switched off, the current of inductor 1732 flows through the freewheeling diode 1733 to reach the LED module, making the LED module emit light. Therefore, by controlling the time that the LED module emits light, and the magnitude of current through the LED module, the average luminance of the LED module can be stabilized to be above a defined value, thus also achieving the effect of emitting a steady light.

Figure 29E:
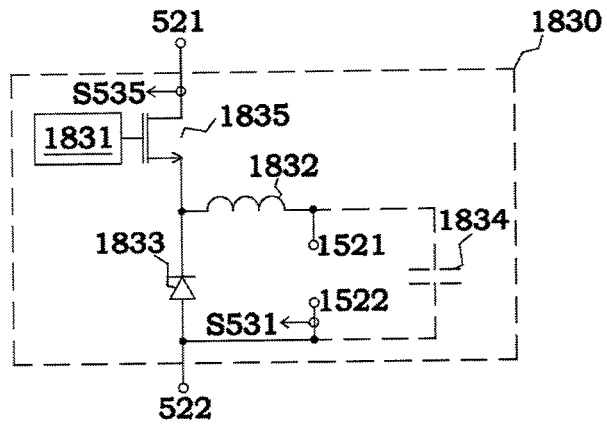
FIG. 29E is a schematic diagram of a driving circuit according to some embodiments of the present invention.

FIG. 29E is a schematic diagram of the driving circuit according to an embodiment of the present invention. Referring to FIG. 29E, a driving circuit 1830 in this embodiment comprises a buck DC-to-DC converter circuit having a controller 1831 and a converter circuit. The converter circuit includes an inductor 1832, a diode 1833 for "freewheeling" of current, a capacitor 1834, and a switch 1835. The driving circuit 1830 is coupled to the filtering output terminals 521 and 522 to receive and then convert a filtered signal into a driving signal for driving an LED module connected between the driving output terminals 1521 and 1522.

The switch 1835 has a first terminal coupled to the filtering output terminal 521, a second terminal coupled to the cathode of freewheeling diode 1833, and a control terminal coupled to the controller 1831 to receive a control signal from the controller 1831 for controlling current conduction or cutoff between the first and second terminals of the switch 1835. The anode of freewheeling diode 1833 is connected to the filtering output terminal 522 and the driving output terminal 1522. The inductor 1832 has an end connected to the second terminal of switch 1835, and another end connected to the driving output terminal 1521. The capacitor 1834 is coupled between the driving output terminals 1521 and 1522 to stabilize the voltage between the driving output terminals 1521 and 1522.

The controller 1831 is configured for controlling when to turn the switch 1835 on (in a conducting state) or off (in a cutoff state) according to a current detection signal S535 and/or a current detection signal S531. When the switch 1835 is switched on, a current of a filtered signal is input through the filtering output terminal 521, and then flows through the switch 1835, the inductor 1832, and the driving output terminals 1521 and 1522, and then flows out from the filtering output terminal 522. During this flowing of current, the current through the inductor 1832 and the voltage of the capacitor 1834 both increase with time, so the inductor 1832 and the capacitor 1834 are in a state of storing energy. On the other hand, when the switch 1835 is switched off, the inductor 1832 is in a state of releasing energy and thus the current through it decreases with time. In this case, the current through the inductor 1832 circulates through the driving output terminals 1521 and 1522, the freewheeling diode 1833, and back to the inductor 1832.

It's worth noting that the capacitor 1834 is an optional element, so it can be omitted and is thus depicted in a dotted line in FIG. 29E. When the capacitor 1834 is omitted, no matter whether the switch 1835 is turned on or off, the current through the inductor 1832 will flow through the driving output terminals 1521 and 1522 to drive the LED module to continue emitting light.

Figure 29F:
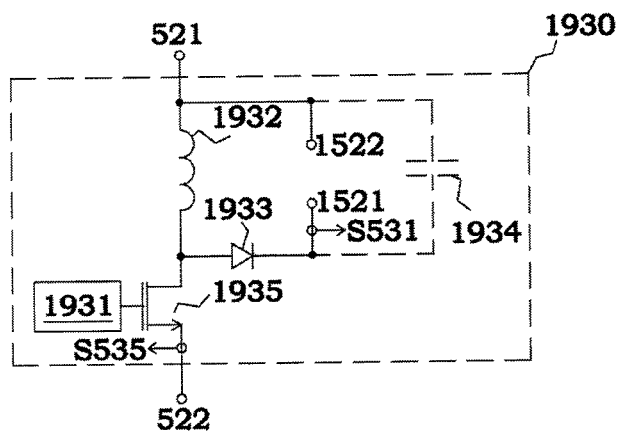
FIG. 29F is a schematic diagram of a driving circuit according to some embodiments of the present invention.

FIG. 29F is a schematic diagram of the driving circuit according to an embodiment of the present invention. Referring to FIG. 29F, a driving circuit 1930 in this embodiment comprises a buck DC-to-DC converter circuit having a controller 1931 and a converter circuit. The converter circuit includes an inductor 1932, a diode 1933 for "freewheeling" of current, a capacitor 1934, and a switch 1935. The driving circuit 1930 is coupled to the filtering output terminals 521 and 522 to receive and then convert a filtered signal into a driving signal for driving an LED module connected between the driving output terminals 1521 and 1522.

The inductor 1932 has an end connected to the filtering output terminal 521 and the driving output terminal 1522, and another end connected to a first end of the switch 1935. The switch 1935 has a second end connected to the filtering output terminal 522, and a control terminal connected to controller 1931 to receive a control signal from controller 1931 for controlling current conduction or cutoff of the switch 1935. The freewheeling diode 1933 has an anode coupled to a node connecting the inductor 1932 and the switch 1935, and a cathode coupled to the driving output terminal 1521. The capacitor 1934 is coupled to the driving output terminals 1521 and 1522 to stabilize the driving of the LED module coupled between the driving output terminals 1521 and 1522.

The controller 1931 is configured for controlling when to turn the switch 1935 on (in a conducting state) or off (in a cutoff state) according to a current detection signal S531 and/or a current detection signal S535. When the switch 1935 is turned on, a current is input through the filtering output terminal 521, and then flows through the inductor 1932 and the switch 1935, and then flows out from the filtering output terminal 522. During this flowing of current, the current through the inductor 1932 increases with time, so the inductor 1932 is in a state of storing energy; but the voltage of the capacitor 1934 decreases with time, so the capacitor 1934 is in a state of releasing energy to keep the LED module continuing to emit light. On the other hand, when the switch 1935 is turned off, the inductor 1932 is in a state of releasing energy and its current decreases with time. In this case, the current through the inductor 1932 circulates through the freewheeling diode 1933, the driving output terminals 1521 and 1522, and back to the inductor 1932. During this circulation, the capacitor 1934 is in a state of storing energy and its voltage increases with time.

It's worth noting that the capacitor 1934 is an optional element, so it can be omitted and is thus depicted in a dotted line in FIG. 29F. When the capacitor 1934 is omitted and the switch 1935 is turned on, the current through the inductor 1932 doesn't flow through the driving output terminals 1521 and 1522, thereby making the LED module not emit light. On the other hand, when the switch 1935 is turned off, the current through the inductor 1932 flows through the freewheeling diode 1933 and then the LED module to make the LED module emit light. Therefore, by controlling the time that the LED module emits light, and the magnitude of current through the LED module, the average luminance of the LED module can be stabilized to be above a defined value, thus also achieving the effect of emitting a steady light.

Figure 29G:
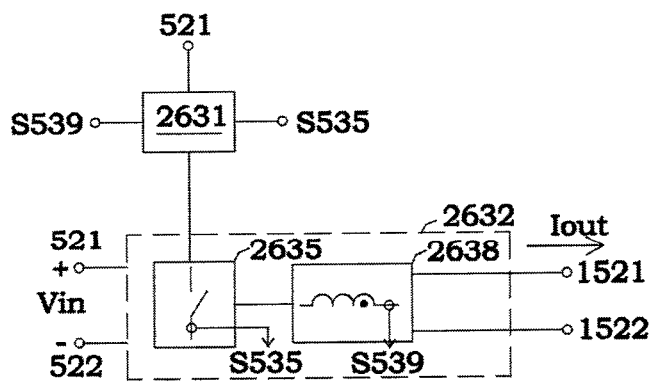
FIG. 29G is a block diagram of a driving circuit according to some embodiments of the present invention.

FIG. 29G is a block diagram of the driving circuit according to an embodiment of the present invention. Referring to FIG. 29G, the driving circuit includes a controller 2631, and a conversion circuit 2632 for power conversion based on an adjustable current source, for driving the LED module to emit light. The conversion circuit 2632 includes a switching circuit 2635 and an energy storage circuit 2638. And the conversion circuit 2632 is coupled to the filtering output terminals 521 and 522 to receive and then convert a filtered signal, under the control by the controller 2631, into a driving signal at the driving output terminals 1521 and 1522 for driving the LED module. The controller 2631 is configured to receive a current detection signal S535 and/or a current detection signal S539 for controlling or stabilizing the driving signal output by the conversion circuit 2632 to be above an objective current value. The current detection signal S535 represents the magnitude of current through the switching circuit 2635. The current detection signal S539 represents the magnitude of current through energy storage circuit 2638, which current may be e.g. an inductor current in energy storage circuit 2638 or a current output at the driving output terminal 1521. Any of current detection signal S535 and current detection signal S539 can represent the magnitude of current Iout provided by the driving circuit from the driving output terminals 1521 and 1522 to the LED module. The controller 2631 is coupled to the filtering output terminal 521 for setting the objective current value according to the voltage Vin at the filtering output terminal 521. Therefore, the current Iout provided by the driving circuit or the objective current value can be adjusted corresponding to the magnitude of the voltage Vin of a filtered signal output by a filtering circuit.

It's worth noting that current detection signals S535 and S539 can be generated by measuring current through a resistor or induced by an inductor. For example, a current can be measured according to a voltage drop across a resistor in the conversion circuit 2632 the current flows through, or which arises from a mutual induction between an inductor in the conversion circuit 2632 and another inductor in its energy storage circuit 2638.

The above driving circuit structures are especially suitable for an application environment in which the external driving circuit for the LED tube lamp includes electronic ballast. An electronic ballast is equivalent to a current source whose output power is not constant. In an internal driving circuit as shown in each of FIGS. 29C-F, power consumed by the internal driving circuit relates to or depends on the number of LEDs in the LED module, and could be regarded as constant. When the output power of the electronic ballast is higher than power consumed by the LED module driven by the driving circuit, the output voltage of the ballast will increase continually, causing the logic level of an AC driving signal received by the power supply module of the LED lamp to continually increase, so as to risk damaging the ballast and/or components of the power supply module due to their voltage ratings being exceeded. On the other hand, when the output power of the electronic ballast is lower than power consumed by the LED module driven by the driving circuit, the output voltage of the ballast and the logic level of the AC driving signal will decrease continually so that the LED tube lamp fail to normally operate.

It's worth noting that the power needed for an LED lamp to work is already lower than that needed for a fluorescent lamp to work. If a conventional control mechanism of e.g.

using a backlight module to control the LED luminance is used with a conventional driving system of e.g. a ballast, a problem will probably arise of mismatch or incompatibility between the output power of the external driving system and the power needed by the LED lamp. This problem may even cause damaging of the driving system and/or the LED lamp. To prevent or reduce this problem, using e.g. the power/current adjustment method described above in FIG. 29G enables the LED (tube) lamp to be better compatible with traditional fluorescent lighting system.

Figure 29H:
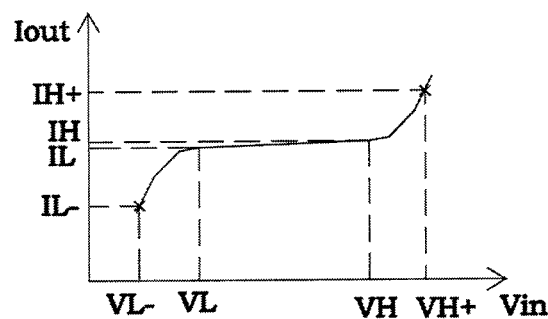
FIG. 29H is a graph illustrating the relationship between the voltage Vin and the objective current Iout according to certain embodiments of the present invention.

FIG. 29H is a graph illustrating the relationship between the voltage Vin and the objective current value Iout according to an embodiment of the present invention. In FIG. 29H, the variable Vin is on the horizontal axis, and the variable Iout is on the vertical axis. In some cases, when the logic level of the voltage Vin of a filtered signal is between the upper voltage limit VH and the lower voltage limit VL, the objective current value Iout will be about an initial objective current value. The upper voltage limit VH is higher than the lower voltage limit VL. When the voltage Vin increases to be higher than the upper voltage limit VH, the objective current value Iout will increase with the increasing of the voltage Vin. During this stage, a situation that may be preferable is that the slope of the relationship curve increase with the increasing of the voltage Vin. When the voltage Vin of a filtered signal decreases to be below the lower voltage limit VL, the objective current value Iout will decrease with the decreasing of the voltage Vin. During this stage, a situation that may be preferable is that the slope of the relationship curve decrease with the decreasing of the voltage Vin. For example, during the stage when the voltage Vin is higher than the upper voltage limit VH or lower than the lower voltage limit VL, the objective current value Iout is in some embodiments a function of the voltage Vin to the power of 2 or above, in order to make the rate of increase/decrease of the consumed power higher than the rate of increase/decrease of the output power of the external driving system. Thus, adjustment of the objective current value Iout is in some embodiments a function of the filtered voltage Vin to the power of 2 or above.

In another case, when the voltage Vin of a filtered signal is between the upper voltage limit VH and the lower voltage limit VL, the objective current value Iout of the LED lamp will vary, increase or decrease, linearly with the voltage Vin. During this stage, when the voltage Vin is at the upper voltage limit VH, the objective current value Iout will be at the upper current limit IH. When the voltage Vin is at the lower voltage limit VL, the objective current value Iout will be at the lower current limit IL. The upper current limit IH is larger than the lower current limit IL. And when the voltage Vin is between the upper voltage limit VH and the lower voltage limit VL, the objective current value Iout will be a function of the voltage Vin to the power of 1.

With the designed relationship in FIG. 29H, when the output power of the ballast is higher than the power consumed by the LED module driven by the driving circuit, the voltage Vin will increase with time to exceed the upper voltage limit VH. When the voltage Vin is higher than the upper voltage limit VH, the rate of increase of the consumed power of the LED module is higher than that of the output power of the electronic ballast, and the output power and the consumed power will be balanced or equal when the voltage Vin is at a high balance voltage value VH+ and the current Iout is at a high balance current value IH+. In this case, the high balance voltage value VH+ is larger than the upper voltage limit VH, and the high balance current value IH+ is larger than the upper current limit IH. On the other hand, when the output power of the ballast is lower than the power consumed by the LED module driven by the driving circuit, the voltage Vin will be below the lower voltage limit VL. When the voltage Vin is lower than the lower voltage limit VL, the rate of decrease of the consumed power of the LED module is higher than that of the output power of the electronic ballast, and the output power and the consumed power will be balanced or equal when the voltage Vin is at a low balance voltage value VL− and the objective current value Iout is at a low balance current value IL−. In this case, the low balance voltage value VL− is smaller than the lower voltage limit VL, and the low balance current value IL− is smaller than the lower current limit IL.

In some embodiments, the lower voltage limit VL is defined to be around 90% of the lowest output power of the electronic ballast, and the upper voltage limit VH is defined to be around 110% of its highest output power. Taking a common AC powerline with a voltage range of 100-277 volts and a frequency of 60 Hz as an example, the lower voltage limit VL may be set at 90 volts (=100*90%), and the upper voltage limit VH may be set at 305 volts (=277*110%).

With reference to FIGS. 19 and 20, a short circuit board 253 includes a first short circuit substrate and a second short circuit substrate respectively connected to two terminal portions of a long circuit sheet 251, and electronic components of the power supply module are respectively disposed on the first short circuit substrate and the second short circuit substrate. The first short circuit substrate and the second short circuit substrate may have roughly the same length, or different lengths. In general, the first short circuit substrate (i.e. the right circuit substrate of short circuit board 253 in FIG. 19 and the left circuit substrate of short circuit board 253 in FIG. 20) has a length that is about 30%-80% of the length of the second short circuit substrate (i.e. the left circuit substrate of short circuit board 253 in FIG. 19 and the right circuit substrate of short circuit board 253 in FIG. 20). In some embodiments the length of the first short circuit substrate is about ⅓~⅔ of the length of the second short circuit substrate. For example, in one embodiment, the length of the first short circuit substrate may be about half the length of the second short circuit substrate. The length of the second short circuit substrate may be, for example in the range of about 15 mm to about 65 mm, depending on actual application occasions. In certain embodiments, the first short circuit substrate is disposed in an end cap at an end of the LED tube lamp, and the second short circuit substrate is disposed in another end cap at the opposite end of the LED tube lamp.

For example, capacitors of the driving circuit, such as the capacitors 1634, 1734, 1834, and 1934 in FIGS. 29C-29F, in practical use may include two or more capacitors connected in parallel. Some or all capacitors of the driving circuit in the power supply module may be arranged on the first short circuit substrate of short circuit board 253, while other components such as the rectifying circuit, filtering circuit, inductor(s) of the driving circuit, controller(s), switch(es), diodes, etc. are arranged on the second short circuit substrate of short circuit board 253. Since the inductors, controllers, switches, etc. are electronic components with higher temperature, arranging some or all capacitors on a circuit substrate separate or away from the circuit substrate(s) of high-temperature components helps prevent the working life of capacitors (especially electrolytic capacitors) from being negatively affected by the high-temperature components, thus improving the reliability of the capacitors. Further, the physical separation between the capacitors and both the rectifying circuit and filtering circuit also contributes to reducing the problem of EMI.

In some embodiments, the driving circuit has power conversion efficiency of 80% or above, which may be 90% or above, and may even be 92% or above. Therefore, without the driving circuit, luminous efficacy of the LED lamp according to some embodiments may be 120 lm/W or above, and may even be 160 lm/W or above. On the other hand, with the driving circuit in combination with the LED component(s), luminous efficacy of the LED lamp in the invention may be, in some embodiments, 120 lm/W*90%=108 lm/W or above, and may even be, in some embodiments 160 lm/W*92%=147.2 lm/W or above.

In view of the fact that the diffusion film or layer in an LED tube lamp has light transmittance of 85% or above, luminous efficacy of the LED tube lamp of the invention is in some embodiments 108 lm/W*85%=91.8 lm/W or above, and may be, in some more effective embodiments, 147.2 lm/W*85%=125.12 lm/W.

Figure 30A:
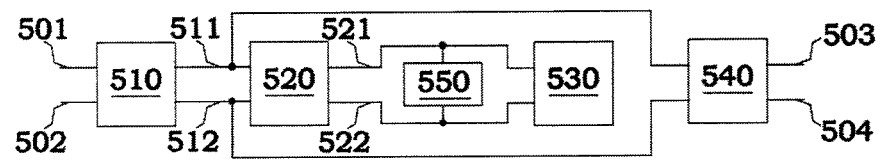
FIG. 30A is a block diagram of an exemplary power supply module in an LED lamp according to some embodiments of the present invention.

FIG. 30A is a block diagram of using a power supply module in an LED lamp according to an embodiment of the present invention. Compared to FIG. 24B, the embodiment of FIG. 30A includes two rectifying circuits 510 and 540, a filtering circuit 520, and a driving circuit 1530, and further includes an anti-flickering circuit 550 coupled between the filtering circuit 520 and the LED lighting module 530. In this embodiment, a driving circuit 1530 and an LED module 630 compose the LED lighting module 530.

The anti-flickering circuit 550 is coupled to the filtering output terminals 521 and 522 to receive a filtered signal, and under specific circumstances to consume partial energy of the filtered signal so as to reduce (the incidence of) ripples of the filtered signal disrupting or interrupting the light emission of the LED lighting module 530. In general, the filtering circuit 520 has such filtering components as capacitor(s) and/or inductor(s), and/or parasitic capacitors and inductors, which may form resonant circuits. Upon breakoff or stop of an AC power signal, as when the power supply of the LED lamp is turned off by a user, the amplitude(s) of resonant signals in the resonant circuits will decrease with time. But LEDs in the LED module of the LED lamp are unidirectional conduction devices and generally require a minimum conduction voltage for the LED module. When a resonant signal's trough value is lower than the minimum conduction voltage of the LED module, but its peak value is still higher than the minimum conduction voltage, the flickering phenomenon will occur in light emission of the LED module. In this case the anti-flickering circuit 550 works by allowing a current matching a defined flickering current value of the LED component to flow through, consuming partial energy of the filtered signal which should be higher than the energy difference of the resonant signal between its peak and trough values, so as to reduce the flickering phenomenon. In certain embodiments, a preferred occasion for the anti-flickering circuit 550 to work is when the filtered signal's voltage approaches (and is still higher than) the minimum conduction voltage, and thus the partial energy of the filtered signal consumed by the anti-flickering circuit 550 is higher than the energy difference of the resonant signal between its peak and trough values.

It's worth noting that the anti-flickering circuit 550 may be more suitable for the situation in which the LED lighting module 530 doesn't include the driving circuit 1530, for example, when the LED module 630 of LED lighting module 530 is (directly) driven to emit light by a filtered signal from a filtering circuit. In this case, the light emission of LED module 630 will directly reflect variation in the filtered signal due to its ripples. In this situation, the introduction of anti-flickering circuit 550 will prevent the flickering phenomenon from occurring in the LED lamp upon the breakoff of power supply to the LED lamp.

Figure 30B:
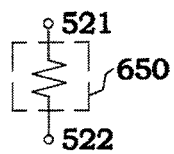
FIG. 30B is a schematic diagram of an anti-flickering circuit according to some embodiments of the present invention.

FIG. 30B is a schematic diagram of the anti-flickering circuit according to an embodiment of the present invention. Referring to FIG. 30B, an anti-flickering circuit 650 includes at least a resistor, such as two resistors connected in series between the filtering output terminals 521 and 522. In this embodiment, the anti-flickering circuit 650 in use consumes partial energy of a filtered signal continually. When in normal operation of the LED lamp, this partial energy is far lower than the energy consumed by LED lighting module 530. But upon a breakoff or stop of the power supply, when the voltage logic level of the filtered signal decreases to approach the minimum conduction voltage of LED module 630, this partial energy is still consumed by the anti-flickering circuit 650 in order to offset the impact of the resonant signals which may cause the flickering of light emission of LED module 630. In some embodiments, a current equal to or larger than an anti-flickering current logic level may be set to flow through the anti-flickering circuit 650 when the LED module 630 is supplied by the minimum conduction voltage, and then an equivalent anti-flickering resistance of anti-flickering circuit 650 can be determined based on the set current.

Figure 31A:
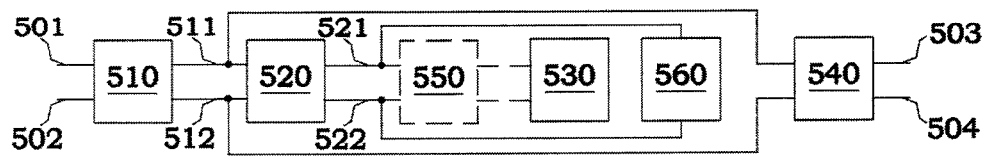
FIG. 31A is a block diagram of an exemplary power supply module in an LED lamp according to some embodiments of the present invention.

FIG. 31A is a block diagram of using a power supply module in an LED lamp according to an embodiment of the present invention. Compared to FIG. 30A, the embodiment of FIG. 31A includes two rectifying circuits 510 and 540, a filtering circuit 520, a driving circuit 1530, and an anti-flickering circuit 550, and further includes a protection circuit 560. In this embodiment, a driving circuit 1530 and an LED module 630 compose the LED lighting module 530. The protection circuit 560 is coupled to the filtering output terminals 521 and 522 to detect the filtered signal from the filtering circuit 520 for determining whether to enter a protection state. Upon entering a protection state, the protection circuit 560 works to limit, restrain, or clamp down on the logic level of the filtered signal, preventing damaging of components in the LED lighting module 530. And the anti-flickering circuit 550 may be omitted and are thus depicted in a dotted line in FIG. 31A.

Figure 31B:
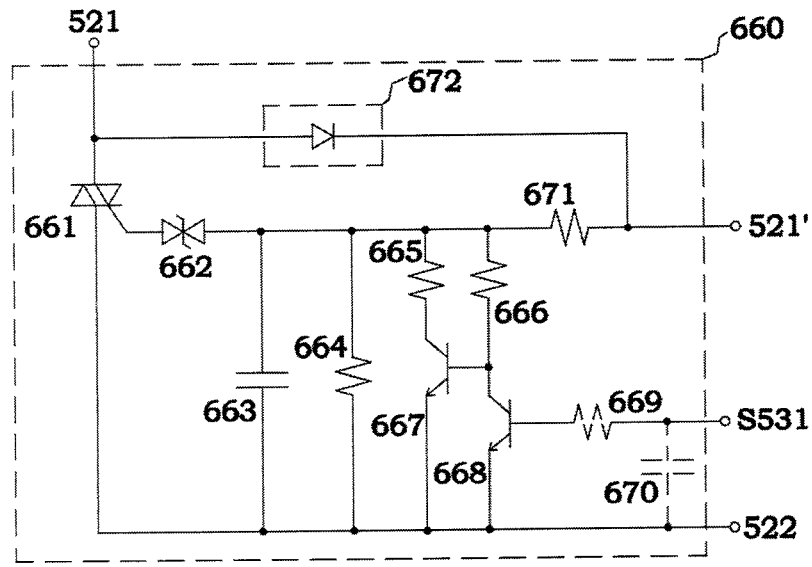
FIG. 31B is a schematic diagram of a protection circuit according to some embodiments of the present invention.

FIG. 31B is a schematic diagram of the protection circuit according to an embodiment of the present invention. Referring to FIG. 31B, a protection circuit 660 includes a voltage clamping circuit, a voltage division circuit, two capacitors 663 and 670, a resistor 669, and a diode 672, for entering a protection state when a current and/or voltage of the LED module is/are or might be excessively high, thus preventing damaging of the LED module. The voltage clamping circuit includes a bidirectional triode thyristor (TRIAC) 661 and a DIAC or symmetrical trigger diode 662. The voltage division circuit includes two bipolar junction transistors (BJT) 667 and 668 and multiple resistors 664, 665, 666, and 671.

The bidirectional triode thyristor 661 has a first terminal connected to the filtering output terminal 521, a second terminal connected to the filtering output terminal 522, and a control terminal connected to a first terminal of symmetrical trigger diode 662, which has a second terminal connected to an end of the capacitor 663, which has another end connected to the filtering output terminal 522. The resistor 664 is in parallel to the capacitor 663, and has an end connected to the second terminal of symmetrical trigger diode 662 and another end connected to the filtering output terminal 522. The resistor 665 has an end connected to the second terminal of symmetrical trigger diode 662 and another end connected to the collector terminal of BJT 667, whose emitter terminal is connected to the filtering output terminal 522. The resistor 666 has an end connected to the second terminal of symmetrical trigger diode 662 and another end connected to the collector terminal of BJT 668 and the base terminal of BJT 667. The emitter terminal of BJT 668 is connected to the filtering output terminal 522. The resistor 669 has an end connected to the base terminal of BJT 668 and another end connected to an end of the capacitor 670, which has another end connected to the filtering output terminal 522. The resistor 671 has an end connected to the second terminal of symmetrical trigger diode 662 and another end connected to the cathode of diode 672, whose anode is connected to the filtering output terminal 521.

It's worth noting that according to some embodiments, the resistance of resistor 665 should be smaller than that of resistor 666.

Next, an exemplary operation of the protection circuit 660 in overcurrent protection is described as follows.

The node connecting the resistor 669 and the capacitor 670 is to receive a current detection signal S531, which represents the magnitude of current through the LED module. The other end of the resistor 671 is a voltage terminal 521'. In this embodiment concerning overcurrent protection, the voltage terminal 521' may be coupled to a biasing voltage source, or be connected through the diode 672 to the filtering output terminal 521, as shown in FIG. 31B, to take a filtered signal as a biasing voltage source. If the voltage terminal 521' is coupled to an external biasing voltage source, the diode 672 may be omitted, so it is depicted in a dotted line in FIG. 31B. The combination of the resistor 669 and the capacitor 670 can work to filter out high frequency components of the current detection signal S531, and then input the filtered current detection signal S531 to the base terminal of BJT 668 for controlling current conduction and cutoff of the BJT 668. The filtering function of the resistor 669 and the capacitor 670 can prevent misoperation of the BJT 668 due to noises. In practical use, the resistor 669 and the capacitor 670 may be omitted, so they are each depicted in a dotted line in FIG. 31B. When they are omitted, the current detection signal S531 is input directly to the base terminal of the BJT 668.

When the LED lamp is operating normally and the current of the LED module is within a normal range, the BJT 668 is in a cutoff state, and the resistor 666 works to pull up the base voltage of the BJT 667, which therefore enters a conducting state. In this state, the electric potential at the second terminal of the symmetrical trigger diode 662 is determined based on the voltage at the voltage terminal 521' of the biasing voltage source and voltage division ratios between the resistor 671 and the parallel-connected resistors 664 and 665. Since the resistance of resistor 665 is relatively small, voltage share for the resistor 665 is smaller and the electric potential at the second terminal of the symmetrical trigger diode 662 is therefore pulled down. Then, the electric potential at the control terminal of the bidirectional triode thyristor 661 is in turn pulled down by the symmetrical trigger diode 662, causing the bidirectional triode thyristor 661 to enter a cutoff state, which cutoff state makes the protection circuit 660 not being in a protection state.

When the current of the LED module exceeds an overcurrent value, the logic level of current detection signal S531 will increase significantly to cause the BJT 668 to enter a conducting state and then pull down the base voltage of the BJT 667, which thereby enters a cutoff state. In this case, the electric potential at the second terminal of the symmetrical trigger diode 662 is determined based on the voltage at the voltage terminal 521' of the biasing voltage source and voltage division ratios between the resistor 671 and the parallel-connected resistors 664 and 666. Since the resistance of resistor 666 is relatively high, voltage share for the resistor 666 is larger and the electric potential at the second terminal of symmetrical trigger diode 662 is therefore higher. Then the electric potential at the control terminal of bidirectional triode thyristor 661 is in turn pulled up by the symmetrical trigger diode 662, causing the bidirectional triode thyristor 661 to enter a conducting state, which conducting state works to restrain or clamp down on the voltage between the filtering output terminals 521 and 522 and thus makes the protection circuit 660 being in a protection state.

In this embodiment, the voltage at the voltage terminal 521' of the biasing voltage source is determined based on the trigger voltage of the bidirectional triode thyristor 661, and voltage division ratio between the resistor 671 and the parallel-connected resistors 664 and 665, or voltage division ratio between the resistor 671 and the parallel-connected resistors 664 and 666. Through voltage division between the resistor 671 and the parallel-connected resistors 664 and 665, the voltage from the voltage terminal 521' at the symmetrical trigger diode 662 will be lower than the trigger voltage of the bidirectional triode thyristor 661. Otherwise, through voltage division between the resistor 671 and the parallel-connected resistors 664 and 666, the voltage from the voltage terminal 521' at the symmetrical trigger diode 662 will be higher than the trigger voltage of the bidirectional triode thyristor 661. For example, in some embodiments, when the current of the LED module exceeds an overcurrent value, the voltage division circuit is adjusted to the voltage division ratio between the resistor 671 and the parallel-connected resistors 664 and 666, causing a higher portion of the voltage at the voltage terminal 521' to result at the symmetrical trigger diode 662, achieving a hysteresis function. Specifically, the BJTs 667 and 668 as switches are respectively connected in series to the resistors 665 and 666 which determine the voltage division ratios. The voltage division circuit is configured to control turning on which one of the BJTs 667 and 668 and leaving the other off for determining the relevant voltage division ratio, according to whether the current of the LED module exceeds an overcurrent value. And the clamping circuit determines whether to restrain or clamp down on the voltage of the LED module according to the applying voltage division ratio.

Next, an exemplary operation of the protection circuit 660 in overvoltage protection is described as follows.

The node connecting the resistor 669 and the capacitor 670 is to receive a current detection signal S531, which represents the magnitude of current through the LED module. As described above, the protection circuit 660 still works to provide overcurrent protection. The other end of resistor 671 is a voltage terminal 521'. In this embodiment concerning overvoltage protection, the voltage terminal 521' is coupled to the positive terminal of the LED module to detect the voltage of the LED module. Taking previously described embodiments for example, in embodiments of FIGS. 28A and 28B, the LED lighting module 530 doesn't include the driving circuit 1530, and the voltage terminal 521' would be coupled to the filtering output terminal 521. Whereas in embodiments of FIGS. 29A-29G, the LED lighting module 530 includes the driving circuit 1530, and the voltage terminal 521' would be coupled to the driving output terminal 1521. In this embodiment, voltage division ratios between the resistor 671 and the parallel-connected resistors 664 and 665, and voltage division ratios between the resistor 671 and the parallel-connected resistors 664 and 666 will be adjusted according to the voltage at the voltage terminal 521', for example, the voltage at the driving output terminal 1521' or the filtering output terminal 521. Therefore, normal overcurrent protection can still be provided by the protection circuit 660.

In some embodiments, when the LED lamp is operating normally, assuming overcurrent condition doesn't occur, the electric potential at the second terminal of the symmetrical trigger diode 662 is determined based on the voltage at the voltage terminal 521' and voltage division ratios between the resistor 671 and the parallel-connected resistors 664 and 665, and is insufficient to trigger the bidirectional triode thyristor 661. Then the bidirectional triode thyristor 661 is in a cutoff state, making the protection circuit 660 not being in a protection state. On the other hand, when the LED module is operating abnormally with the voltage at the positive terminal of the LED module exceeding an overvoltage value, the electric potential at the second terminal of symmetrical trigger diode 662 is sufficiently high to trigger the bidirectional triode thyristor 661 when the voltage at the first terminal of the symmetrical trigger diode 662 is larger than the trigger voltage of the bidirectional triode thyristor 661. Then the bidirectional triode thyristor 661 enters a conducting state, making the protection circuit 660 being in a protection state to restrain or clamp down on the logic level of the filtered signal.

As described above, the protection circuit 660 provides one or two of the functions of overcurrent protection and overvoltage protection.

In some embodiments, the protection circuit 660 may further include a zener diode connected to the resistor 664 in parallel, which zener diode is used to limit or restrain the voltage across the resistor 664. The breakdown voltage of the zener diode is in some embodiments in the range of about 25-50 volts, and in some embodiments may be about 36 volts.

Further, a silicon controlled rectifier may be substituted for the bidirectional triode thyristor 661, without negatively affecting the protection functions. Using a silicon controlled rectifier instead of a bidirectional triode thyristor 661 has a lower voltage drop across itself in conduction than that across the bidirectional triode thyristor 661 in conduction.

In one embodiment, values of the parameters of the protection circuit 660 may be set as follows. The resistance of resistor 669 may be about 10 ohms. The capacitance of capacitor 670 may be about 1 nF. The capacitance of capacitor 633 may be about 10 nF. The (breakover) voltage of symmetrical trigger diode 662 may be in the range of about 26-36 volts. The resistance of resistor 671 may be in the range of about 300 k-600 k ohms, and may be, in some embodiments, about 540 k ohms. The resistance of resistor 666 is in some embodiments in the range of about 100 k-300 k ohms, and may be, in some embodiments, about 220 k ohms. The resistance of resistor 665 is in some embodiments in the range of about 30 k-100 k ohms, and may be, in some embodiments about 40 k ohms. The resistance of resistor 664 is in some embodiments in the range of about 100 k-300 k ohms, and may be, in some embodiments about 220 k ohms.

Figure 32A:
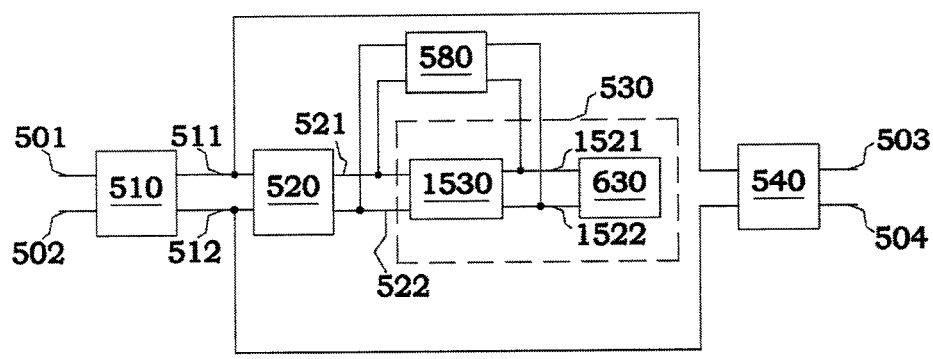
FIG. 32A is a block diagram of an exemplary power supply module in an LED lamp according to some embodiments of the present invention.

FIG. 32A is a block diagram of a power supply module in an LED lamp according to an embodiment of the present invention. Compared to FIG. 29A, the embodiment of FIG. 32A includes two rectifying circuits 510 and 540, a filtering circuit 520, and a driving circuit 1530, and further includes a mode switching circuit 580. In this embodiment, a driving circuit 1530 and an LED module 630 compose the LED lighting module 530. The mode switching circuit 580 is coupled to at least one of the filtering output terminals 521 and 522 and at least one of the driving output terminals 1521 and 1522, for determining whether to perform a first driving mode or a second driving mode, as according to a frequency of the external driving signal. In the first driving mode, a filtered signal from the filtering circuit 520 is input into the driving circuit 1530, while in the second driving mode the filtered signal bypasses at least a component of the driving circuit 1530, making the driving circuit 1530 stop working in conducting the filtered signal, allowing the filtered signal to (directly) reach and drive the LED module 630. The bypassed component(s) of the driving circuit 1530 may include an inductor or a switch, which when bypassed makes the driving circuit 1530 unable to transfer and/or convert power, and then stop working in conducting the filtered signal. If the driving circuit 1530 includes a capacitor, the capacitor can still be used to filter out ripples of the filtered signal in order to stabilize the voltage across the LED module. When the mode switching circuit 580 determines on performing the first driving mode, allowing the filtered signal to be input to the driving circuit 1530, the driving circuit 1530 then transforms the filtered signal into a driving signal for driving the LED module 630 to emit light. On the other hand, when the mode switching circuit 580 determines on performing the second driving mode, allowing the filtered signal to bypass the driving circuit 1530 to reach the LED module 630, the filtering circuit 520 becomes in effect a driving circuit for LED module 630. Then the filtering circuit 520 provides the filtered signal as a driving signal for the LED module for driving the LED module to emit light.

It's worth noting that the mode switching circuit 580 can determine whether to perform the first driving mode or the second driving mode based on a user's instruction or a detected signal received by the LED lamp through the pins 501, 502, 503, and 504. With the mode switching circuit, the power supply module of the LED lamp can adapt to or perform one of appropriate driving modes corresponding to different application environments or driving systems, thus improving the compatibility of the LED lamp.

Figure 32B:
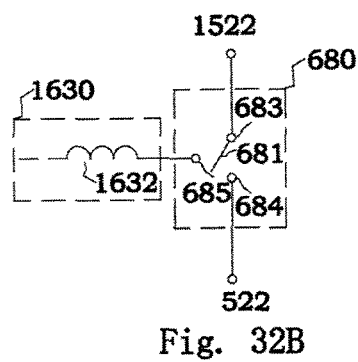
FIG. 32B is a schematic diagram of a mode switching circuit in an LED lamp according to some embodiments of the present invention.

FIG. 32B is a schematic diagram of the mode switching circuit in an LED lamp according to an embodiment of the present invention. Referring to FIG. 32B, a mode switching circuit 680 includes a mode switch 681 suitable for use with the driving circuit 1630 in FIG. 29C. Referring to FIGS. 32B and 29C, the mode switch 681 has three terminals 683, 684, and 685, wherein the terminal 683 is coupled to the driving output terminal 1522, the terminal 684 is coupled to the filtering output terminal 522, and the terminal 685 is coupled to the inductor 1632 in the driving circuit 1630.

When the mode switching circuit 680 determines on performing a first driving mode, the mode switch 681 conducts current in a first conductive path through the terminals 683 and 685 and a second conductive path through the terminals 683 and 684 is in a cutoff state. In this case, the driving output terminal 1522 is coupled to the inductor 1632, and therefore the driving circuit 1630 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 680 determines on performing a second driving mode, the mode switch 681 conducts current in the second conductive path through the terminals 683 and 684 and the first conductive path through the terminals 683 and 685 is in a cutoff state. In this case, the driving output terminal 1522 is coupled to the filtering output terminal 522, and therefore the driving circuit 1630 stops working, and a filtered signal is input through the filtering output terminals 521 and 522 to the driving output terminals 1521 and 1522 for driving the LED module, while bypassing the inductor 1632 and the switch 1635 in the driving circuit 1630.

Figure 32C:
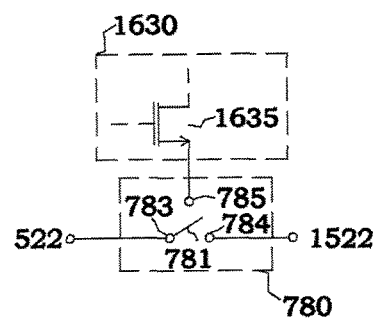
FIG. 32C is a schematic diagram of a mode switching circuit in an LED lamp according to some embodiments of the present invention.

FIG. 32C is a schematic diagram of the mode switching circuit in an LED lamp according to an embodiment of the present invention. Referring to FIG. 32C, a mode switching circuit 780 includes a mode switch 781 being suitable for use with the driving circuit 1630 in FIG. 29C. Referring to FIGS. 32C and 29C, the mode switch 781 has three terminals 783, 784, and 785, wherein the terminal 783 is coupled to the filtering output terminal 522, the terminal 784 is coupled to the driving output terminal 1522, and the terminal 785 is coupled to switch 1635 in the driving circuit 1630.

When the mode switching circuit 780 determines on performing a first driving mode, the mode switch 781 conducts current in a first conductive path through the terminals 783 and 785 and a second conductive path through the terminals 783 and 784 is in a cutoff state. In this case, the filtering output terminal 522 is coupled to the switch 1635, and therefore the driving circuit 1630 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 780 determines on performing a second driving mode, the mode switch 781 conducts current in the second conductive path through the terminals 783 and 784 and the first conductive path through the terminals 783 and 785 is in a cutoff state. In this case, the driving output terminal 1522 is coupled to the filtering output terminal 522, and therefore the driving circuit 1630 stops working, and a filtered signal is input through the filtering output terminals 521 and 522 to the driving output terminals 1521 and 1522 for driving the LED module, while bypassing the inductor 1632 and the switch 1635 in the driving circuit 1630.

Figure 32D:
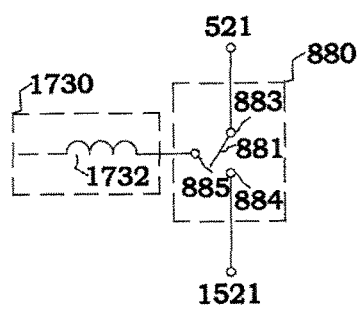
FIG. 32D is a schematic diagram of a mode switching circuit in an LED lamp according to some embodiments of the present invention.

FIG. 32D is a schematic diagram of the mode switching circuit in an LED lamp according to an embodiment of the present invention. Referring to FIG. 32D, a mode switching circuit 880 includes a mode switch 881 being suitable for use with the driving circuit 1730 in FIG. 29D. Referring to FIGS. 32D and 29D, the mode switch 881 has three terminals 883, 884, and 885, wherein the terminal 883 is coupled to the filtering output terminal 521, the terminal 884 is coupled to the driving output terminal 1521, and the terminal 885 is coupled to the inductor 1732 in the driving circuit 1730.

When the mode switching circuit 880 determines on performing a first driving mode, the mode switch 881 conducts current in a first conductive path through the terminals 883 and 885 and a second conductive path through the terminals 883 and 884 is in a cutoff state. In this case, the filtering output terminal 521 is coupled to the inductor 1732, and therefore the driving circuit 1730 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 880 determines on performing a second driving mode, the mode switch 881 conducts current in the second conductive path through the terminals 883 and 884 and the first conductive path through the terminals 883 and 885 is in a cutoff state. In this case, the driving output terminal 1521 is coupled to the filtering output terminal 521, and therefore the driving circuit 1730 stops working, and a filtered signal is input through the filtering output terminals 521 and 522 to the driving output terminals 1521 and 1522 for driving the LED module, while bypassing the inductor 1732 and the freewheeling diode 1733 in the driving circuit 1730.

Figure 32E:
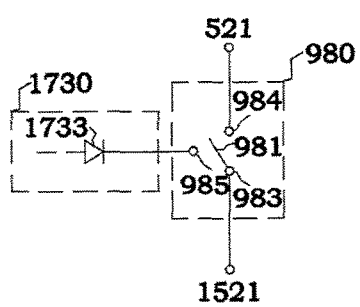
FIG. 32E is a schematic diagram of a mode switching circuit in an LED lamp according to some embodiments of the present invention.

FIG. 32E is a schematic diagram of the mode switching circuit in an LED lamp according to an embodiment of the present invention. Referring to FIG. 32E, a mode switching circuit 980 includes a mode switch 981 being suitable for use with the driving circuit 1730 in FIG. 29D. Referring to FIGS. 32E and 29D, the mode switch 981 has three terminals 983, 984, and 985, wherein the terminal 983 is coupled to the driving output terminal 1521, the terminal 984 is coupled to the filtering output terminal 521, and the terminal 985 is coupled to the cathode of diode 1733 in the driving circuit 1730.

When the mode switching circuit 980 determines on performing a first driving mode, the mode switch 981 conducts current in a first conductive path through the terminals 983 and 985, and a second conductive path through the terminals 983 and 984 is in a cutoff state. In this case, the filtering output terminal 521 is coupled to the cathode of diode 1733, and therefore the driving circuit 1730 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 980 determines on performing a second driving mode, the mode switch 981 conducts current in the second conductive path through the terminals 983 and 984 and the first conductive path through the terminals 983 and 985 is in a cutoff state. In this case, the driving output terminal 1521 is coupled to the filtering output terminal 521, and therefore the driving circuit 1730 stops working, and a filtered signal is input through the filtering output terminals 521 and 522 to the driving output terminals 1521 and 1522 for driving the LED module, while bypassing the inductor 1732 and the freewheeling diode 1733 in the driving circuit 1730.

Figure 32F:
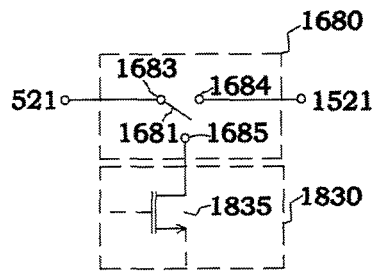
FIG. 32F is a schematic diagram of a mode switching circuit in an LED lamp according to some embodiments of the present invention.

FIG. 32F is a schematic diagram of the mode switching circuit in an LED lamp according to an embodiment of the present invention. Referring to FIG. 32F, a mode switching circuit 1680 includes a mode switch 1681 being suitable for use with the driving circuit 1830 in FIG. 29E. Referring to FIGS. 32F and 29E, the mode switch 1681 has three terminals 1683, 1684, and 1685, wherein the terminal 1683 is coupled to the filtering output terminal 521, the terminal 1684 is coupled to the driving output terminal 1521, and the terminal 1685 is coupled to switch 1835 in the driving circuit 1830.

When the mode switching circuit 1680 determines on performing a first driving mode, the mode switch 1681 conducts current in a first conductive path through the terminals 1683 and 1685, and a second conductive path through the terminals 1683 and 1684 is in a cutoff state. In this case, the filtering output terminal 521 is coupled to the switch 1835, and therefore the driving circuit 1830 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 1680 determines on performing a second driving mode, the mode switch 1681 conducts current in the second conductive path through the terminals 1683 and 1684 and the first conductive path through the terminals 1683 and 1685 is in a cutoff state. In this case, the driving output terminal 1521 is coupled to the filtering output terminal 521, and therefore the driving circuit 1830 stops working, and a filtered signal is input through the filtering output terminals 521 and 522 to the driving output terminals 1521 and 1522 for driving the LED module, while bypassing the inductor 1832 and the switch 1835 in the driving circuit 1830.

Figure 32G:
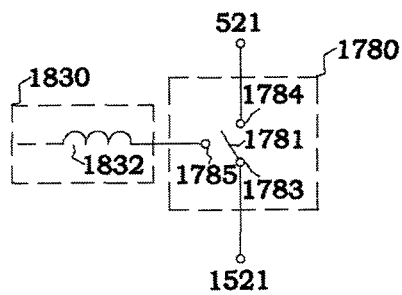
FIG. 32G is a schematic diagram of a mode switching circuit in an LED lamp according to some embodiments of the present invention.

FIG. 32G is a schematic diagram of the mode switching circuit in an LED lamp according to an embodiment of the present invention. Referring to FIG. 32G, a mode switching circuit 1780 includes a mode switch 1781 being suitable for use with the driving circuit 1830 in FIG. 29E. Referring to FIGS. 32G and 29E, the mode switch 1781 has three terminals 1783, 1784, and 1785, wherein the terminal 1783 is coupled to the filtering output terminal 521, the terminal 1784 is coupled to the driving output terminal 1521, and the terminal 1785 is coupled to inductor 1832 in the driving circuit 1830.

When the mode switching circuit 1780 determines on performing a first driving mode, the mode switch 1781 conducts current in a first conductive path through the terminals 1783 and 1785, and a second conductive path through the terminals 1783 and 1784 is in a cutoff state. In this case, the filtering output terminal 521 is coupled to the inductor 1832, and therefore the driving circuit 1830 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 1780 determines on performing a second driving mode, the mode switch 1781 conducts current in the second conductive path through the terminals 1783 and 1784 and the first conductive path through the terminals 1783 and 1785 is in a cutoff state. In this case, the driving output terminal 1521 is coupled to the filtering output terminal 521, and therefore the driving circuit 1830 stops working, and a filtered signal is input through the filtering output terminals 521 and 522 to the driving output terminals 1521 and 1522 for driving the LED module, while bypassing the inductor 1832 and the switch 1835 in the driving circuit 1830.

Figure 32H:
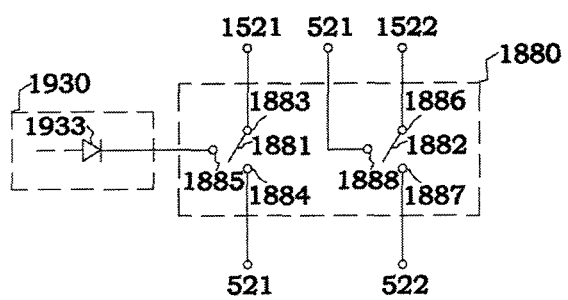
FIG. 32H is a schematic diagram of a mode switching circuit in an LED lamp according to some embodiments of the present invention.

FIG. 32H is a schematic diagram of the mode switching circuit in an LED lamp according to an embodiment of the present invention. Referring to FIG. 32H, a mode switching circuit 1880 includes two mode switches 1881 and 1882 being suitable for use with the driving circuit 1930 in FIG. 29F. Referring to FIGS. 32H and 29F, the mode switch 1881 has three terminals 1883, 1884, and 1885, wherein the terminal 1883 is coupled to the driving output terminal 1521, the terminal 1884 is coupled to the filtering output terminal 521, and the terminal 1885 is coupled to the freewheeling diode 1933 in the driving circuit 1930. And the mode switch 1882 has three terminals 1886, 1887, and 1888, wherein the terminal 1886 is coupled to the driving output terminal 1522, the terminal 1887 is coupled to the filtering output terminal 522, and the terminal 1888 is coupled to the filtering output terminal 521.

When the mode switching circuit 1880 determines on performing a first driving mode, the mode switch 1881 conducts current in a first conductive path through the terminals 1883 and 1885, and a second conductive path through the terminals 1883 and 1884 is in a cutoff state, and the mode switch 1882 conducts current in a third conductive path through the terminals 1886 and 1888, and a fourth conductive path through the terminals 1886 and 1887 is in a cutoff state. In this case, the driving output terminal 1521 is coupled to the freewheeling diode 1933, and the filtering output terminal 521 is coupled to the driving output terminal 1522. Therefore the driving circuit 1930 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 1880 determines on performing a second driving mode, the mode switch 1881 conducts current in the second conductive path through the terminals 1883 and 1884, and the first conductive path through the terminals 1883 and 1885 is in a cutoff state, and the mode switch 1882 conducts current in the fourth conductive path through the terminals 1886 and 1887, and the third conductive path through the terminals 1886 and 1888 is in a cutoff state. In this case, the driving output terminal 1521 is coupled to the filtering output terminal 521, and the filtering output terminal 522 is coupled to the driving output terminal 1522. Therefore the driving circuit 1930 stops working, and a filtered signal is input through the filtering output terminals 521 and 522 to the driving output terminals 1521 and 1522 for driving the LED module, while bypassing the freewheeling diode 1933 and the switch 1935 in the driving circuit 1930.

Figure 32I:
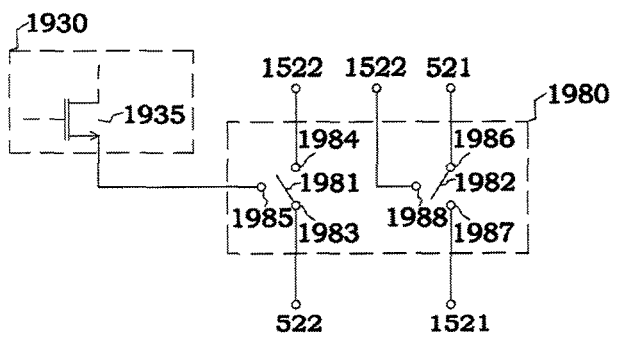
FIG. 32I is a schematic diagram of a mode switching circuit in an LED lamp according to some embodiment of the present invention.

FIG. 32I is a schematic diagram of the mode switching circuit in an LED lamp according to an embodiment of the present invention. Referring to FIG. 32I, a mode switching circuit 1980 includes two mode switches 1981 and 1982 being suitable for use with the driving circuit 1930 in FIG. 29F. Referring to FIGS. 32I and 29F, the mode switch 1981 has three terminals 1983, 1984, and 1985, wherein the terminal 1983 is coupled to the filtering output terminal 522, the terminal 1984 is coupled to the driving output terminal 1522, and the terminal 1985 is coupled to switch 1935 in the driving circuit 1930. And the mode switch 1982 has three terminals 1986, 1987, and 1988, wherein the terminal 1986 is coupled to the filtering output terminal 521, the terminal 1987 is coupled to the driving output terminal 1521, and the terminal 1988 is coupled to the driving output terminal 1522.

When the mode switching circuit 1980 determines on performing a first driving mode, the mode switch 1981 conducts current in a first conductive path through the terminals 1983 and 1985, and a second conductive path through the terminals 1983 and 1984 is in a cutoff state, and the mode switch 1982 conducts current in a third conductive path through the terminals 1986 and 1988, and a fourth conductive path through the terminals 1986 and 1987 is in a cutoff state. In this case, driving output terminal 1522 is coupled to the filtering output terminal 521, and the filtering output terminal 522 is coupled to the switch 1935. Therefore the driving circuit 1930 is working normally, which working includes receiving a filtered signal from the filtering output terminals 521 and 522 and then transforming the filtered signal into a driving signal, output at the driving output terminals 1521 and 1522 for driving the LED module.

When the mode switching circuit 1980 determines on performing a second driving mode, the mode switch 1981 conducts current in the second conductive path through the terminals 1983 and 1984, and the first conductive path through the terminals 1983 and 1985 is in a cutoff state, and the mode switch 1982 conducts current in the fourth conductive path through the terminals 1986 and 1987, and the third conductive path through the terminals 1986 and 1988 is in a cutoff state. In this case, the driving output terminal 1521 is coupled to the filtering output terminal 521, and the filtering output terminal 522 is coupled to the driving output terminal 1522. Therefore the driving circuit 1930 stops working, and a filtered signal is input through the filtering output terminals 521 and 522 to the driving output terminals 1521 and 1522 for driving the LED module, while bypassing the freewheeling diode 1933 and the switch 1935 in the driving circuit 1930.

It's worth noting that the mode switches in the above embodiments may each comprise, for example, a single-pole double-throw switch, or comprise two semiconductor switches (such as metal oxide semiconductor transistors), for switching a conductive path on to conduct current while leaving the other conductive path cutoff. Each of the two conductive paths provides a path for conducting the filtered signal, allowing the current of the filtered signal to flow through one of the two paths, thereby achieving the function of mode switching or selection. For example, with reference to FIG. 24A, when the lamp driving circuit 505 is not present and the LED tube lamp 500 is directly supplied by the AC power supply 508, the mode switching circuit may determine on performing a first driving mode in which the driving circuit transforms the filtered signal into a driving signal with a logic level meeting a required logic level to properly drive the LED module to emit light. On the other hand, when the lamp driving circuit 505 is present, the mode switching circuit may determine on performing a second driving mode in which the filtered signal is (almost) directly used to drive the LED module to emit light; or alternatively the mode switching circuit may determine on performing the first driving mode to drive the LED module to emit light.

Figure 33A:
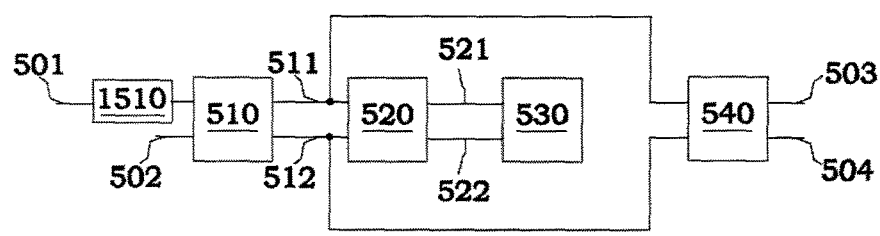
FIG. 33A is a block diagram of an exemplary power supply module in an LED lamp according to some embodiments of the present invention.

FIG. 33A is a block diagram of a power supply module in an LED lamp according to an embodiment of the present invention. Compared to FIG. 24B, the embodiment of FIG. 33A includes two rectifying circuits 510 and 540, a filtering circuit 520, and a driving circuit 1530, and further includes a ballast-compatible circuit 1510. In this embodiment, a driving circuit 1530 and an LED module 630 compose the LED lighting module 530. The ballast-compatible circuit 1510 may be coupled between the pin 501 and/or pin 502 and the rectifying circuit 510. This embodiment is explained assuming the ballast-compatible circuit 1510 to be coupled between the pin 501 and the rectifying circuit 510.

In an initial stage upon the activation of the driving system of the lamp driving circuit 505, the lamp driving circuit 505's ability to output relevant signal(s) has not risen to a standard state. However, in the initial stage the power supply module of the LED lamp instantly or rapidly receives or conducts the AC driving signal provided by the lamp driving circuit 505, which initial conduction is likely to fail the starting of the LED lamp by the lamp driving circuit 505 as the lamp driving circuit 505 is initially loaded by the LED lamp in this stage. For example, the internal components of the lamp driving circuit 505 may need to retrieve power from a transformed output in the lamp driving circuit 505 in order to maintain their operation upon the activation. In this case, the activation of the lamp driving circuit 505 may end up failing as its output voltage could not normally rise to a required logic level in this initial stage; or the quality factor (Q) of a resonant circuit in the lamp driving circuit 505 may vary as a result of the initial loading from the LED lamp, so as to cause the failure of the activation.

In this embodiment, in the initial stage upon activation, the ballast-compatible circuit 1510 will be in an open-circuit state, preventing the energy of the AC driving signal from reaching the LED module. After a defined delay upon the AC driving signal as an external driving signal being input to the LED tube lamp, the ballast-compatible circuit 1510 switches from a cutoff state during the delay to a conducting state, allowing the energy of the AC driving signal to start to reach the LED module. By means of the delayed conduction of the ballast-compatible circuit 1510, operation of the LED lamp simulates the lamp-starting characteristics of a fluorescent lamp, that is, internal gases of the fluorescent lamp will normally discharge for light emission after a delay upon activation of a driving power supply. Therefore, the ballast-compatible circuit 1510 further improves the compatibility of the LED lamp with the lamp driving circuits 505 such as an electronic ballast.

Figure 33B:
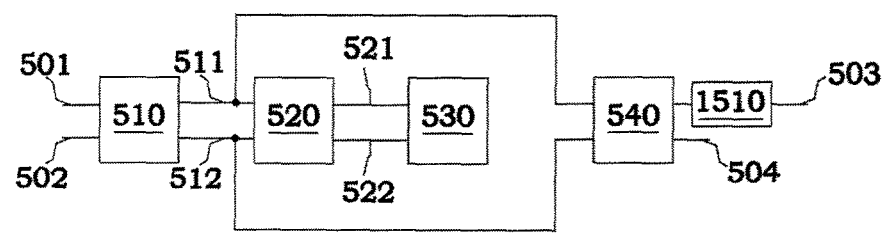
FIG. 33B is a block diagram of an exemplary power supply module in an LED lamp according to some embodiments of the present invention.

FIG. 33B is a block diagram of a power supply module in an LED lamp according to an embodiment of the present invention. Compared to FIG. 33A, a ballast-compatible circuit 1510 in the embodiment of FIG. 33B is coupled between the pin 503 and/or pin 504 and the rectifying circuit 540. As explained regarding the ballast-compatible circuit 1510 in FIG. 33A, the ballast-compatible circuit 1510 in FIG. 33B performs the function of delaying the starting of the LED lamp, or causing the input of the AC driving signal to be delayed for a predefined time, in order to prevent the failure of starting by the lamp driving circuits 505 such as an electronic ballast.

Figure 33C:
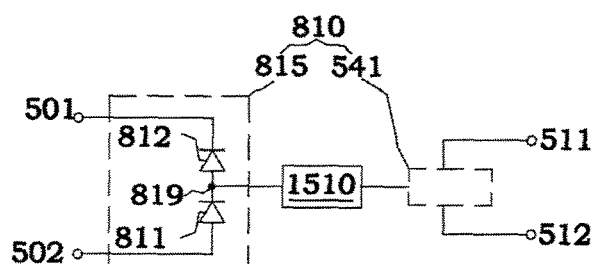
FIG. 33C illustrates an arrangement with a ballast-compatible circuit in an LED lamp according to some embodiments of the present invention.

Apart from coupling the ballast-compatible circuit 1510 between the terminal pin(s) and the rectifying circuit in the above embodiments, the ballast-compatible circuit 1510 may alternatively be included within a rectifying circuit with a different structure. FIG. 33C illustrates an arrangement with a ballast-compatible circuit in an LED lamp according to a preferred embodiment of the present invention. Referring to FIG. 33C, the rectifying circuit assumes the circuit structure of the rectifying circuit 810 in FIG. 25C. The rectifying circuit 810 includes a rectifying unit 815 and a terminal adapter circuit 541. The rectifying unit 815 is coupled to the pins 501 and 502, the terminal adapter circuit 541 is coupled to the output terminals 511 and 512, and the ballast-compatible circuit 1510 in FIG. 33C is coupled between the rectifying unit 815 and the terminal adapter circuit 541. In this case, in the initial stage upon activation of the ballast, an AC driving signal as an external driving signal is input to the LED tube lamp, where the AC driving signal can only reach the rectifying unit 815, but cannot reach other circuits such as the terminal adapter circuit 541, other internal filter circuitry, and the LED lighting module. Moreover, the parasitic capacitors associated with the rectifying diodes 811 and 812 within the rectifying unit 815 are quite small in capacitance and thus can be ignored. Accordingly, the lamp driving circuit 505 in the initial stage isn't loaded with or effectively connected to the equivalent capacitor or inductor of the power supply module of the LED lamp, and the quality factor (Q) of the lamp driving circuit 505 is therefore not adversely affected in this stage, resulting in a successful starting of the LED lamp by the lamp driving circuit 505.

It's worth noting that under the condition that the terminal adapter circuit 541 doesn't include components such as capacitors or inductors, interchanging the rectifying unit 815 and the terminal adapter circuit 541 in position, meaning the rectifying unit 815 is connected to the output terminals 511 and 512 and the terminal adapter circuit 541 is connected to the pins 501 and 502, doesn't affect or alter the function of the ballast-compatible circuit 1510.

Further, as explained in FIGS. 25A-25D, when a rectifying circuit is connected to the pins 503 and 504 instead of the pins 501 and 502, this rectifying circuit may constitute the rectifying circuit 540. That is, the circuit arrangement with a ballast-compatible circuit 1510 in FIG. 33C may be alternatively included in the rectifying circuit 540 instead of the rectifying circuit 810, without affecting the function of the ballast-compatible circuit 1510.

In some embodiments, as described above the terminal adapter circuit 541 doesn't include components such as capacitors or inductors. Or when the rectifying circuit 610 in FIG. 25A constitutes the rectifying circuit 510 or 540, the parasitic capacitances in the rectifying circuit 510 or 540 are quite small and thus can be ignored. These conditions contribute to not affecting the quality factor of the lamp driving circuit 505.

Figure 33D:
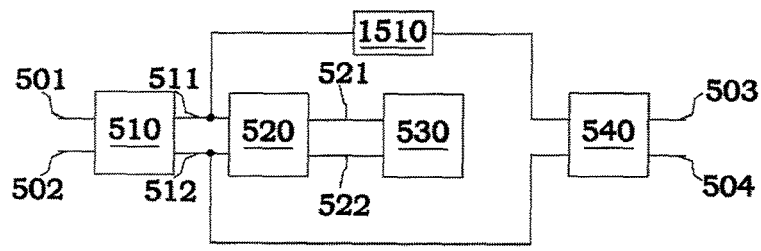
FIG. 33D is a block diagram of an exemplary power supply module in an LED lamp according to some embodiments of the present invention.

FIG. 33D is a block diagram of a power supply module in an LED lamp according to an embodiment of the present invention. Compared to the embodiment of FIG. 33A, a ballast-compatible circuit 1510 in the embodiment of FIG. 33D is coupled between the rectifying circuit 540 and the filtering circuit 520. Since the rectifying circuit 540 also doesn't include components such as capacitors or inductors, the function of the ballast-compatible circuit 1510 in the embodiment of FIG. 33D will not be affected.

Figure 33E:
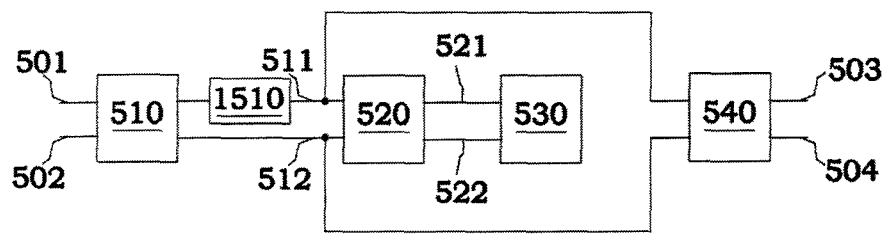
FIG. 33E is a block diagram of an exemplary power supply module in an LED lamp according to some embodiments of the present invention.

FIG. 33E is a block diagram of a power supply module in an LED lamp according to an embodiment of the present invention. Compared to the embodiment of FIG. 33A, a ballast-compatible circuit 1510 in the embodiment of FIG. 33E is coupled between the rectifying circuit 510 and the filtering circuit 520. Similarly, since the rectifying circuit 510 doesn't include components such as capacitors or inductors, the function of the ballast-compatible circuit 1510 in the embodiment of FIG. 33E will not be affected.

Figure 33F:
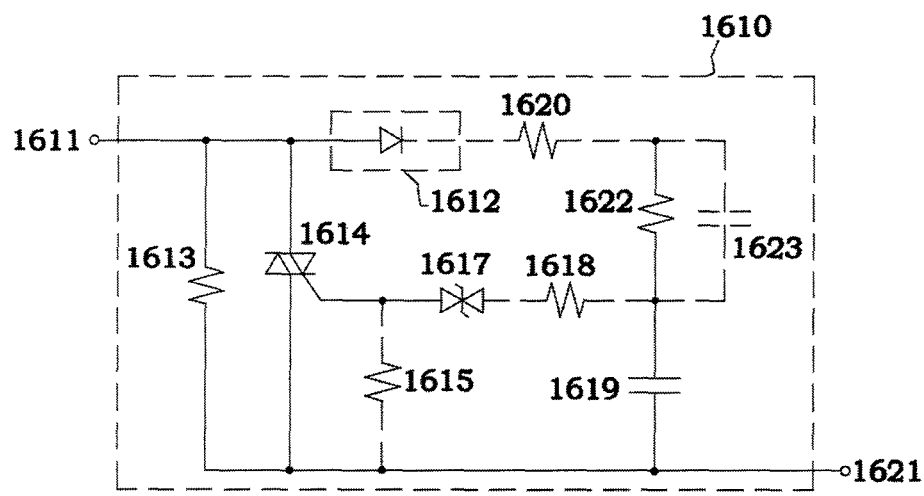
FIG. 33F is a schematic diagram of a ballast-compatible circuit according to some embodiments of the present invention.

FIG. 33F is a schematic diagram of the ballast-compatible circuit according to an embodiment of the present invention. Referring to FIG. 33F, a ballast-compatible circuit 1610 has an initial state in which an equivalent open-circuit is obtained at the ballast-compatible circuit input and output terminals 1611 and 1621. Upon receiving an input signal at the ballast-compatible circuit input terminal 1611, a delay will pass until a current conduction occurs through and between the ballast-compatible circuit input and output terminals 1611 and 1621, transmitting the input signal to the ballast-compatible circuit output terminal 1621.

The Ballast-compatible circuit 1610 includes a diode 1612, multiple resistors 1613, 1615, 1618, 1620, and 1622, a bidirectional triode thyristor (TRIAC) 1614, a DIAC or symmetrical trigger diode 1617, a capacitor 1619, and ballast-compatible circuit input and output terminals 1611 and 1621. It's noted that the resistance of resistor 1613 should be quite large so that when the bidirectional triode thyristor 1614 is cutoff in an open-circuit state, an equivalent open-circuit is obtained at ballast-compatible circuit input and output terminals 1611 and 1621.

The bidirectional triode thyristor 1614 is coupled between the ballast-compatible circuit input and output terminals 1611 and 1621, and the resistor 1613 is also coupled between the ballast-compatible circuit input and output terminals 1611 and 1621 and in parallel to the bidirectional triode thyristor 1614. The diode 1612, the resistors 1620 and 1622, and the capacitor 1619 are series-connected in sequence between the ballast-compatible circuit input and output terminals 1611 and 1621, and are connected in parallel to the bidirectional triode thyristor 1614. The diode 1612 has an anode connected to the bidirectional triode thyristor 1614, and has a cathode connected to an end of the resistor 1620. The bidirectional triode thyristor 1614 has a control terminal connected to a terminal of the symmetrical trigger diode 1617, which has another terminal connected to an end of the resistor 1618, which has another end connected to a node connecting the capacitor 1619 and the resistor 1622. The resistor 1615 is connected between the control terminal of the bidirectional triode thyristor 1614 and a node connecting the resistor 1613 and the capacitor 1619. In some embodiments, the resistors 1615, 1618, and 1620 could be omitted, and hence they are depicted in dotted line. When the resistor 1618 is omitted, another terminal of the symmetrical trigger diode 1617 mentioned above is directly connected to the node connecting the capacitor 1619 and the resistor 1622. And the cathode of the diode 1612 is connected to the resistor 1622 directly when the resistor 1620 is omitted.

When an AC driving signal (such as a high-frequency high-voltage AC signal output by an electronic ballast) is initially input to the ballast-compatible circuit input terminal 1611, the bidirectional triode thyristor 1614 will be in an open-circuit state, not allowing the AC driving signal to pass through and the LED lamp is therefore also in an open-circuit state. In this state, the AC driving signal is charging the capacitor 1619 through the diode 1612 and the resistors 1620 and 1622, gradually increasing the voltage of the capacitor 1619. Upon continually charging for a period of time, the voltage of the capacitor 1619 increases to be above the trigger voltage value of the symmetrical trigger diode 1617 so that the symmetrical trigger diode 1617 is turned on in a conducting state. Then the conducting symmetrical trigger diode 1617 will in turn trigger the bidirectional triode thyristor 1614 on in a conducting state. In this situation, the conducting bidirectional triode thyristor 1614 electrically connects the ballast-compatible circuit input and output terminals 1611 and 1621, allowing the AC driving signal to flow through the ballast-compatible circuit input and output terminals 1611 and 1621, thus starting the operation of the power supply module of the LED lamp. In this case the energy stored by the capacitor 1619 will maintain the conducting state of the bidirectional triode thyristor 1614, to prevent the AC variation of the AC driving signal from causing the bidirectional triode thyristor 1614 and therefore the ballast-compatible circuit 1610 to be cutoff again, or to prevent or reduce the bidirectional triode thyristor 1614 alternating or switching between its conducting and cutoff states.

When the ballast-compatible circuit 1610 for the present embodiment is applied to the application circuits shown in FIGS. 33C-33D, the diode 1612 could be omitted because the ballast-compatible circuit 1610 receives the signal that has rectified by the rectifying unit/circuit. In some cases, the bidirectional triode thyristor 1614 could be replaced with a silicon controlled rectifier (SCR), and the symmetrical trigger diode 1617 could be replaced with a thyristor surge suppresser. This kind of replacement does not affect the protection for the circuit. Further, using a silicon controlled rectifier instead of a bidirectional triode thyristor has a lower voltage drop across itself in conduction than that across the bidirectional triode thyristor in conduction.

In general, in hundreds of milliseconds upon activation of a lamp driving circuit 505 such as an electronic ballast, the output voltage of the ballast has risen above a certain voltage value as the output voltage hasn't been adversely affected by the sudden initial loading from the LED lamp. In some cases, the AC voltage output from some instant-start ballasts will be firstly kept at a fixed value for a short period, such as 0.01 second, and in the meanwhile, the AC voltage at the fixed value is under 300V and rises or increases with time. However, any loading added at the output of the instant-start ballast in this short period would cause the instant-start ballast failing to pull up the AC voltage for outputting, in particularly, this situation will be quite often when the input voltage of the instant-start ballast is 120V or bellow. Besides, a detection mechanism to detect whether lighting of a fluorescent lamp is achieved may be disposed in lamp driving circuits 505 such as an electronic ballast. In this detection mechanism, if a fluorescent lamp fails to be lit up for a defined period of time, an abnormal state of the fluorescent lamp is detected, causing the fluorescent lamp to enter a protection state. In view of these facts, in certain embodiments, the delay provided by the ballast-compatible circuit 1610 until conduction of the ballast-compatible circuit 1610 and then the LED lamp should be bigger than 0.01 second and may be in the range of about 0.1-3 seconds.

It's worth noting that an additional capacitor 1623 may be coupled in parallel to the resistor 1622. The capacitor 1623 works to reflect or support instantaneous change in the voltage between the ballast-compatible circuit input and output terminals 1611 and 1621, and will not affect the function of delayed conduction performed by the ballast-compatible circuit 1610.

Figure 33G:
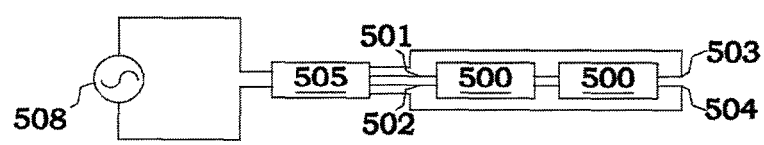
FIG. 33G is a block diagram of an exemplary power supply module in an LED lamp according to some embodiments of the present invention.

FIG. 33G is a block diagram of a power supply module in an LED lamp according to an embodiment of the present invention. Compared to the embodiment of FIG. 24A, the lamp driving circuit 505 in the embodiment of FIG. 33G drives a plurality of LED tube lamps 500 connected in series, wherein a ballast-compatible circuit 1610 is disposed in each of the LED tube lamps 500. For the convenience of illustration, two series-connected LED tube lamps 500 are assumed for example and explained as follows.

Because the two ballast-compatible circuits 1610 respectively of the two LED tube lamps 500 can actually have different delays until conduction of the LED tube lamps 500, due to various factors such as errors occurring in production processes of some components, the actual timing of conduction of each of the ballast-compatible circuits 1610 is different. Upon activation of a lamp driving circuit 505, the voltage of the AC driving signal provided by the lamp driving circuit 505 will be shared out by the two LED tube lamps 500 roughly equally. Subsequently when only one of the two LED tube lamps 500 first enters a conducting state, the voltage of the AC driving signal then will be borne mostly or entirely by the other LED tube lamp 500. This situation will cause the voltage across the ballast-compatible circuits 1610 in the other LED tube lamp 500 that's not conducting to suddenly increase or be doubled, meaning the voltage between the ballast-compatible circuit input and output terminals 1611 and 1621 might even be suddenly doubled. In view of this, if the capacitor 1623 is included, the voltage division effect between the capacitors 1619 and 1623 will instantaneously increase the voltage of the capacitor 1619, making the symmetrical trigger diode 1617 triggering the bidirectional triode thyristor 1614 into a conducting state, thus causing the two ballast-compatible circuits 1610 respectively of the two LED tube lamps 500 to become conducting almost at the same time. Therefore, by introducing the capacitor 1623, the situation, where one of the two ballast-compatible circuits 1610 respectively of the two series-connected LED tube lamps 500 that is first conducting has its bidirectional triode thyristor 1614 then suddenly cutoff as having insufficient current passing through due to the discrepancy between the delays provided by the two ballast-compatible circuits 1610 until their respective conductions, can be avoided. Therefore, using each ballast-compatible circuit 1610 with the capacitor 1623 further improves the compatibility of the series-connected LED tube lamps with each of the lamp driving circuits 505 such as an electronic ballast.

In practical use, a suggested range for the capacitance of the capacitor 1623 is about 10 pF to about 1 nF, which may in some cases be in the range of about 10 pF to about 100 pF, and may be about 47 pF in certain embodiments.

It's worth noting that the diode 1612 is used or configured to rectify the signal for charging the capacitor 1619. Therefore, with reference to FIGS. 33C, 33D, and 33E, in the case when the ballast-compatible circuit 1610 is arranged following a rectifying unit or circuit, the diode 1612 may be omitted. Thus the diode 1612 is depicted in a dotted line in FIG. 33F.

Figure 33H:
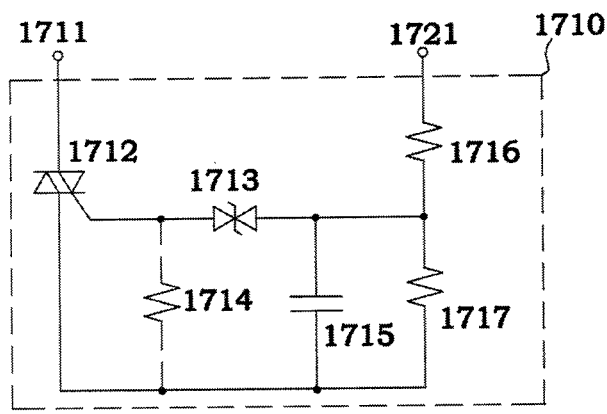
FIG. 33H is a schematic diagram of a ballast-compatible circuit according to some embodiments of the present invention.

FIG. 33H is a schematic diagram of the ballast-compatible circuit according to another embodiment of the present invention. Referring to FIG. 33H, a ballast-compatible circuit 1710 has an initial state in which an equivalent open-circuit is obtained at the ballast-compatible circuit input and output terminals 1711 and 1721. Upon receiving an input signal at the ballast-compatible circuit input terminal 1711, the ballast-compatible circuit 1710 will be in a cutoff state when the logic level of the input external driving signal is below a defined value corresponding to a conduction delay of the ballast-compatible circuit 1710; and the ballast-compatible circuit 1710 will enter a conducting state upon the logic level of the input external driving signal reaching the defined value, thus transmitting the input signal to the ballast-compatible circuit output terminal 1721. In some cases, the defined value is equal to or bigger than 400V.

The ballast-compatible circuit 1710 includes a bidirectional triode thyristor (TRIAC) 1712, a DIAC or symmetrical trigger diode 1713, multiple resistors 1714, 1716, and 1717, and a capacitor 1715. The bidirectional triode thyristor 1712 has a first terminal connected to the ballast-compatible circuit input terminal 1711; a control terminal connected to a terminal of the symmetrical trigger diode 1713 and an end of the resistor 1714; and a second terminal connected to another end of the resistor 1714. The capacitor 1715 has an end connected to another terminal of the symmetrical trigger diode 1713, and has another end connected to the second terminal of the bidirectional triode thyristor 1712. The resistor 1717 is in parallel connection with the capacitor 1715, and is therefore also connected to another terminal of the symmetrical trigger diode 1713 and the second terminal of the bidirectional triode thyristor 1712 mentioned above. And the resistor 1716 has an end connected to the node connecting the capacitor 1715 and the symmetrical trigger diode 1713, and has another end connected to the ballast-compatible circuit output terminal 1721.

When an AC driving signal (such as a high-frequency high-voltage AC signal output by an electronic ballast) is initially input to the ballast-compatible circuit input terminal 1711, the bidirectional triode thyristor 1712 will be in an open-circuit state, not allowing the AC driving signal to pass through and the LED lamp is therefore also in an open-circuit state. The input of the AC driving signal causes a potential difference between the ballast-compatible circuit input terminal 1711 and the ballast-compatible circuit output terminal 1721. When the AC driving signal increases with time to eventually reach a sufficient amplitude (which is a defined logic level after the delay) after a period of time, the signal logic level at the ballast-compatible circuit output terminal 1721 has a reflected voltage at the control terminal of the bidirectional triode thyristor 1712 after passing through the resistor 1716, the parallel-connected capacitor 1715 and the resistor 1717, and the resistor 1714, wherein the reflected voltage then triggers the bidirectional triode thyristor 1712 into a conducting state. This conducting state makes the ballast-compatible circuit 1710 entering a conducting state which causes the LED lamp to operate normally. Upon the bidirectional triode thyristor 1712 conducting, a current flows through the resistor 1716 and then charges the capacitor 1715 to store a specific voltage on the capacitor 1715. In this case, the energy stored by the capacitor 1715 will maintain the conducting state of the bidirectional triode thyristor 1712, to prevent the AC variation of the AC driving signal from causing the bidirectional triode thyristor 1712 (or the ballast-compatible circuit 1710) to be cutoff again, or to prevent the situation of the bidirectional triode thyristor 1712 alternating or switching between its conducting and cutoff states.

Figure 33I:
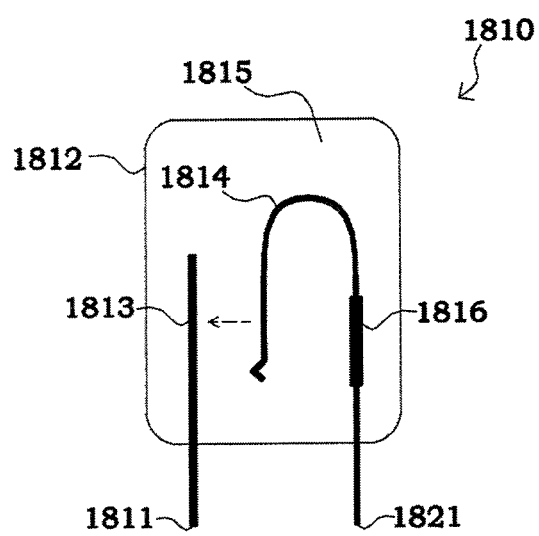
FIG. 33I illustrates a ballast-compatible circuit according to some embodiments of the present invention.

FIG. 33I illustrates the ballast-compatible circuit according to an embodiment of the present invention. Referring to FIG. 33I, a ballast-compatible circuit 1810 includes a housing 1812, a metallic electrode 1813, a bimetallic strip 1814, and a heating filament 1816. The metallic electrode 1813 and the heating filament 1816 protrude from the housing 1812, so that they each have a portion inside the housing 1812 and a portion outside of the housing 1812. The metallic electrode 1813's outside portion has a ballast-compatible circuit input terminal 1811, and the heating filament 1816's outside portion has a ballast-compatible circuit output terminal 1821. The housing 1812 is hermetic or tightly sealed and contains inertial gas 1815 such as helium gas. The bimetallic strip 1814 is inside the housing 1812 and is physically and electrically connected to the portion of heating filament 1816 that is inside the housing 1812. And there is a spacing between the bimetallic strip 1814 and the metallic electrode 1813, so that the ballast-compatible circuit input terminal 1811 and the ballast-compatible circuit output terminal 1821 are not electrically connected in the initial state of the ballast-compatible circuit 1810. The bimetallic strip 1814 may include two metallic strips with different temperature coefficients, wherein the metallic strip closer to the metallic electrode 1813 has a smaller temperature coefficient, and the metallic strip more away from the metallic electrode 1813 has a larger temperature coefficient.

When an AC driving signal (such as a high-frequency high-voltage AC signal output by an electronic ballast) is initially input at the ballast-compatible circuit input terminal 1811 and the ballast-compatible circuit output terminal 1821, a potential difference between the metallic electrode 1813 and the heating filament 1816 is formed. When the potential difference increases enough to cause electric arc or arc discharge through the inertial gas 1815, meaning when the AC driving signal increases with time to eventually reach the defined logic level after a delay, then the inertial gas 1815 is then heated to cause the bimetallic strip 1814 to swell toward the metallic electrode 1813 (as in the direction of the broken-line arrow in FIG. 33I), with this swelling eventually causing the bimetallic strip 1814 to bear against or close to the metallic electrode 1813, forming the physical and electrical connections between them. In this situation, there is electrical conduction between the ballast-compatible circuit input terminal 1811 and the ballast-compatible circuit output terminal 1821. Then the AC driving signal flows through and thus heats the heating filament 1816. In this heating process, the heating filament 1816 allows a current to flow through when electrical conduction exists between the metallic electrode 1813 and the bimetallic strip 1814, causing the temperature of the bimetallic strip 1814 to be above a defined conduction temperature. As a result, since the respective temperature of the two metallic strips of the bimetallic strip 1814 with different temperature coefficients are maintained above the defined conduction temperature, the bimetallic strip 1814 will bend against or toward the metallic electrode 1813, thus maintaining or supporting the physical joining or connection between the bimetallic strip 1814 and the metallic electrode 1813. Therefore, upon receiving an input signal at the ballast-compatible circuit input and output terminals 1811 and 1821, a delay will pass until an electrical/current conduction occurs through and between the ballast-compatible circuit input and output terminals 1811 and 1821.

Therefore, an exemplary ballast-compatible circuit such as described herein may be coupled between any pin and any rectifying circuit described above in the invention, wherein the ballast-compatible circuit will be in a cutoff state in a defined delay upon an external driving signal being input to the LED tube lamp, and will enter a conducting state after the delay. Otherwise, the ballast-compatible circuit will be in a cutoff state when the logic level of the input external driving signal is below a defined value corresponding to a conduction delay of the ballast-compatible circuit; and the ballast-compatible circuit will enter a conducting state upon the logic level of the input external driving signal reaching the defined value. Accordingly, the compatibility of the LED tube lamp described herein with the lamp driving circuits 505 such as an electronic ballast is further improved by using such a ballast-compatible circuit.

Figure 34A:
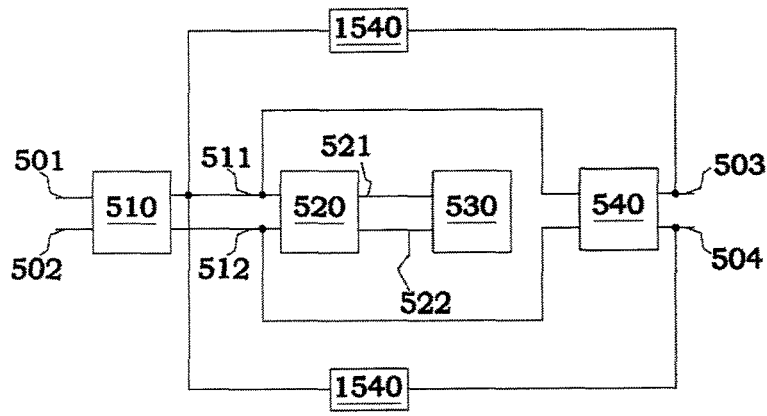
FIG. 34A is a block diagram of an exemplary power supply module in an LED tube lamp according to some embodiments of the present invention.

FIG. 34A is a block diagram of a power supply module in an LED tube lamp according to an embodiment of the present invention. Compared to that shown in FIG. 24B, the present embodiment comprises two rectifying circuits 510 and 540, a filtering circuit 520, and a driving circuit 1530, and further comprises two ballast-compatible circuits 1540. In this embodiment, a driving circuit 1530 and an LED module 630 compose the LED lighting module 530. The two ballast-compatible circuits 1540 are coupled respectively between the pin 503 and the rectifying output terminal 511 and between the pin 504 and the rectifying output terminal 511. Referring to FIG. 24A, the lamp driving circuit 505 is an electronic ballast for supplying an AC driving signal to drive the LED lamp of the present invention.

Two ballast-compatible circuits 1540 are initially in conducting states, and then enter into cutoff states in a delay. Therefore, in an initial stage upon activation of the lamp driving circuit 505, the AC driving signal is transmitted through the pin 503, the corresponding ballast-compatible circuit 1540, the rectifying output terminal 511 and the rectifying circuit 510, or through the pin 504, the corresponding ballast-compatible circuit 1540, the rectifying output terminal 511 and the rectifying circuit 510 of the LED lamp, and the filtering circuit 520 and the LED lighting module 530 of the LED lamp are bypassed. Thereby, the LED lamp presents almost no load and does not affect the quality factor of the lamp driving circuit 505 at the beginning, and so the lamp driving circuit can be activated successfully. The two ballast-compatible circuits 1540 are cut off after a time period while the lamp driving circuit 505 has been activated successfully. After that, the lamp driving circuit 505 has a sufficient drive capability for driving the LED lamp to emit light.

Figure 34B:
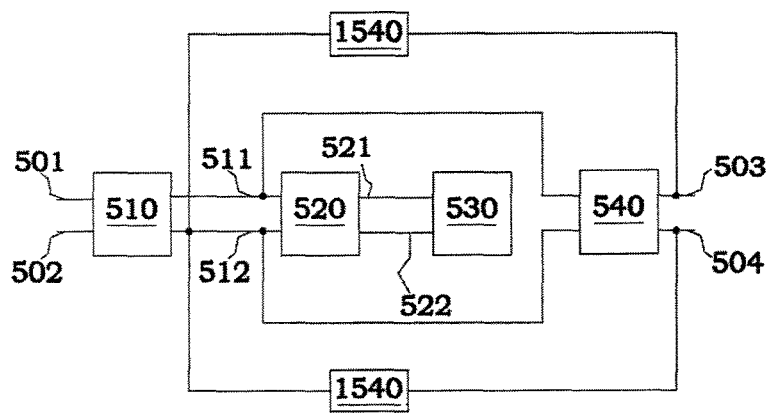
FIG. 34B is a block diagram of an exemplary power supply module in an LED tube lamp according to some embodiments of the present invention.

FIG. 34B is a block diagram of a power supply module in an LED tube lamp according to an embodiment of the present invention. Compared to that shown in FIG. 34A, two ballast-compatible circuits 1540 are changed to be coupled respectively between the pin 503 and the rectifying output terminal 512 and between the pin 504 and the rectifying output terminal 512. Similarly, two ballast-compatible circuits 1540 are initially in conducting states, and then changed to cutoff states after an objective delay. Thereby, the lamp driving circuit 505 drives the LED lamp to emit light after the lamp driving circuit 505 has activated.

It is worth noting that the arrangement of the two ballast-compatible circuits 1540 may be changed to be coupled between the pin 501 and the rectifying terminal 511 and between the pin 502 and the rectifying terminal 511, or between the pin 501 and the rectifying terminal 512 and between the pin 502 and the rectifying terminal 512, for having the lamp driving circuit 505 drive the LED lamp to emit light after being activated.

Figure 34C:
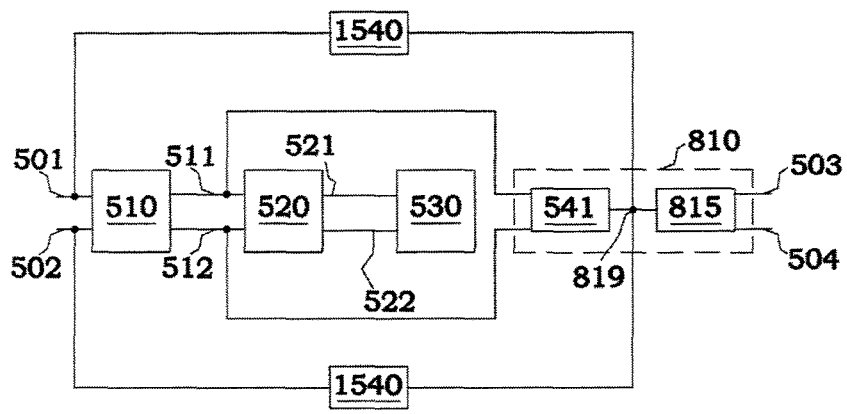
FIG. 34C is a block diagram of an exemplary power supply module in an LED tube lamp according to some embodiments of the present invention.

FIG. 34C is a block diagram of a power supply module in an LED tube lamp according to an embodiment of the present invention. Compared to that shown in FIGS. 34A and 34B, the rectifying circuit 810 shown in FIG. 25C replaces the rectifying circuit 540, and the rectifying unit 815 of the rectifying circuit 810 is coupled to the pins 503 and 504 and the terminal adapter circuit 541 thereof is coupled to the rectifying output terminals 511 and 512. The arrangement of the two ballast-compatible circuits 1540 is also changed to be coupled respectively between the pin 501 and the half-wave node 819 and between the pin 502 and the half-wave node 819.

In an initial stage upon activation of the lamp driving circuit 505, two ballast-compatible circuits 1540 are initially in conducting states. At this moment, the AC driving signal is transmitted through the pin 501, the corresponding ballast-compatible circuit 1540, the half-wave node 819 and the rectifying unit 815, or the pin 502, the corresponding ballast-compatible circuit 1540, the half-wave node 819 and the rectifying unit 815 of the LED lamp, and the terminal adapter circuit 541, the filtering circuit 520 and the LED lighting module 530 of the LED lamp are bypassed. Thereby, the LED lamp presents almost no load and does not affect the quality factor of the lamp driving circuit 505 at the beginning, and so the lamp driving circuit can be activated successfully. The two ballast-compatible circuits 1540 are cut off after a time period while the lamp driving circuit 505 has been activated successfully. After that, the lamp driving circuit 505 has a sufficient drive capability for driving the LED lamp to emit light.

It is worth noting that the rectifying circuit 810 shown in FIG. 25C may replace the rectifying circuit 510 of the present embodiment shown in FIG. 34C. Wherein, the rectifying unit 815 of the rectifying circuit 810 is coupled to the pins 501 and 502 and the terminal adapter circuit 541 thereof is coupled to the rectifying output terminals 511 and 512. The arrangement of the two ballast-compatible circuits 1540 is also changed to be coupled respectively between the pin 503 and the half-wave node 819 and between the pin 504 and the half-wave node 819. Accordingly, the ballast-compatible circuit 1540 can still make the lamp driving circuit 505 drive the LED lamp to emit light after being activated.

Figure 34D:
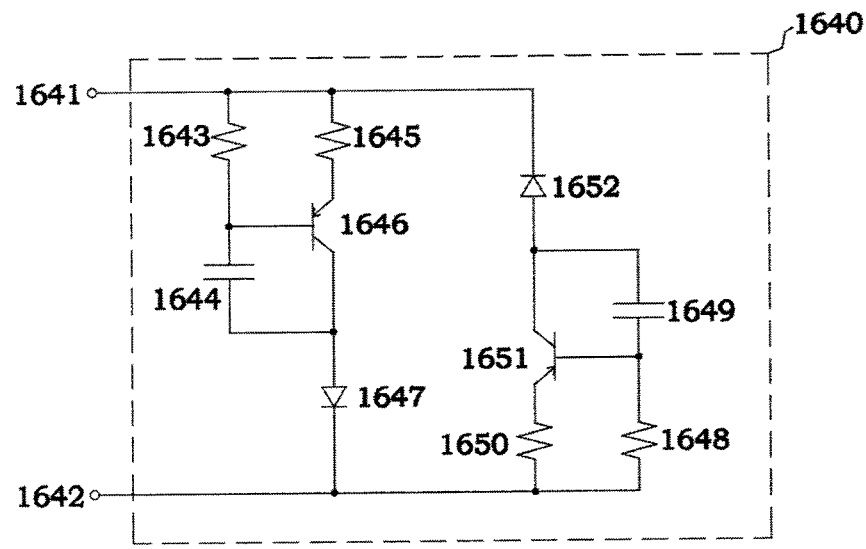
FIG. 34D is a schematic diagram of a ballast-compatible circuit according to some embodiments of the present invention.

FIG. 34D is a schematic diagram of a ballast-compatible circuit according to an embodiment of the present invention, which is applicable to the embodiments shown in FIGS. 34A and 34C and the described modification thereof.

A ballast-compatible circuit 1640 comprises multiple resistors 1643, 1645, 1648 and 1650, two capacitors 1644 and 1649, two diodes 1647 and 1652, two bipolar junction transistors (BJT) 1646 and 1651, a ballast-compatible circuit terminal 1641 and a ballast-compatible circuit terminal 1642. One end of the resistor 1645 is coupled to the ballast-compatible circuit terminal 1641, and the other end is coupled to an emitter of the BJT 1646. A collector of the BJT 1646 is coupled to a positive end of the diode 1647, and a negative end thereof is coupled to the ballast-compatible circuit terminal 1642. The resistor 1643 and the capacitor 1644 are connected in series with each other and coupled between the emitter and the collector of the BJT 1646, and the connection node of the resistor 1643 and the capacitor 1644 is coupled to a base of the BJT 1646. One end of the resistor 1650 is coupled to the ballast-compatible circuit terminal 1642, and the other end is coupled to an emitter of the BJT 1651. A collector of the BJT 1651 is coupled to a positive end of the diode 1652, and a negative end thereof is coupled to the ballast-compatible circuit terminal 1641. The resistor 1648 and the capacitor 1649 are connected in series with each other and coupled between the emitter and the collector of the BJT 1651, and the connection node of the resistor 1648 and the capacitor 1649 is coupled to a base of the BJT 1651.

In an initial stage upon the lamp driving circuit 505, e.g. electronic ballast, being activated, voltages across the capacitors 1644 and 1649 are about zero. At this time, the BJTs 1646 and 1651 are in conducting state and the bases thereof allow currents to flow through. Therefore, in an initial stage upon activation of the lamp driving circuit 505, the ballast-compatible circuits 1640 are in conducting state. The AC driving signal charges the capacitor 1644 through the resistor 1643 and the diode 1647, and charges the capacitor 1649 through the resistor 1648 and the diode 1652. After a time period, the voltages across the capacitors 1644 and 1649 reach certain voltages so as to reduce the voltages of the resistors 1643 and 1648, thereby cutting off the BJTs 1646 and 1651, i.e., the states of the BJTs 1646 and 1651 are cutoff states. At this time, the state of the ballast-compatible circuit 1640 is changed to the cutoff state. Thereby, the internal capacitor(s) and inductor(s) do not affect in Q-factor of the lamp driving circuit 505 at the beginning for ensuring the lamp driving circuit activating. Hence, the ballast-compatible circuit 1640 improves the compatibility of LED lamp with the electronic ballast.

In summary, the two ballast-compatible circuits of the present invention are respectively coupled between a connection node of the rectifying circuit and the filtering circuit (i.e., the rectifying output terminal 511 or 512) and the pin 501 and between the connection node and the pin 502, or coupled between the connection node and the pin 503 and the connection node and the pin 504. The two ballast-compatible circuits conduct for an objective delay upon the external driving signal being input into the LED tube lamp, and then are cut off after the objective delay for enhancing the compatibility of the LED lamp with the electronic ballast.

Figure 35A:
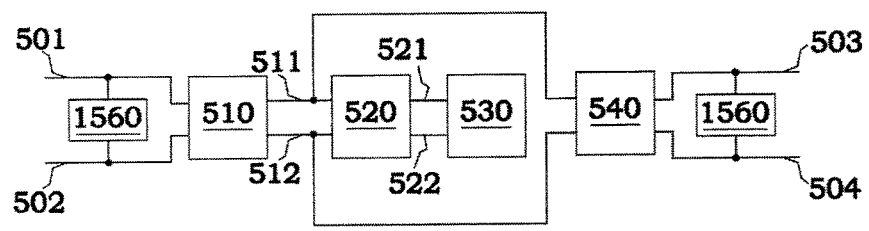
FIG. 35A is a block diagram of an exemplary power supply module in an LED tube lamp according to some embodiments of the present invention.

FIG. 35A is a block diagram of a power supply module in an LED tube lamp according to an embodiment of the present invention. Compared to that shown in FIG. 24B, the LED tube lamp comprises two rectifying circuits 510 and 540, a filtering circuit 520, and an LED lighting module 530, and further comprises two filament-simulating circuits 1560. The filament-simulating circuits 1560 are respectively coupled between the pins 501 and 502 and coupled between the pins 503 and 504, for improving a compatibility with a lamp driving circuit having filament detection function, e.g.: program-start ballast.

In an initial stage upon the lamp driving circuit having filament detection function being activated, the lamp driving circuit will determine whether the filaments of the lamp operate normally or are in an abnormal condition of short-circuit or open-circuit. Once determining the abnormal condition of the filaments, the lamp driving circuit stops operating and enters a protection state. In order to avoid a situation where the lamp driving circuit erroneously determines the LED tube lamp to be abnormal due to the LED tube lamp having no filament, the two filament-simulating circuits 1560 simulate the operation of actual filaments of a fluorescent tube to have the lamp driving circuit enter into a normal state to start the LED lamp normally.

Figure 35B:
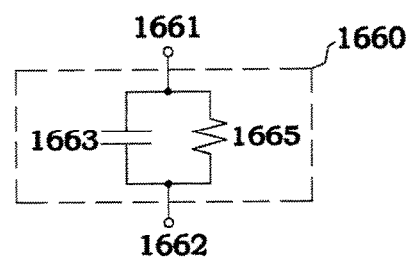
FIG. 35B is a schematic diagram of a filament-simulating circuit according to some embodiments of the present invention.

FIG. 35B is a schematic diagram of a filament-simulating circuit according to an embodiment of the present invention. The filament-simulating circuit comprises a capacitor 1663 and a resistor 1665 connected in parallel, and two ends of the capacitor 1663 and two ends of the resistor 1665 are re respectively coupled to the filament simulating terminals 1661 and 1662. Referring to FIG. 35A, the filament simulating terminals 1661 and 1662 of the two filament simulating circuits 1660 are respectively coupled to the pins 501 and 502 and the pins 503 and 504. During the filament detection process, the lamp driving circuit outputs a detection signal to detect the state of the filaments. The detection signal passes the capacitor 1663 and the resistor 1665 and so the lamp driving circuit determines that the filaments of the LED lamp are normal.

In addition, a capacitance value of the capacitor 1663 is low and so a capacitive reactance (equivalent impedance) of the capacitor 1663 is far lower than an impedance of the resistor 1665 due to the lamp driving circuit outputting a high-frequency alternative current (AC) signal to drive LED lamp. Therefore, the filament-simulating circuit 1660 consumes fairly low power when the LED lamp operates normally, and so it almost does not affect the luminous efficiency of the LED lamp.

Figure 35C:
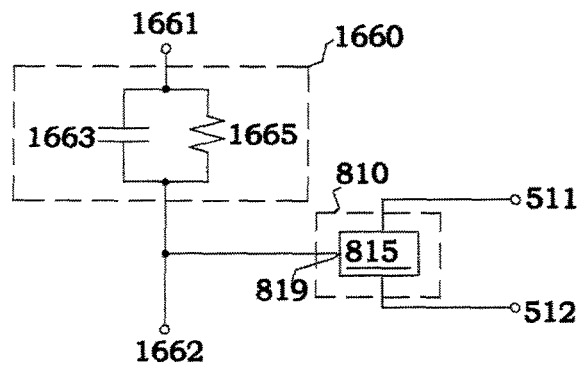
FIG. 35C is a schematic block diagram including a filament-simulating circuit according to some embodiments of the present invention.

FIG. 35C is a schematic block diagram including a filament-simulating circuit according to an embodiment of the present invention. In the present embodiment, the filament-simulating circuit 1660 replaces the terminal adapter circuit 541 of the rectifying circuit 810 shown in FIG. 25C, which is adopted as the rectifying circuit(s) 510 or/and 540 in the LED lamp. For example, the filament-simulating circuit 1660 of the present embodiment has both of filament simulating and terminal adapting functions. Referring to FIG. 35A, the filament simulating terminals 1661 and 1662 of the filament-simulating circuit 1660 are respectively coupled to the pins 501 and 502 or/and pins 503 and 504. The half-wave node 819 of the rectifying unit 815 in the rectifying circuit 810 is coupled to the filament simulating terminal 1662.

Figure 35D:
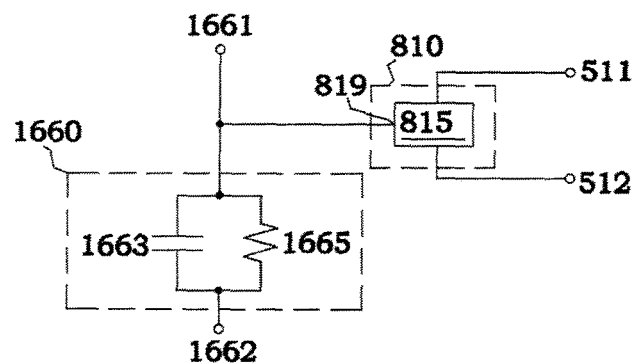
FIG. 35D is a schematic block diagram including a filament-simulating circuit according to some embodiments of the present invention.

FIG. 35D is a schematic block diagram including a filament-simulating circuit according to another embodiment of the present invention. Compared to that shown in FIG. 35C, the half-wave node is changed to be coupled to the filament simulating terminal 1661, and the filament-simulating circuit 1660 in the present embodiment still has both of filament simulating and terminal adapting functions.

Figure 35E:
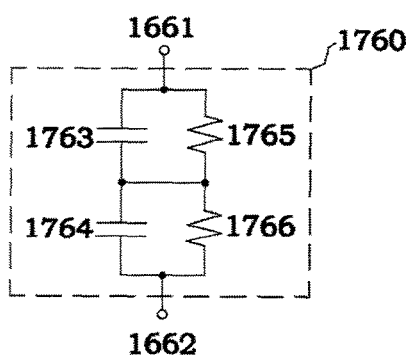
FIG. 35E is a schematic diagram of a filament-simulating circuit according to some embodiments of the present invention.

FIG. 35E is a schematic diagram of a filament-simulating circuit according to another embodiment of the present invention. A filament-simulating circuit 1760 comprises two capacitors 1763 and 1764, and two resistors 1765 and 1766. The capacitors 1763 and 1764 are connected in series and coupled between the filament simulating terminals 1661 and 1662. The resistors 1765 and 1766 are connected in series and coupled between the filament simulating terminals 1661 and 1662. Furthermore, the connection node of the capacitors 1763 and 1764 is coupled to that of the resistors 1765 and 1766. Referring to FIG. 35A, the filament simulating terminals 1661 and 1662 of the filament-simulating circuit 1760 are respectively coupled to the pins 501 and 502 and the pins 503 and 504. When the lamp driving circuit outputs the detection signal for detecting the state of the filament, the detection signal passes the capacitors 1763 and 1764 and the resistors 1765 and 1766 so that the lamp driving circuit determines that the filaments of the LED lamp are normal.

It is worth noting that in some embodiments, capacitance values of the capacitors 1763 and 1764 are low and so a capacitive reactance of the serially connected capacitors 1763 and 1764 is far lower than an impedance of the serially connected resistors 1765 and 1766 due to the lamp driving circuit outputting the high-frequency AC signal to drive LED lamp. Therefore, the filament-simulating circuit 1760 consumes fairly low power when the LED lamp operates normally, and so it almost does not affect the luminous efficiency of the LED lamp. Moreover, any one of the capacitor 1763 and the resistor 1765 is short circuited or is an open circuit, or any one of the capacitor 1764 and the resistor 1766 is short circuited or is an open circuit, the detection signal still passes through the filament-simulating circuit 1760 between the filament simulating terminals 1661 and 1662. Therefore, the filament-simulating circuit 1760 still operates normally when any one of the capacitor 1763 and the resistor 1765 is short circuited or is an open circuit or any one of the capacitor 1764 and the resistor 1766 is short circuited or is an open circuit, and so it has quite high fault tolerance.

The embodiment of filament-simulating circuit mentioned above could use ceramic capacitor or metallized polypropylene film capacitor, such as the ceramic capacitor in class 2, the metallized polypropylene film capacitor (X2). When the metallized polypropylene film capacitor (X2) is adopted, since its capacitance is smaller than 100 nF and it has a small inherent impedance, it can make the current of the filament-simulating circuit down to tens mA to reduce power consumption. Also, the heating caused by the inherent impedance is smaller, the temperature could be above 70 degrees Celsius or even in the range of 50-60 degrees Celsius.

In some cases, the circuit design adopts the flexible sheet to make all of or some of the LED components and the active/passive parts of the AC power module being able to be disposed on the same flexible sheet or different flexible sheets to simplify the structure design in the LED lamp. The capacitor(s) may be preferable to, for example, X7R multi-layer ceramic capacitor and the capacitance thereof can in some embodiments be bigger than 100 nF.

Figure 35F:
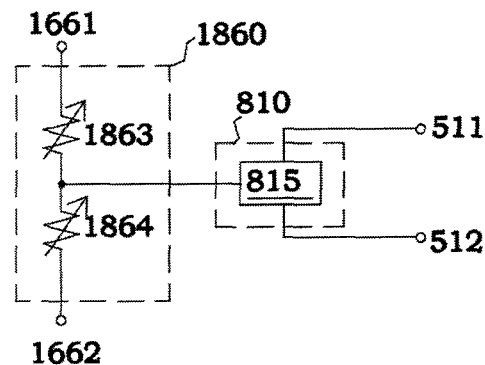
FIG. 35F is a schematic block diagram including a filament-simulating circuit according to some embodiments of the present invention.

FIG. 35F is a schematic block diagram including a filament-simulating circuit according to an embodiment of the present invention. In the present embodiment, the filament-simulating circuit 1860 replaces the terminal adapter circuit 541 of the rectifying circuit 810 shown in FIG. 25C, which is adopted as the rectifying circuit 510 or/and 540 in the LED lamp. For example, the filament-simulating circuit 1860 of the present embodiment has both of filament simulating and terminal adapting functions. An impedance of the filament-simulating circuit 1860 has a negative temperature coefficient (NTC), i.e., the impedance at a higher temperature is lower than that at a lower temperature. In the present embodiment, the filament-simulating circuit 1860 comprises two NTC resistors 1863 and 1864 connected in series and coupled to the filament simulating terminals 1661 and 1662. Referring to FIG. 35A, the filament simulating terminals 1661 and 1662 are respectively coupled to the pins 501 and 502 or/and the pins 503 and 504. The half-wave node 819 of the rectifying unit 815 in the rectifying circuit 810 is coupled to a connection node of the NTC resistors 1863 and 1864.

When the lamp driving circuit outputs the detection signal for detecting the state of the filament, the detection signal passes the NTC resistors 1863 and 1864 so that the lamp driving circuit determines that the filaments of the LED lamp are normal. The impedance of the serially connected NTC resistors 1863 and 1864 is gradually decreased with the gradually increasing of temperature due to the detection signal or a preheat process. When the lamp driving circuit enters into the normal state to start the LED lamp normally, the impedance of the serially connected NTC resistors 1863 and 1864 is decreased to a relative low value and so the power consumption of the filament simulation circuit 1860 is lower.

An exemplary impedance of the filament-simulating circuit 1860 can be 10 ohms or more at room temperature (25 degrees Celsius) and may be decreased to a range of about 2-10 ohms when the lamp driving circuit enters into the normal state. It may be preferred that the impedance of the filament-simulating circuit 1860 is decreased to a range of about 3-6 ohms when the lamp driving circuit enters into the normal state.

Figure 36A:
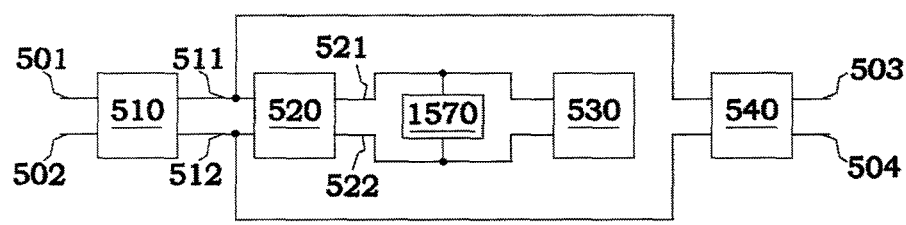
FIG. 36A is a block diagram of an exemplary power supply module in an LED tube lamp according to some embodiments of the present invention.

FIG. 36A is a block diagram of a power supply module in an LED tube lamp according to an embodiment of the present invention. Compared to that shown in FIG. 24B, the present embodiment comprises two rectifying circuits 510 and 540, a filtering circuit 520, and an LED lighting module 530, and further comprises an over voltage protection (OVP) circuit 1570. The OVP circuit 1570 is coupled to the filtering output terminals 521 and 522 for detecting the filtered signal. The OVP circuit 1570 clamps the logic level of the filtered signal when determining the logic level thereof higher than a defined OVP value. Hence, the OVP circuit 1570 protects the LED lighting module 530 from damage due to an OVP condition.

Figure 36B:
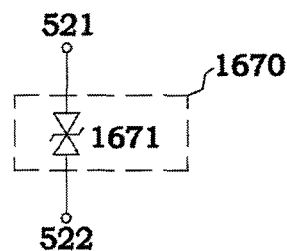
FIG. 36B is a schematic diagram of an OVP circuit according to an embodiment of the present invention.

FIG. 36B is a schematic diagram of an overvoltage protection (OVP) circuit according to an embodiment of the present invention. An OVP circuit 1670 comprises a voltage clamping diode 1671, such as zener diode, coupled to the filtering output terminals 521 and 522. The voltage clamping diode 1671 is conducted to clamp a voltage difference at a breakdown voltage when the voltage difference of the filtering output terminals 521 and 522 (i.e., the logic level of the filtered signal) reaches the breakdown voltage. The breakdown voltage may be preferred in a range of about 40 V to about 100 V, and more preferred in a range of about 55 V to about 75V.

Figure 37A:
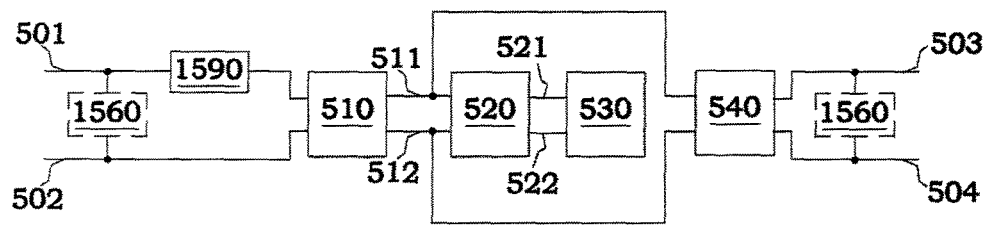
FIG. 37A is a block diagram of an exemplary power supply module in an LED tube lamp according to some embodiments of the present invention.

FIG. 37A is a block diagram of a power supply module in an LED tube lamp according to an embodiment of the present invention. Compared to that shown in FIG. 35A, the present embodiment comprises two rectifying circuits 510 and 540, a filtering circuit 520, an LED lighting module 530 and two filament-simulating circuits 1560, and further comprises a ballast detection circuit 1590. The ballast detection circuit 1590 may be coupled to any one of the pins 501, 502, 503 and 504 and a corresponding rectifying circuit of the rectifying circuits 510 and 540. In the present embodiment, the ballast detection circuit 1590 is coupled between the pin 501 and the rectifying circuit 510.

The ballast detection circuit 1590 detects the AC driving signal or a signal input through the pins 501, 502, 503 and 504, and determines whether the input signal is provided by an electric ballast based on the detected result.

Figure 37B:
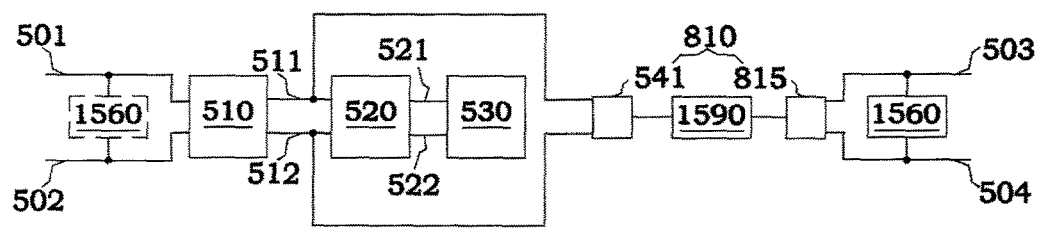
FIG. 37B is a block diagram of an exemplary power supply module in an LED tube lamp according to some embodiments of the present invention.

FIG. 37B is a block diagram of a power supply module in an LED tube lamp according to an embodiment of the present invention. Compared to that shown in FIG. 37A, the rectifying circuit 810 shown in FIG. 25C replaces the rectifying circuit 540 in the present embodiment. The ballast detection circuit 1590 is coupled between the rectifying unit 815 and the terminal adapter circuit 541. One of the rectifying unit 815 and the terminal adapter circuit 541 is coupled to the pins 503 and 504, and the other one is coupled to the rectifying output terminals 511 and 512. In the present embodiment, the rectifying unit 815 is coupled to the pins 503 and 504, and the terminal adapter circuit 541 is coupled to the rectifying output terminals 511 and 512. Similarly, the ballast detection circuit 1590 detects the signal input through the pins 503 and 504 for determining the input signal whether provided by an electric ballast according to the frequency of the input signal.

In addition, the rectifying circuit 810 may replace the rectifying circuit 510 instead of the rectifying circuit 540, and the ballast detection circuit 1590 is coupled between the rectifying unit 815 and the terminal adapter circuit 541 in the rectifying circuit 510.

Figure 37C:
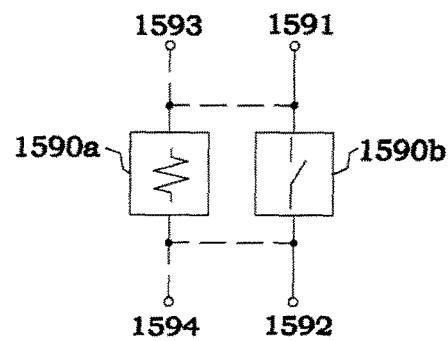
FIG. 37C is a block diagram of a ballast detection circuit according to some embodiments of the present invention.

FIG. 37C is a block diagram of a ballast detection circuit according to an embodiment of the present invention. A ballast detection circuit 1590 comprises a detection circuit 1590*a* and a switch circuit 1590*b*. The switch circuit 1590*b* is coupled to two switch terminals 1591 and 1592. The detection circuit 1590*a* is coupled to two detection terminals 1593 and 1594 for detecting a signal transmitted through the detection terminals 1593 and 1594. Alternatively, the switch terminals 1591 and 1592 serves as the detection terminals and the detection terminals 1593 and 1594 are omitted. For example, in certain embodiments, the switch circuit 1590*b* and the detection circuit 1590*a* are commonly coupled to the switch terminals 1591 and 1592, and the detection circuit 1590*a* detects a signal transmitted through the switch terminals 1591 and 1592. Hence, the detection terminals 1593 and 1594 are depicted by dotted lines.

Figures 37D, 37E:
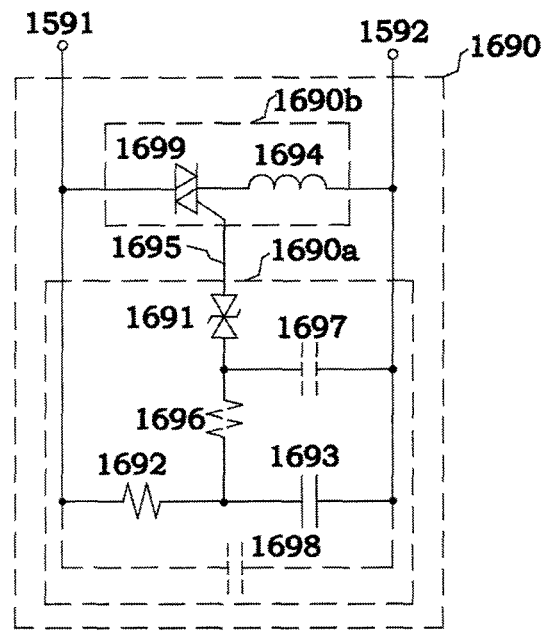
FIG. 37D is a schematic diagram of a ballast detection circuit according to some embodiments of the present invention.
FIG. 37E is a schematic diagram of a ballast detection circuit according to some embodiments of the present invention.

FIG. 37D is a schematic diagram of a ballast detection circuit according to an embodiment of the present invention. A ballast detection circuit 1690 comprises a detection circuit 1690*a* and a switch circuit 1690*b*, and is coupled between the switch terminals 1591 and 1592. The detection circuit 1690*a* comprises a symmetrical trigger diode 1691, two resistors 1692 and 1696 and multiple capacitors 1693, 1697 and 1698. The switch circuit 1690*b* comprises a TRIAC 1699 and an inductor 1694.

The capacitor 1698 is coupled between the switch terminals 1591 and 1592 for generating a detection voltage in response to a signal transmitted through the switch terminals 1591 and 1592. When the signal is a high frequency signal, the capacitive reactance of the capacitor 1698 is fairly low and so the detection voltage generated thereby is quite small. Whereas the signal is a low frequency signal or a DC signal, the capacitive reactance of the capacitor 1698 is quite high and so the detection voltage generated thereby is quite high. The resistor 1692 and the capacitor 1693 are connected in series and coupled between two ends of the capacitor 1698. The serially connected resistor 1692 and the capacitor 1693 is used to filter the detection signal generated by the capacitor 1698 and generates a filtered detection signal at a connection node thereof. The filter function of the resistor 1692 and the capacitor 1693 is used to filter high frequency noise in the detection signal for preventing the switch circuit 1690*b* from misoperation due to the high frequency noise. The resistor 1696 and the capacitor 1697 are connected in series and coupled between two ends of the capacitor 1693, and transmit the filtered detection signal to one end of the symmetrical trigger diode 1691. The serially connected resistor 1696 and capacitor 1697 performs second filtering of the filtered detection signal to enhance the filter effect of the detection circuit 1690*a*. Based on requirement for filtering logic levels of different applications, the capacitor 1697 may be omitted and the end of the symmetrical trigger diode 1691 is coupled to the connection node of the resistor 1692 and the capacitor 1693 through the resistor 1696.

Alternatively, both of the resistor 1696 and the capacitor 1697 are omitted and the end of the symmetrical trigger diode 1691 is directly coupled to the connection node of the resistor 1692 and the capacitor 1693. Therefore, the resistor 1696 and the capacitor 1697 are depicted by dotted lines. The other end of the symmetrical trigger diode 1691 is coupled to a control end of the TRIAC 1699 of the switch circuit 1690b. The symmetrical trigger diode 1691 determines whether to generate a control signal 1695 to trigger the TRIAC 1699 on according to a logic level of a received signal. A first end of the TRIAC 1699 is coupled to the switch terminal 1591 and a second end thereof is coupled to the switch terminal 1592 through the inductor 1694. The inductor 1694 is used to protect the TRIAC 1699 from damage due to a situation where the signal transmitted into the switch terminals 1591 and 1592 is over a maximum rate of rise of commutation voltage or switching voltage, a repetitive peak voltage in off-state or a maximum rate of change of current.

When the switch terminals 1591 and 1592 receive a low frequency signal or a DC signal, the detection signal generated by the capacitor 1698 is high enough to make the symmetrical trigger diode 1691 generate the control signal 1695 to trigger the TRIAC 1699 on. At this time, the switch terminals 1591 and 1592 are shorted to bypass the circuit(s) connected in parallel with the switch circuit 1690b, such as a circuit coupled between the switch terminals 1591 and 1592, the detection circuit 1690a and the capacitor 1698.

In some embodiments, when the switch terminals 1591 and 1592 receive a high frequency AC signal, the detection signal generated by the capacitor 1698 is not high enough to make the symmetrical trigger diode 1691 generate the control signal 1695 to trigger the TRIAC 1699 on. At this time, the TRIAC 1699 is cut off and so the high frequency AC signal is mainly transmitted through an external circuit or the detection circuit 1690a.

Hence, the ballast detection circuit 1690 can determine whether the input signal is a high frequency AC signal provided by an electric ballast. If yes, the high frequency AC signal is transmitted through the external circuit or the detection circuit 1690a; if no, the input signal is transmitted through the switch circuit 1690b, bypassing the external circuit and the detection circuit 1690a.

It is worth noting that the capacitor 1698 may be replaced by external capacitor(s), such as at least one capacitor in the terminal adapter circuits shown in FIG. 26A-C. Therefore, the capacitor 1698 may be omitted and be therefore depicted by a dotted line.

FIG. 37E is a schematic diagram of a ballast detection circuit according to an embodiment of the present invention. A ballast detection circuit 1790 comprises a detection circuit 1790a and a switch circuit 1790b. The switch circuit 1790b is coupled between the switch terminals 1591 and 1592. The detection circuit 1790a is coupled between the detection terminals 1593 and 1594. The detection circuit 1790a comprises two inductors 1791 and 1792 with mutual induction, two capacitors 1793 and 1796, a resistor 1794 and a diode 1797. The switch circuit 1790b comprises a switch 1799. In the present embodiment, the switch 1799 is a p-type depletion mode MOSFET, which is cut off when the gate voltage is higher than a threshold voltage and is conducted when the gate voltage is lower than the threshold voltage.

The inductor 1792 is coupled between the detection terminals 1593 and 1594 and induces a detection voltage in the inductor 1791 based on a current signal flowing through the detection terminals 1593 and 1594. The logic level of the detection voltage is varied with the frequency of the current signal, and may be increased with the increasing of that frequency and reduced with the decreasing of that frequency.

In some embodiments, when the signal is a high frequency signal, the inductive reactance of the inductor 1792 is quite high and so the inductor 1791 induces the detection voltage with a quite high logic level. When the signal is a low frequency signal or a DC signal, the inductive reactance of the inductor 1792 is quite low and so the inductor 1791 induces the detection voltage with a quite low logic level. One end of the inductor 1791 is grounded. The serially connected capacitor 1793 and resistor 1794 is connected in parallel with the inductor 1791 to receive the detection voltage generated by the inductor 1791 and to filter a high frequency component of the detection voltage to generate a filtered detection voltage. The filtered detection voltage charges the capacitor 1796 through the diode 1797 to generate a control signal 1795. Due to the diode 1797 providing a one-way charge for the capacitor 1796, the logic level of control signal 1795 generated by the capacitor 1796 is the maximum value of the detection voltage. The capacitor 1796 is coupled to the control end of the switch 1799. First and second ends of the switch 1799 are respectively coupled to the switch terminals 1591 and 1592.

When the signal received by the detection terminals 1593 and 1594 is a low frequency signal or a DC signal, the control signal 1795 generated by the capacitor 1796 is lower than the threshold voltage of the switch 1799 and so the switch 1799 are conducted. At this time, the switch terminals 1591 and 1592 are shorted to bypass the external circuit(s) connected in parallel with the switch circuit 1790b, such as at least one capacitor in the terminal adapter circuits those show in FIGS. 26A-C.

When the signal received by the detection terminal 1593 and 1594 is a high frequency signal, the control signal 1795 generated by the capacitor 1796 is higher than the threshold voltage of the switch 1799 and so the switch 1799 are cut off. At this time, the high frequency signal is transmitted by the external circuit(s).

Hence, the ballast detection circuit 1790 can determine whether the input signal is a high frequency AC signal provided by an electric ballast. If yes, the high frequency AC signal is transmitted through the external circuit(s); if no, the input signal is transmitted through the switch circuit 1790b, bypassing the external circuit(s).

Next, exemplary embodiments of the conduction (bypass) and cut off (not bypass) operations of the switch circuit in the ballast detection circuit of an LED lamp will be illustrated. For example, the switch terminals 1591 and 1592 are coupled to a capacitor connected in series with the LED lamp, e.g., a signal for driving the LED lamp also flows through the capacitor. The capacitor may be disposed inside the LED lamp to be connected in series with internal circuit(s) or outside the LED lamp to be connected in series with the LED lamp. When the lamp driving circuit 505 exists, the lamp driving circuit 505 provides a high voltage and high frequency AC driving signal as an external driving signal to drive the LED tube lamp 500. At this moment, the switch circuit of the ballast detection circuit is cut off, and so the capacitor is connected in series with an equivalent capacitor of the internal circuit(s) of the LED tube lamp for forming a capacitive voltage divider network. Thereby, a division voltage applied in the internal circuit(s) of the LED tube lamp is lower than the high voltage and high frequency AC driving signal, e.g.: the division voltage is in a range of 100-270V, and so no over voltage causes the internal circuit (s) damage. Alternatively, the switch terminals 1591 and 1592 is coupled to the capacitor(s) of the terminal adapter circuit shown in FIGS. 26A-C to have the signal flowing through the half-wave node as well as the capacitor(s), e.g., the capacitor 642 in FIG. 26A, or the capacitor 842 in FIG. 26C. When the high voltage and high frequency AC signal generated by the lamp driving circuit 505 is input, the switch circuit is cut off and so the capacitive voltage divider is performed; and when the low frequency AC signal of the commercial power or the direct current of battery is input, the switch circuit bypasses the capacitor(s).

It is worth noting that the switch circuit may have plural switch units to have two or more switch terminals connecting in parallel with plural parallel-connected capacitors (e.g., the capacitors 645 and 646 in FIG. 26A, the capacitors 643, 645 and 646 in FIG. 26A, the capacitors 743 and 744 or/and the capacitors 745 and 746 in FIG. 26B, the capacitors 843 and 844 in FIG. 26C, the capacitors 845 and 846 in FIG. 26C, the capacitors 842, 843 and 844 in FIG. 26C, the capacitors 842, 845 and 846 in FIG. 26C, and the capacitors 842, 843, 844, 845 and 846 in FIG. 26C) to achieve the effect of bypassing the plural capacitors equivalently serial-connected with the LED tube lamp.

In addition, the ballast detection circuit of the present invention can be used in conjunction with the mode switching circuits shown in FIGS. 32A-32I. The switch circuit of the ballast detection circuit is replaced with the mode switching circuit. The detection circuit of the ballast detection circuit is coupled to one of the pins 501, 502, 503 and 504 for detecting the signal input into the LED lamp through the pins 501, 502, 503 and 504. The detection circuit generates a control signal to control the mode switching circuit being at the first mode or the second mode according to whether the signal is a high frequency, low frequency or DC signal, i.e., the frequency of the signal.

For example, when the signal is a high frequency signal and higher than a defined mode switch frequency, such as the signal provided by the lamp driving circuit 505, the control signal generated by the detection circuit makes the mode switching circuit be at the second mode for directly inputting the filtered signal into the LED module. When the signal is a low frequency signal or a direct signal and lower than the defined mode switch frequency, such as the signal provided by the commercial power or the battery, the control signal generated by the detection circuit makes the mode switching circuit be at the first mode for directly inputting the filtered signal into the driving circuit.

Figure 38A:
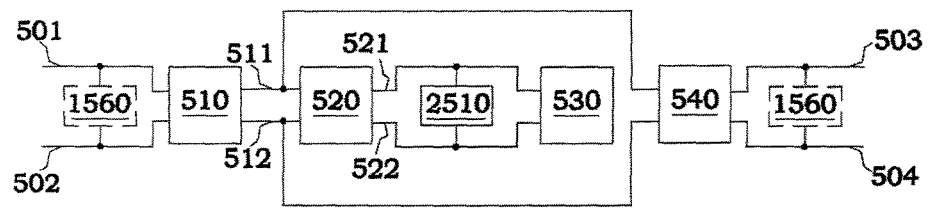
FIG. 38A is a block diagram of an exemplary power supply module in an LED tube lamp according to some embodiments of the present invention.

FIG. 38A is a block diagram of a power supply module in an LED tube lamp according to an embodiment of the present invention. Compared to that shown in FIG. 35A, the present embodiment comprises two rectifying circuits 510 and 540, a filtering circuit 520, an LED lighting module 530, two filament-simulating circuits 1560, and further comprises an auxiliary power module 2510. The auxiliary power module 2510 is coupled between the filtering output terminals 521 and 522. The auxiliary power module 2510 detects the filtered signal in the filtering output terminals 521 and 522, and determines whether providing an auxiliary power to the filtering output terminals 521 and 522 based on the detected result. When the supply of the filtered signal is stopped or a logic level thereof is insufficient, i.e., when a drive voltage for the LED module is below a defined voltage, the auxiliary power module provides auxiliary power to keep the LED lighting module 530 continuing to emit light. The defined voltage is determined according to an auxiliary power voltage of the auxiliary power module 2510. The filament-simulating circuits 1560 may be omitted and are therefore depicted by dotted lines.

Figure 38B:
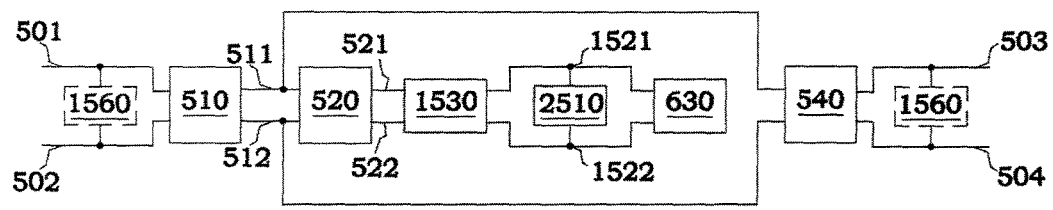
FIG. 38B is a block diagram of an exemplary power supply module in an LED tube lamp according to some embodiments of the present invention.

FIG. 38B is a block diagram of a power supply module in an LED tube lamp according to an embodiment of the present invention. Compared to that shown in FIG. 38A, the present embodiment comprises two rectifying circuits 510 and 540, a filtering circuit 520, an LED lighting module 530, two filament-simulating circuits 1560, and an auxiliary power module 2510, and the LED lighting module 530 further comprises a driving circuit 1530 and an LED module 630. The auxiliary power module 2510 is coupled between the driving output terminals 1521 and 1522. The auxiliary power module 2510 detects the driving signal in the driving output terminals 1521 and 1522, and determines whether to provide an auxiliary power to the driving output terminals 1521 and 1522 based on the detected result. When the driving signal is no longer being supplied or a logic level thereof is insufficient, the auxiliary power module 2510 provides the auxiliary power to keep the LED module 630 continuously light. The filament-simulating circuits 1560 may be omitted and are therefore depicted by dotted lines.

Figure 38C:
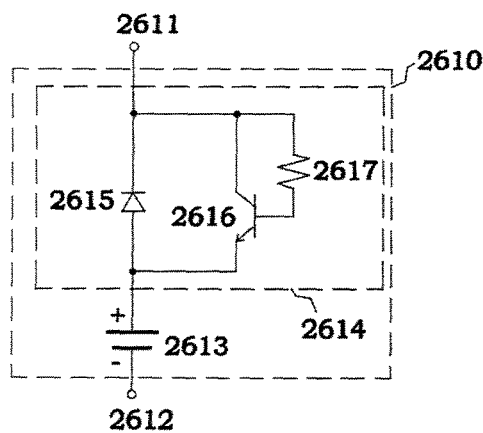
FIG. 38C is a schematic diagram of an auxiliary power module according to an embodiment of the present invention.

FIG. 38C is a schematic diagram of an auxiliary power module according to an embodiment of the present invention. The auxiliary power module 2610 comprises an energy storage unit 2613 and a voltage detection circuit 2614. The auxiliary power module further comprises an auxiliary power positive terminal 2611 and an auxiliary power negative terminal 2612 for being respectively coupled to the filtering output terminals 521 and 522 or the driving output terminals 1521 and 1522. The voltage detection circuit 2614 detects a logic level of a signal at the auxiliary power positive terminal 2611 and the auxiliary power negative terminal 2612 to determine whether releasing outward the power of the energy storage unit 2613 through the auxiliary power positive terminal 2611 and the auxiliary power negative terminal 2612.

In the present embodiment, the energy storage unit 2613 is a battery or a supercapacitor. When a voltage difference of the auxiliary power positive terminal 2611 and the auxiliary power negative terminal 2612 (the drive voltage for the LED module) is higher than the auxiliary power voltage of the energy storage unit 2613, the voltage detection circuit 2614 charges the energy storage unit 2613 by the signal in the auxiliary power positive terminal 2611 and the auxiliary power negative terminal 2612. When the drive voltage is lower than the auxiliary power voltage, the energy storage unit 2613 releases the stored energy outward through the auxiliary power positive terminal 2611 and the auxiliary power negative terminal 2612.

The voltage detection circuit 2614 comprises a diode 2615, a bipolar junction transistor (BJT) 2616 and a resistor 2617. A positive end of the diode 2615 is coupled to a positive end of the energy storage unit 2613 and a negative end of the diode 2615 is coupled to the auxiliary power positive terminal 2611. The negative end of the energy storage unit 2613 is coupled to the auxiliary power negative terminal 2612. A collector of the BJT 2616 is coupled to the auxiliary power positive terminal 2611, and an emitter thereof is coupled to the positive end of the energy storage unit 2613. One end of the resistor 2617 is coupled to the auxiliary power positive terminal 2611 and the other end is coupled to a base of the BJT 2616. When the collector of the BJT 2616 is a cut-in voltage higher than the emitter thereof, the resistor 2617 conducts the BJT 2616. When the power source provides power to the LED tube lamp normally, the energy storage unit 2613 is charged by the filtered signal through the filtering output terminals 521 and 522 and the conducted BJT 2616 or by the driving signal through the driving output terminals 1521 and 1522 and the conducted BJT 2616 until that the collector-emitter voltage of the BJT 2616 is lower than or equal to the cut-in voltage. When the filtered signal or the driving signal is no longer being supplied or the logic level thereof is insufficient, the energy storage unit 2613 provides power through the diode 2615 to keep the LED lighting module 530 or the LED module 630 continuously light.

It is worth noting that in some embodiments, the maximum voltage of the charged energy storage unit 2613 is at least one cut-in voltage of the BJT 2616 lower than the voltage difference applied between the auxiliary power positive terminal 2611 and the auxiliary power negative terminal 2612. The voltage difference provided between the auxiliary power positive terminal 2611 and the auxiliary power negative terminal 2612 is a turn-on voltage of the diode 2615 lower than the voltage of the energy storage unit 2613. Hence, when the auxiliary power module 2610 provides power, the voltage applied at the LED module 630 is lower (about the sum of the cut-in voltage of the BJT 2616 and the turn-on voltage of the diode 2615). In the embodiment shown in the FIG. 38B, the brightness of the LED module 630 is reduced when the auxiliary power module supplies power thereto. Thereby, when the auxiliary power module is applied to an emergency lighting system or a constant lighting system, the user realizes the main power supply, such as commercial power, is abnormal and then performs necessary precautions therefor.

Figure 39A:
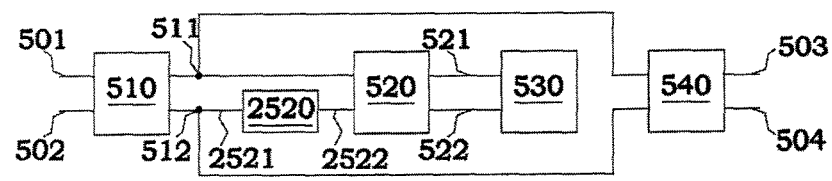
FIG. 39A is a block diagram of an exemplary power supply module in an LED tube lamp according to some embodiments of the present invention.

Referring to FIG. 39A, a block diagram of an LED tube lamp including a power supply module in accordance with certain embodiments is illustrated. Compared to the LED lamp shown in FIG. 24B, the LED tube lamp of FIG. 39A comprises two rectifying circuits 510 and 540, a filtering circuit 520, and an LED lighting module 530, and further comprises an installation detection module 2520. The installation detection module 2520 is coupled to the rectifying circuit 510 (and/or the rectifying circuit 540) via an installation detection terminal 2521 and is coupled to the filtering circuit 520 via an installation detection terminal 2522. The installation detection module 2520 detects the signal passing through the installation detection terminals 2521 and 2522 and determines whether to cut off an LED driving signal (e.g., an external driving signal) passing through the LED tube lamp based on the detected result. The installation detection module includes circuitry configured to perform these steps, and thus may be referred to as an installation detection circuit, or more generally as a detection circuit or cut-off circuit. When an LED tube lamp is not yet installed on a lamp socket or holder, or in some cases if it is not installed properly or is only partly installed (e.g., one side is connected to a lamp socket, but not the other side yet), the installation detection module 2520 detects a smaller current and determines the signal is passing through a high impedance. In this case, in certain embodiments, the installation detection circuit 2520 is in a cut-off state to make the LED tube lamp stop working. Otherwise, the installation detection module 2520 determines that the LED tube lamp has already been installed on the lamp socket or holder, and it keeps on conducting to make the LED tube lamp working normally.

For example, in some embodiments, when a current passing through the installation detection terminals is greater than or equal to a specific, defined installation current (or a current value), which may indicate that the current supplied to the lighting module 530 is greater than or equal to a specific, defined operating current, the installation detection module is conductive to make the LED tube lamp operate in a conductive state. For example, a current greater than or equal to the specific current value may indicate that the LED tube lamp has correctly been installed in the lamp socket or holder. When the current passing through the installation detection terminals is smaller than the specific, defined installation current (or the current value), which may indicate that the current supplied to the lighting module 530 is less than a specific, defined operating current, the installation detection module cuts off current to make the LED tube lamp enter in a non-conducting state based on determining that the LED tube lamp has been not installed in, or does not properly connect to, the lamp socket or holder. In certain embodiments, the installation detection module 2520 determines conducting or cutting off based on the impedance detection to make the LED tube lamp operate in a conducting state or enter non-conducting state. The LED tube lamp operating in a conducting state may refer to the LED tube lamp including a sufficient current passing through the LED module to cause the LED light sources to emit light. The LED tube lamp operating in a cut-off state may refer to the LED tube lamp including an insufficient current or no current passing through the LED module so that the LED light sources do not emit light. Accordingly, the occurrence of electric shock caused by touching the conductive part of the LED tube lamp which is incorrectly installed on the lamp socket or holder can be better avoided.

Figure 39B:
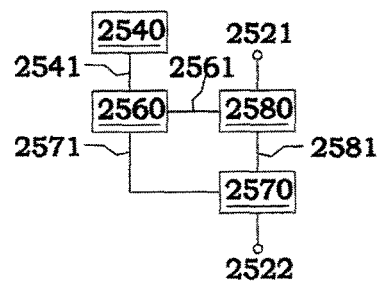
FIG. 39B is a block diagram of an installation detection module according to some embodiments of the present invention.

Referring to FIG. 39B, a block diagram of an installation detection module in accordance with certain embodiments is illustrated. The installation detection module includes a switch circuit 2580, a detection pulse generating module 2540, a detection result latching circuit 2560, and a detection determining circuit 2570. Certain of these circuits or modules may be referred to as first, second, third, etc., circuits as a naming convention to differentiate them from each other.

The detection determining circuit 2570 is coupled to and detects the signal between the installation detection terminals 2521 (through a switch circuit coupling terminal 2581 and the switch circuit 2580) and 2522. It is also coupled to the detection result latching circuit 2560 via a detection result terminal 2571 to transmit the detection result signal. The detection determining circuit 2570 may be configured to detect a current passing through terminals 2521 and 2522 (e.g., to detect whether the current is above or below a specific value).

The detection pulse generating module 2540 is coupled to the detection result latching circuit 2560 via a pulse signal output terminal 2541, and generates a pulse signal to inform the detection result latching circuit 2560 of a time point for latching (storing) the detection result. For example, the detection pulse generating module 2540 may be a circuit configured to generate a signal that causes a latching circuit, such as the detection result latching circuit 2560 to enter and remain in a state that corresponds to one of a conducting state or a cut-off state for the LED tube lamp. The detection result latching circuit 2560 stores the detection result according to the detection result signal (or detection result signal and pulse signal), and transmits or provides the detection result to the switch circuit 2580 coupled to the detection result latching circuit 2560 via a detection result latching terminal 2561. The switch circuit 2580 controls the state between conducting or cut off between the installation detection terminals 2521 and 2522 according to the detection result.

Figure 39C:
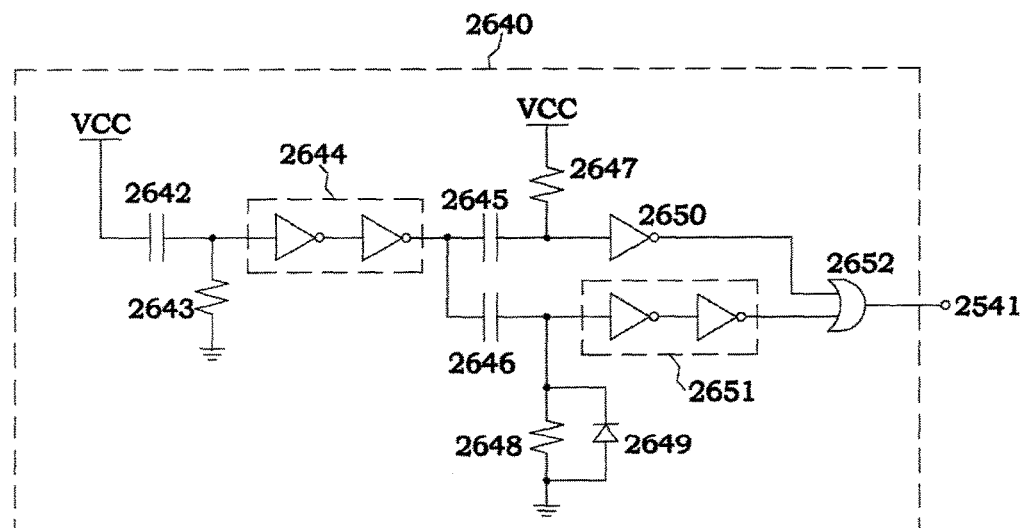
FIG. 39C is a schematic detection pulse generating module according to some embodiments of the present invention.

Referring to FIG. 39C, a block diagram of a detection pulse generating module in accordance with certain embodiments is illustrated. A detection pulse generating module 2640 may be a circuit that includes multiple capacitors 2642, 2645, and 2646, multiple resistors 2643, 2647, and 2648, two buffers 2644, and 2651, an inverter 2650, a diode 2649, and an OR gate 2652. With use or operation, the capacitor 2642 and the resistor 2643 connect in series between a driving voltage (e.g., a driving voltage source, which may be a node of a power supply), such as VCC usually defined as a high logic level voltage, and a reference voltage (or potential), such as ground potential in this embodiment. The connection node between the capacitor 2642 and the resistor 2643 is coupled to an input terminal of the buffer 2644. The resistor 2647 is coupled between the driving voltage, e.g., VCC, and an input terminal of the inverter 2650. The resistor 2648 is coupled between an input terminal of the buffer 2651 and the reference voltage, e.g. ground potential in this embodiment. An anode of the diode 2649 is grounded and a cathode thereof is coupled to the input terminal of the buffer 2651. First ends of the capacitors 2645 and 2646 are jointly coupled to an output terminal of the buffer 2644, and second, opposite ends of the capacitors 2645 and 2646 are respectively coupled to the input terminal of the inverter 2650 and the input terminal of the buffer 2651. An output terminal of the inverter 2650 and an output terminal of the buffer 2651 are coupled to two input terminals of the OR gate 2652. According to certain embodiments, the voltage (or potential) for "high logic level" and "low logic level" mentioned in this specification are all relative to another voltage (or potential) or a certain reference voltage (or potential) in circuits, and further may be described as "logic high logic level" and "logic low logic level."

When an end cap of an LED tube lamp is inserted into a lamp socket and the other end cap thereof is electrically coupled to a human body, or when both end caps of the LED tube lamp are inserted into the lamp socket, the LED tube lamp is conductive with electricity. At this moment, the installation detection module enters a detection stage. The voltage on the connection node of the capacitor 2642 and the resistor 2643 is high initially (equals to the driving voltage, VCC) and decreases with time to zero finally. The input terminal of the buffer 2644 is coupled to the connection node of the capacitor 2642 and the resistor 2643, so the buffer 2644 outputs a high logic level signal at the beginning and changes to output a low logic level signal when the voltage on the connection node of the capacitor 2642 and the resistor 2643 decreases to a low logic trigger logic level. As a result, the buffer 2644 is configured to produce an input pulse signal and then remain in a low logic level thereafter (stops outputting the input pulse signal.) The width for the input pulse signal may be described as equal to one (initial setting) time period, which is determined by the capacitance value of the capacitor 2642 and the resistance value of the resistor 2643.

Next, the operations for the buffer 2644 to produce the pulse signal with the initial setting time period will be described below. Since the voltage on a first end of the capacitor 2645 and on a first end of the resistor 2647 is equal to the driving voltage VCC, the voltage on the connection node of both of them is also a high logic level. The first end of the resistor 2648 is grounded and the first end of the capacitor 2646 receives the pulse signal from the buffer 2644, so the connection node of the capacitor 2646 and the resistor 2648 has a high logic level voltage at the beginning but this voltage decreases with time to zero (in the meantime, the capacitor stores the voltage being equal to or approaching the driving voltage VCC.) Accordingly, initially the inverter 2650 outputs a low logic level signal and the buffer 2651 outputs a high logic level signal, and hence the OR gate 2652 outputs a high logic level signal (a first pulse signal) at the pulse signal output terminal 2541. At this moment, the detection result latching circuit 2560 stores the detection result for the first time according to the detection result signal and the pulse signal. During that initial pulse time period, detection pulse generating module 2540 outputs a high logic level signal, which results in the detection result latching circuit 2560 outputting the result of that high logic level signal.

When the voltage on the connection node of the capacitor 2646 and the resistor 2648 decreases to the low logic trigger logic level, the buffer 2651 changes to output a low logic level signal to make the OR gate 2652 output a low logic level signal at the pulse signal output terminal 2541 (stops outputting the first pulse signal.) The width of the first pulse signal output from the OR gate 2652 is determined by the capacitance value of the capacitor 2646 and the resistance value of the resistor 2648.

The operation after the buffer 2644 stops outputting the pulse signal is described as below. For example, the operation may be initially in an operating stage. Since the capacitor 2646 stores the voltage being almost equal to the driving voltage VCC, and when the buffer 2644 instantaneously changes its output from a high logic level signal to a low logic level signal, the voltage on the connection node of the capacitor 2646 and the resistor 2648 is below zero but will be pulled up to zero by the diode 2649 rapidly charging the capacitor. Therefore, the buffer 2651 still outputs a low logic level signal.

On the other hand, when the buffer 2644 instantaneously changes its output from a high logic level signal to a low logic level signal, the voltage on the one end of the capacitor 2645 also changes from the driving voltage VCC to zero instantly. This makes the connection node of the capacitor 2645 and the resistor 2647 have a low logic level signal. At this moment, the output of the inverter 2650 changes to a high logic level signal to make the OR gate output a high logic level signal (a second pulse signal.) The detection result latching circuit 2560 stores the detection result for a second time according to the detection result signal and the pulse signal. Next, the driving voltage VCC charges the capacitor 2645 through the resistor 2647 to make the voltage on the connection node of the capacitor 2645 and the resistor 2647 increase with time to the driving voltage VCC. When the voltage on the connection node of the capacitor 2645 and the resistor 2647 increases to reach a high logic trigger logic level, the inverter 2650 outputs a low logic level signal again to make the OR gate 2652 stop outputting the second pulse signal. The width of the second pulse signal is determined by the capacitance value of the capacitor 2645 and the resistance value of the resistor 2647.

As those mentioned above, in certain embodiments, the detection pulse generating module 2640 generates two high logic level pulse signals in the detection stage, which are the first pulse signal and the second pulse signal. These pulse signals are output from the pulse signal output terminal 2541. Moreover, there is an interval with a defined time between the first and second pulse signals (e.g., an opposite-logic signal, which may have a low logic level when the pulse signals have a high logic level), and the defined time is determined by the capacitance value of the capacitor 2642 and the resistance value of the resistor 2643).

From the detection stage entering the operating stage, the detection pulse generating module 2640 does not produce the pulse signal any more, and keeps the pulse signal output terminal 2541 on a low logic level potential. As described herein, the operating stage is the stage following the detection stage (e.g., following the time after the second pulse signal ends). The operating stage occurs when the LED tube lamp is at least partly connected to a power source, such as provided in a lamp socket. For example, the operating stage may occur when part of the LED tube lamp, such as only one side of the LED tube lamp, is properly connected to one side of a lamp socket, and part of the LED tube lamp is either connected to a high impedance, such as a person, and/or is improperly connected to the other side of the lamp socket (e.g., is misaligned so that the metal contacts in the socket do not contact metal contacts in the LED tube lamp). The operating stage may also occur when the entire LED tube lamp is properly connected to the lamp socket.

Figure 39D:
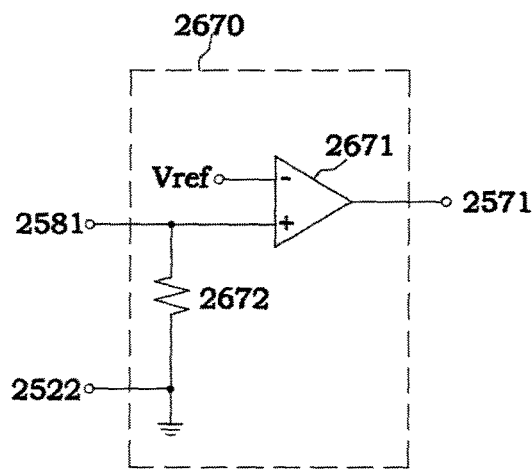
FIG. 39D is a schematic detection determining circuit according to some embodiments of the present invention.

Referring to FIG. 39D, a detection determining circuit in accordance with certain embodiments is illustrated. An exemplary detection determining circuit 2670 includes a comparator 2671, and a resistor 2672. A negative input terminal of the comparator 2671 receives a reference logic level signal (or a reference voltage) Vref, a positive input terminal thereof is grounded through the resistor 2672 and is also coupled to a switch circuit coupling terminal 2581. Referring to FIGS. 39B and 39D, the signal flowing into the switch circuit 2580 from the installation detection terminal 2521 outputs to the switch circuit coupling terminal 2581 to the resistor 2672. When the current of the signal passing through the resistor 2672 reaches a certain level (for example, bigger than or equal to a defined current for installation, (e.g. 2 A) and this makes the voltage on the resistor 2672 higher than the reference voltage Vref (referring to two end caps inserted into the lamp socket,) the comparator 2671 produces a high logic level detection result signal and outputs it to the detection result terminal 2571. For example, when an LED tube lamp is correctly installed on a lamp socket, the comparator 2671 outputs a high logic level detection result signal at the detection result terminal 2571, whereas the comparator 2671 generates a low logic level detection result signal and outputs it to the detection result terminal 2571 when a current passing through the resistor 2672 is insufficient to make the voltage on the resistor 2672 higher than the reference voltage Vref (referring to only one end cap inserted into the lamp socket.) Therefore, in some embodiments, when the LED tube lamp is incorrectly installed on the lamp socket or one end cap thereof is inserted into the lamp socket but the other one is grounded by an object such as a human body, the current will be too small to make the comparator 2671 output a high logic level detection result signal to the detection result terminal 2571.

Figure 39E:
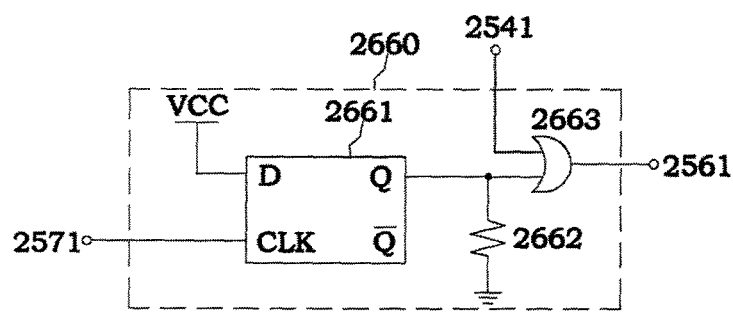
FIG. 39E is a schematic detection result latching circuit according to some embodiments of the present invention.

Referring to FIG. 39E, a schematic detection result latching circuit according to some embodiments of the present invention is illustrated. A detection result latching circuit 2660 includes a D flip-flop 2661, a resistor 2662, and an OR gate 2663. The D flip-flop 2661 has a CLK input terminal coupled to a detection result terminal 2571, and a D input terminal coupled to a driving voltage VCC. When the detection result terminal 2571 first outputs a low logic level detection result signal, the D flip-flop 2661 initially outputs a low logic level signal at a Q output terminal thereof, but the D flip-flop 2661 outputs a high logic level signal at the Q output terminal thereof when the detection result terminal 2571 outputs a high logic level detection result signal. The resistor 2662 is coupled between the Q output terminal of the D flip-flop 2661 and a reference voltage, such as ground potential. When the OR gate 2663 receives the first or second pulse signals from the pulse signal output terminal 2541 or receives a high logic level signal from the Q output terminal of the D flip-flop 2661, the OR gate 2663 outputs a high logic level detection result latching signal at a detection result latching terminal 2561. The detection pulse generating module 2640 only in the detection stage outputs the first and the second pulse signals to make the OR gate 2663 output the high logic level detection result latching signal, and thus the D flip-flop 2661 decides the detection result latching signal to be the high logic level or the low logic level the rest of the time, e.g. including the operating stage after the detection stage. Accordingly, when the detection result terminal 2571 has no high logic level detection result signal, the D flip-flop 2661 keeps a low logic level signal at the Q output terminal to make the detection result latching terminal 2561 also keep a low logic level detection result latching signal in the detection stage. On the contrary, once the detection result terminal 2571 has a high logic level detection result signal, the D flip-flop 2661 outputs and keeps a high logic level signal (e.g., based on VCC) at the Q output terminal. In this way, the detection result latching terminal 2561 keeps a high logic level detection result latching signal in the operating stage as well.

Figure 39F:
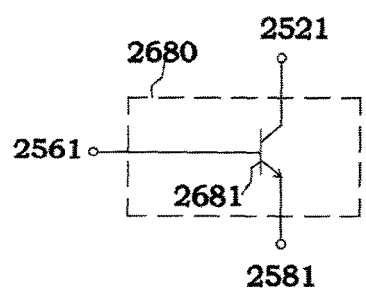
FIG. 39F is a schematic switch circuit according to some embodiments of the present invention.

Referring to FIG. 39F, a schematic switch circuit according to some embodiments is illustrated. A switch circuit 2680 includes a transistor, such as a bipolar junction transistor (BJT) 2681, as being a power transistor, which has the ability of dealing with high current/power and is suitable for the switch circuit. The BJT 2681 has a collector coupled to an installation detection terminal 2521, a base coupled to a detection result latching terminal 2561, and an emitter coupled to a switch circuit coupling terminal 2581. When the detection pulse generating module 2640 produces the first and second pulse signals, the BJT 2681 is in a transient conduction state. This allows the detection determining circuit 2670 to perform the detection for determining the detection result latching signal to be a high logic level or a low logic level. When the detection result latching circuit 2660 outputs a high logic level detection result latching signal at the detection result latching terminal 2561, the BJT 2681 is in the conducting state to make the installation detection terminals 2521 and 2522 conducting. In contrast, when the detection result latching circuit 2660 outputs a low logic level detection result latching signal at the detection result latching terminal 2561 and the output from detection pulse generating module 2640 is a low logic level, the BJT 2681 is cut-off or in the blocking state to make the installation detection terminals 2521 and 2522 cut-off or blocking.

Since the external driving signal is an AC signal and in order to avoid the detection error resulting from the logic level of the external driving signal being just around zero when the detection determining circuit 2670 detects, the detection pulse generating module 2640 generates the first and second pulse signals to let the detection determining circuit 2670 perform two detections. So the issue of the logic level of the external driving signal being just around zero in a single detection can be avoided. In some cases, the time difference between the productions of the first and second pulse signals is not multiple times of half one cycle of the external driving signal. For example, it does not correspond to the multiple phase differences of 180 degrees of the external driving signal. In this way, when one of the first and second pulse signals is generated and unfortunately the external driving signal is around zero, it can be avoided that the external driving signal is again around zero when the other pulse signal is generated.

The time difference between the productions of the first and second pulse signals, for example, an interval with a defined time between both of them can be represented as following:

the interval=$(X+Y)(T/2)$, where T represents the cycle of an external driving signal, X is a natural number, 0<Y<1, with Y in some embodiments in the range of 0.05-0.95, and in some embodiments in the range of 0.15-0.85.

Furthermore, in order to avoid the installation detection module entering the detection stage from misjudgment resulting from the logic level of the driving voltage VCC being too small, the first pulse signal can be set to be produced when the driving voltage VCC reaches or is higher than a defined logic level. For example, in some embodiments, the detection determining circuit 2670 works after the driving voltage VCC reaching a high enough logic level in order to prevent the installation detection module from misjudgment due to an insufficient logic level.

According to the examples mentioned above, when one end cap of an LED tube lamp is inserted into a lamp socket and the other one floats or electrically couples to a human body or other grounded object, the detection determining circuit outputs a low logic level detection result signal because of high impedance. The detection result latching circuit stores the low logic level detection result signal based on the pulse signal of the detection pulse generating module, making it as the low logic level detection result latching signal, and keeps the detection result in the operating stage, without changing the logic value. In this way, the switch circuit keeps cutting-off or blocking instead of conducting continually. And further, the electric shock situation can be prevented and the requirement of safety standard can also be met. On the other hand, when two end caps of the LED tube lamp are correctly inserted into the lamp socket, the detection determining circuit outputs a high logic level detection result signal because the impedance of the circuit for the LED tube lamp itself is small. The detection result latching circuit stores the high logic level detection result signal based on the pulse signal of the detection pulse generating module, making it as the high logic level detection result latching signal, and keeps the detection result in the operating stage. So the switch circuit keeps conducting to make the LED tube lamp work normally in the operating stage.

In some embodiments, when one end cap of the LED tube lamp is inserted into the lamp socket and the other one floats or electrically couples to a human body, the detection determining circuit outputs a low logic level detection result signal to the detection result latching circuit, and then the detection pulse generating module outputs a low logic level signal to the detection result latching circuit to make the detection result latching circuit output a low logic level detection result latching signal to make the switch circuit cutting-off or blocking. As such, the switch circuit blocking makes the installation detection terminals, e.g. the first and second installation detection terminals, blocking. As a result, the LED tube lamp is in non-conducting or blocking state.

However, in some embodiments, when two end caps of the LED tube lamp are correctly inserted into the lamp socket, the detection determining circuit outputs a high logic level detection result signal to the detection result latching circuit to make the detection result latching circuit output a high logic level detection result latching signal to make the switch circuit conducting. As such, the switch circuit conducting makes the installation detection terminals, e.g. the first and second installation detection terminals, conducting. As a result, the LED tube lamp operates in a conducting state.

Thus, according to the operation of the installation detection module, a first circuit, upon connection of at least one end of the LED tube lamp to a lamp socket, generates and outputs two pulses, each having a pulse width, with a time period between the pulses. The first circuit may include various of the elements described above configured to output the pulses to a base of a transistor (e.g., a BJT transistor) that serves as a switch. The pulses occur during a detection stage for detecting whether the LED tube lamp is properly connected to a lamp socket. The timing of the pulses may be controlled based on the timing of various parts of the first circuit changing from high to low logic levels, or vice versa.

The pulses can be timed such that, during that detection stage time, if the LED tube lamp is properly connected to the lamp socket (e.g., both ends of the LED tube lamp are correctly connected to conductive terminals of the lamp socket), at least one of the pulse signals occurs when an AC current from a driving signal is at a non-zero level. For example, the pulse signals can occur at intervals that are different from half of the period of the AC signal. For example, respective start points or mid points of the pulse signals, or a time between an end of the first pulse signal and a beginning of the second pulse signal may be separated by an amount of time that is different from half of the period of the AC signal (e.g., it may be between 0.05 and 0.95 percent of a multiple of half of the period of the AC signal). During a pulse that occurs when the AC signal is at a non-zero level, a switch that receives the AC signal at the non-zero level may be turned on, causing a latch circuit to change states such that the switch remains permanently on so long as the LED tube lamp remains properly connected to the lamp socket. For example, the switch may be configured to turn on when each pulse is output from the first circuit. The latch circuit may be configured to change state only when the switch is on and the current output from the switch is above a threshold value, which may indicate a proper connection to a light socket. As a result, the LED tube lamp operates in a conducting state.

On the other hand, if both pulses occur when a driving signal at the LED tube lamp has a near-zero current level, or a current level below a particular threshold, then the state of the latch circuit is not changed, and so the switch is only on during the two pulses, but then remains permanently off after the pulses and after the detection mode is over. For example, the latch circuit can be configured to remain in its present state if the current output from the switch is below the threshold value. In this manner, the LED tube lamp remains in a non-conducting state, which prevents electric shock, even though part of the LED tube lamp is connected to an electrical power source.

It is worth noting that according to certain embodiments, the width of the pulse signal generated by the detection pulse generating module is between 10 μs to 1 ms, and it is used to make the switch circuit conducting for a short period when the LED tube lamp conducts instantaneously. In some embodiments, a pulse current is generated to pass through the detection determining circuit for detecting and determining. Since the pulse is for a short time and not for a long time, the electric shock situation will not occur. Furthermore, the detection result latching circuit also keeps the detection result during the operating stage (e.g., the operating stage being the period after the detection stage and during which part of the LED tube lamp is still connected to a power source), and no longer changes the detection result stored previously complying with the circuit state changing. A situation resulting from changing the detection result can thus be avoided. In some embodiments, the installation detection module, such as the switch circuit, the detection pulse generating module, the detection result latching circuit, and the detection determining circuit, could be integrated into a chip and then embedded in circuits for saving the circuit cost and layout space.

As discussed in the above examples, in some embodiments, an LED tube lamp includes an installation detection circuit comprising a first circuit configured to output two pulse signals, the first pulse signal output at a first time and the second pulse signal output at a second time after the first time, and a switch configured to receive an LED driving signal and to receive the two pulse signals, wherein the two pulse signals control turning on and off of the switch. The installation detection circuit may be configured to, during a detection stage, detect during each of the two pulse signals whether the LED tube lamp is properly connected to a lamp socket. When it is not detected during either pulse signal that the LED tube lamp is properly connected to the lamp socket, the switch may remain in an off state after the detection stage. When it is detected during at least one of the pulse signals that the LED tube lamp is properly connected to the lamp socket, the switch may remain in an on state after the detection stage. The two pulse signals may occur such that they are separated by a time different from a multiple of half of a period of the LED driving signal, and such that at least one of them does not occur when the LED driving signal has a current value of substantially zero. It should be noted that although a circuit for producing two pulse signals is described, the disclosure is not intended to be limiting as such. For example, a circuit may be implemented such that a plurality of pulse signals may occur, wherein at least two of the plurality of pulse signals are separated by a time different from a multiple of half of a period of the LED driving signal, and such that at least one of the plurality of pulse signals does not occur when the LED driving signal has a current value of substantially zero.

For example, according to the design of the power supply in some embodiments, the circuit board assembly has a long circuit sheet and a short circuit board that are adhered to each other with the short circuit board being adjacent to the side edge of the long circuit sheet. The short circuit board may be provided with power supply module to form the power supply, and may include the installation detection module.

According to the design of the power supply module, the external driving signal may be a low frequency AC signal (e.g., commercial power), a high frequency AC signal (e.g., that provided by an electronic ballast), or a DC signal (e.g., that provided by a battery or external configured driving source), input into the LED tube lamp through a drive architecture of dual-end power supply. For the drive architecture of dual-end power supply, the external driving signal may be input by using only one end thereof as single-end power supply.

The LED tube lamp may omit the rectifying circuit in the power supply module when the external driving signal is a DC signal.

According to the design of the rectifying circuit in the power supply module, there may be a dual rectifying circuit. First and second rectifying circuits of the dual rectifying circuit are respectively coupled to the two end caps disposed on two ends of the LED tube lamp. The dual rectifying circuit is applicable to the drive architecture of dual-end power supply. Furthermore, the LED tube lamp having at least one rectifying circuit is applicable to the drive architecture of a low frequency AC signal, high frequency AC signal or DC signal.

The dual rectifying circuit may comprise, for example, two half-wave rectifier circuits, two full-wave bridge rectifying circuits or one half-wave rectifier circuit and one full-wave bridge rectifying circuit.

According to the design of the pin in the LED tube lamp, there may be two pins in single end (the other end has no pin), two pins in corresponding ends of two ends, or four pins in corresponding ends of two ends. The designs of two pins in single end and two pins in corresponding ends of two ends are applicable to a signal rectifying circuit design of the rectifying circuit. The design of four pins in corresponding ends of two ends is applicable to a dual rectifying circuit design of the rectifying circuit, and the external driving signal can be received by two pins in only one end or any pin in each of two ends.

According to the design of the filtering circuit of the power supply module, there may be a single capacitor, or π filter circuit. The filtering circuit filers the high frequency component of the rectified signal for providing a DC signal with a low ripple voltage as the filtered signal. The filtering circuit also further comprises the LC filtering circuit having a high impedance for a specific frequency for conforming to current limitations in specific frequencies of the UL standard. Moreover, the filtering circuit according to some embodiments further comprises a filtering unit coupled between a rectifying circuit and the pin(s) for reducing the EMI resulted from the circuit(s) of the LED tube lamp. The LED tube lamp may omit the filtering circuit in the power supply module when the external driving signal is a DC signal.

According to the design of the LED lighting module in some embodiments, the LED lighting module may comprise the LED module and the driving circuit or only the LED module. The LED module may be connected with a voltage stabilization circuit in parallel for preventing the LED module from over voltage. The voltage stabilization circuit may be a voltage clamping circuit, such as zener diode, DIAC and so on. When the rectifying circuit has a capacitive circuit, in some embodiments, two capacitors are respectively coupled between two corresponding pins in two end caps and so the two capacitors and the capacitive circuit as a voltage stabilization circuit perform a capacitive voltage divider.

If there are only the LED module in the LED lighting module and the external driving signal is a high frequency AC signal, a capacitive circuit (e.g., having at least one capacitor) is in at least one rectifying circuit and the capacitive circuit is connected in series with a half-wave rectifier circuit or a full-wave bridge rectifying circuit of the rectifying circuit and serves as a current modulation circuit (or a current regulator) to modulate or to regulate the current of the LED module due to that the capacitor equates a resistor for a high frequency signal. Thereby, even different ballasts provide high frequency signals with different voltage logic levels, the current of the LED module can be modulated into a defined current range for preventing overcurrent. In addition, an energy-releasing circuit is connected in parallel with the LED module. When the external driving signal is no longer supplied, the energy-releasing circuit releases the energy stored in the filtering circuit to lower a resonance effect of the filtering circuit and other circuits for restraining the flicker of the LED module. In some embodiments, if there are the LED module and the driving circuit in the LED lighting module, the driving circuit may be a buck converter, a boost converter, or a buck-boost converter. The driving circuit stabilizes the current of the LED module at a defined current value, and the defined current value may be modulated based on the external driving signal. For example, the defined current value may be increased with the increasing of the logic level of the external driving signal and reduced with the reducing of the logic level of the external driving signal. Moreover, a mode switching circuit may be added between the LED module and the driving circuit for switching the current from the filtering circuit directly or through the driving circuit inputting into the LED module.

A protection circuit may be additionally added to protect the LED module. The protection circuit detects the current and/or the voltage of the LED module to determine whether to enable corresponding over current and/or over voltage protection.

According to the design of the ballast detection circuit of the power supply module, the ballast detection circuit is substantially connected in parallel with a capacitor connected in series with the LED module and determines the external driving signal whether flowing through the capacitor or the ballast detection circuit (i.e., bypassing the capacitor) based on the frequency of the external driving signal. The capacitor may be a capacitive circuit in the rectifying circuit.

According to the design of the filament-simulating circuit of the power supply module, there may be a single set of a parallel-connected capacitor and resistor, two serially connected sets, each having a parallel-connected capacitor and resistor, or a negative temperature coefficient circuit. The filament-simulating circuit is applicable to program-start ballast for avoiding the program-start ballast determining the filament abnormally, and so the compatibility of the LED tube lamp with program-start ballast is enhanced. Furthermore, the filament-simulating circuit almost does not affect the compatibilities for other ballasts, e.g., instant-start and rapid-start ballasts.

According to the design of the ballast-compatible circuit of the power supply module in some embodiments, the ballast-compatible circuit can be connected in series with the rectifying circuit or connected in parallel with the filtering circuit and the LED lighting module. Under the design of being connected in series with the rectifying circuit, the ballast-compatible circuit is initially in a cutoff state and then changes to a conducting state in an objective delay. Under the design of being connected in parallel with the filtering circuit and the LED lighting module, the ballast-compatible circuit is initially in a conducting state and then changes to a cutoff state in an objective delay. The ballast-compatible circuit makes the electronic ballast really activate during the starting stage and enhances the compatibility for instant-start ballast. Furthermore, the ballast-compatible circuit almost does not affect the compatibilities with other ballasts, e.g., program-start and rapid-start ballasts.

According to the design of the auxiliary power module of the power supply module, the energy storage unit may be a battery or a supercapacitor, connected in parallel with the LED module. The auxiliary power module is applicable to the LED lighting module having the driving circuit.

According to the design of the LED module of the power supply module, the LED module comprises plural strings of LEDs connected in parallel with each other, wherein each LED may have a single LED chip or plural LED chips emitting different spectrums. Each LEDs in different LED strings may be connected with each other to form a mesh connection.

In other words, the abovementioned features can be implemented in any combination to improve the LED tube lamp.

As shown in FIG. 19, in some embodiments, the LED light strip 2 and the power supply 5 may be connected by utilizing the circuit board assembly 25 instead of soldering bonding. The long circuit sheet 251 and the short circuit board 253 are adhered to each other with the short circuit board 253 being adjacent to the side edge of the long circuit sheet 251. And then, the power supply module 250 is electrically connected to the wiring layer 2a of the LED light strip 2. Besides, the LED light strip 2 as mentioned before is not limited to one-layered or two-layered circuit board, and it could be the circuit board shown in FIG. 23 further including another wiring layer 2c. The LED light source 202 is configured on the wiring layer 2a and electrically connected to the power supply 5 through the wiring layer 2a. As shown in FIG. 20, in some embodiments, the circuit board assembly 25 has the long circuit sheet 251 and the short circuit board 253, and the long circuit sheet 251 could be the bendable circuit sheet of the LED light strip 2 including the wiring layer 2a and the dielectric layer 2b. The dielectric layer 2b and the short circuit board 253 are fixed by a joint manner, and then the wiring layer 2a is adhered to the dielectric layer 2b and extends to the short circuit board 253. The embodiments mentioned above do not depart from the scope of and are all included in the applications of the circuit board assembly 25 of the present invention.

In the embodiments mentioned above, the short circuit board 253 may have a length generally of about 15 mm to about 40 mm and may be about 19 mm to about 36 mm, while the long circuit sheet 251 may have a length generally of about 800 mm to about 2800 mm and may be about 1200 mm to about 2400 mm. In some embodiments, a ratio of the length of the short circuit board 253 to the length of the long circuit sheet 251 ranges from about 1:20 to about 1:200.

In addition, in some abovementioned embodiments, when the LED light strip 2 and the power supply 5 are fixed by soldering bonding but the LED light strip 2 is not mounted onto the inner circumferential surface of the LED tube lamp 1, the LED light strip 2 may not safely fix and support the power supply 5. Moreover, in some embodiments, when the power supply 5 has to be fixed in the end cap of the end region of the LED tube lamp 1, the end cap would be relatively longer and then reduces the effectively emitting area of the LED tube lamp 1.

Referring to FIG. 22, in some embodiments, the LED light strip 2 adopts a hard circuit board 22 made of aluminum and the end thereof can be relatively fixed onto the end region of the LED tube lamp 1. Furthermore, for the sake of the implementation of soldering bonding and the length of the end cap 3 being able to be reduced since it is no longer required to have enough space to contain the entire length of the power supply 5, the power supply 5 is perpendicularly adhered to the hard circuit board 22 made of aluminum via soldering. By doing so, the effectively emitting area of the LED tube lamp 1 increases. Also, in the abovementioned embodiments, the power supply 5 solders a metal wire for electrically connecting to the conductive pin 301 of the end cap 3 in addition to configuring the power supply module 250. In some embodiments, the conductive lead 53 of the power supply module 250 on the power supply 5 could be directly used to electrically connect to the end cap 3, and the metal wire mentioned above is unnecessary any more so as to simplify the manufacture process.

In the embodiments of the present invention, a safety switch is configured in the end cap for preventing leakage current and it connects the conductive pin 301 to the power supply. When the LED tube lamp is correctly installed into the lamp socket, the safety switch is just triggered (the power supply being electrically connected to the conductive pin 301). In this way, the end cap does not conduct electricity before the LED tube lamp is correctly installed into the lamp socket. And this provides the safety protection to the user for preventing the user from electric shock in case that one end of the LED tube lamp is inserted into the lamp socket but the other end is touched by the user's hand. In some embodiments of the present invention, the safety switch is a logic level switch triggered only through the LED tube lamp being correctly installed. And when the logic level switch is triggered (liquid flows to a preset position), the LED tube lamp works normally.

In some embodiments, two safety switches are respectively configured into the end caps on both ends of the LED tube lamp. Or, only one safety switch is configured with, in this case, the end cap configured with the safety switch may be marked for reminding the user of firstly installing another unmarked end cap.

Figure 41:
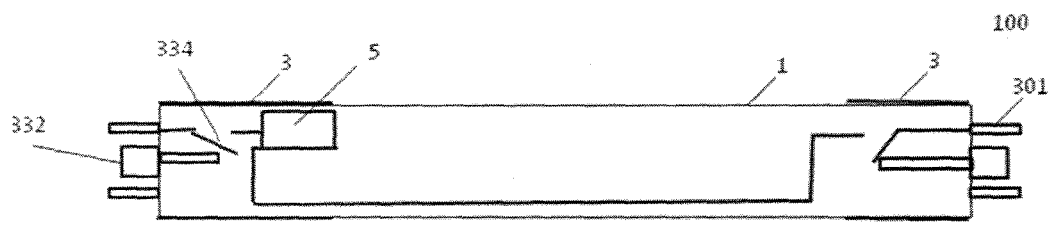
FIG. 41 is a schematic structure of an LED tube lamp according to some embodiments of the present invention.

Referring to FIG. 41, a schematic structure of an LED tube lamp according to some embodiments of the present invention is illustrated. An LED tube lamp 100 includes a lamp tube 1 and two end caps 3 (the proportion of the end cap 3 in relation to the lamp tube 1 schematized in FIG. 41 is exaggerated in order to highlight the structure of the end cap 3. In an embodiment, the depth of the end cap 3 is from 9 to 70 mm. The axial length of the lamp tube 1 is from 254 to 2000 mm, that is, from 1 inch to 8 inches.) The end caps 3 are respectively configured at the both ends of the lamp tube 1. The end cap 3 includes an electrically conductive pin 301, an actuator 332, a micro switch 334, and a power supply 5. When the LED tube lamp 100 is correctly installed into the lamp socket (not shown), the actuator 332 triggers the micro switch 334 for allowing the power supply 5 to electrically connect to commercial electricity so as to light up the LED components (not shown) in the LED tube lamp 100.

Figure 42:
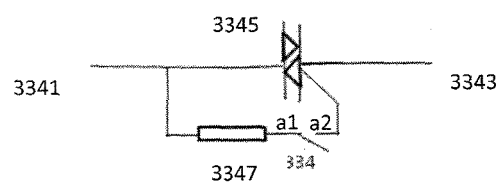
FIG. 42 is an alternative micro switch embodiment of FIG. 41.

For one of the variations of the micro switch mentioned above, as shown in FIG. 42, an input terminal 3341 and an output terminal 3343 are electrically connected to a hollow conductive pin (not shown) and a power supply 5 (not shown), correspondingly. A bidirectional triode thyristor (TRIAC) 3345 is configured between the input terminal 3341 and the output terminal 3343, a resistor 3347 is electrically coupled to a a1 end of the micro switch 334 having a a2 end electrically coupled to a trigger terminal of the TRIAC 3345. In one embodiment, the resistance of the resistor 3347 is from 1 Ohm to 10K Ohm, and in some cases, about 2K Ohm. The current passing through the micro switch 334 decreases from 10 A before deformation to about 0.1 A. Accordingly, a wider range is provided for selecting the micro switch and the cost is further down.

The safety switch could replace the resistor 3347 with a silicon controlled rectifier, SCR; i.e., the safety switch includes the SCR, the TRIAC 3345, and the micro switch 334, and wherein the micro switch 334 could be any micro switch in the embodiments mentioned above. In one embodiment, the input terminal 3341 of the safety switch is electrically connected to any hollow conductive pin (not shown) of the LED tube lamp, and the output terminal 3343 thereof is electrically connected to the power supply 5. The both ends of the TRIAC 3345 are electrically coupled to the input terminal 3341 and the output terminal 3343, respectively. Further, the SCR is electrically coupled to the micro switch 334 in serial. One end of the serially connected SCR and the micro switch 334 is electrically coupled to the control terminal of the TRIAC 3345, the other end of the serially connected SCR and the micro switch 334 is electrically coupled to the input terminal 3341.

When the micro switch 334 opens, the control terminal of the TRIAC 3345 is not coupled to the input terminal 3341. Meanwhile, the TRIAC 3345 is in a cutoff state so as to make the hollow conductive pin being uncoupled to the power supply 5. When the micro switch 334 is triggered and shorted, the current is transmitted from the input terminal 3341, the serially connected SCR and the micro switch 334 to the control terminal of the TRIAC 3345 to make the TRIAC 3345 being triggered and conducted. Therefore, the hollow conductive pin 301 is coupled to the power supply 5 to make the LED tube lamp working normally.

In the abovementioned embodiments with the safety switch by using the micro switch 334 only, an enormous transient current, such as bigger than 10 A, is inrushing to flow through the micro switch 334, the power supply 5, and the LED components when the micro switch 334 is instantly triggered. Therefore, not only does the micro switch 334 use a higher withstanding current, but the volume thereof also gets bigger. Further, the transient current may damage the power supply 5 and the LED components. However, in some embodiments, the transient current could be restrained by the SCR or the resistor 3347 so as to lower the withstanding current used by the micro switch 334, and simultaneously, the volume of the micro switch 334 and the cost are both down. In this way, the current passing through the micro switch could be down to about 0.1 A.

Next, the structure of the end cap with safety switch will be described in more detail as below.

Turning to FIG. 40A, in accordance with an exemplary embodiment of the present invention, the end cap 3 includes a housing 300; a power supply (not shown); an electrically conductive pin 301 extending outwardly from a top wall of the housing 300; an actuator 332 movably connected to the housing; and a micro switch 334. The upper portion of the actuator 332 projects out of an opening formed in the top wall of the housing 300. The actuator 332 includes, inside the housing 300, a stopping flange 337 extending radially from its intermediary portion and a shaft 335 extending axially in its lower portion. The shaft 335 is movably connected to a base 336 rigidly mounted inside the housing 300. A preloaded coil spring 333 is retained, around the shaft 335, between the stopping flange 337 and the base 336. An aperture is provided in the upper portion of the actuator 332 through which the electrically conductive pin 301 is arranged. The micro switch 334 is positioned inside the housing 300 to be actuated by the shaft 335 at a predetermined actuation point. The micro switch 334, when actuated, makes the circuit, directly or through a relay, between the electrically connective pin 301 and the power supply 5. The actuator 332 is aligned with the electrically conductive pin 301, the opening in the top wall of the housing 300 and the coil spring 333 along the longitudinal axis of the lamp tube 1 to be reciprocally movable between the top wall of the housing 300 and the base 336. When the electrically conductive pin 301 is unplugged from the socket, the coil spring 333 biases the actuator 332 to its rest position until the stopping flange 337 is urged against the top wall of the housing 300. The micro switch 334 stays off and the circuit of the LED tube lamp stays open. When the electrically conductive pin 301 is duly plugged into the socket on a lamp holder, the actuator 332 is depressed and brings the shaft 335 to the actuation point. The micro switch 334 is turned on to, directly or through a relay, complete the circuit of the LED tube lamp.

In some embodiments, two end caps of the LED tube lamp according to the embodiments of the present invention may configure two micro switches, correspondingly. In this way, the hurt resulting from leaking current to the user can be avoided when the LED tube lamp is in installation.

When the LED tube lamp is not inserted the lamp socket, the actuator 333 moves forward outside of the housing 300 because of the tension of the coil spring 333. Hence, the micro switch 334 opens to make the power supply 5 disconnect the conductive pin 301.

Turning to FIG. 40B, in accordance with an exemplary embodiment of the present invention, the end cap 3 includes a housing 300; a power supply (not shown); an electrically conductive pin 301a extending outwardly from a top wall of the housing 300; an actuator 332 movably connected to the housing; and a micro switch 334. In an embodiment, the electrically conductive pin 301a is an enlarged hollow structure. The upper portion of the actuator 332 is bowl-shaped to receive the electrically conductive pin 301a and projects out of an opening formed in the top wall of the housing 300. The actuator 332 includes, inside the housing 300, a stopping flange 337 extending radially from its intermediary portion and, in its lower portion, a spring retainer and a bulging part 338. A preloaded coil spring 333 is retained between the string retainer and a base 336 rigidly mounted inside the housing 300. The micro switch 334 is positioned inside the housing 300 to be actuated by the bulging part 338 at a predetermined actuation point. The micro switch 334, when actuated, makes the circuit, directly or through a relay, between the electrically conductive pin 301a and the power supply. The actuator 332 is aligned with the electrically conductive pin 301a, the opening in the top wall of the housing 300 and the coil spring 333 along the longitudinal axis of the lamp tube 1 to be reciprocally movable between the top wall of the housing 300 and the base 336. When the electrically conductive pin 301a is unplugged from the socket of a lamp holder, the coil spring 333 biases the actuator 332 to its rest position until the stopping flange 337 is urged against the top wall of the housing 300. The micro switch 334 stays off and the circuit of the LED tube lamp 1 stays open. When the electrically conductive pin 301a is duly plugged into the socket on the lamp holder, the actuator 332 is depressed and brings the bulging part 338 to the actuation point. The micro switch 334 is turned on to, directly or through a relay, complete the circuit.

In some embodiments, two end caps of the LED tube lamp according to the embodiments of the present invention may configure two micro switches, correspondingly. In some embodiments, the actuator 332 is intermittently put around the conductive pin 301a.

When the LED tube lamp is not inserted the lamp socket, the actuator 333 moves forward outside of the housing 300 because of the tension of the coil spring 333. Hence, the micro switch 334 opens to make the power supply 5 disconnect the conductive pin 301a.

Turning to FIG. 40C, in accordance with an exemplary embodiment of the present invention, the end cap 3 includes a housing 300; a power supply (not shown); an electrically conductive pin 301 extending outwardly from a top wall of the housing 300; an actuator 332 movably connected to the housing; and a micro switch 334. In an embodiment, the end cap includes a pair of electrically conductive pins 301. The upper portion of the actuator 332 projects out of an opening formed in the top wall of the housing 300. The actuator 332 includes, inside the housing 300, a stopping flange 337 extending radially from its intermediary portion and a spring retainer in its lower portion. A first coil spring 333a, preloaded, is retained between the string retainer and a first end of the micro switch 334. A second coil spring 333b, also preloaded, is retained between a second end of the micro switch 334 and a base rigidly mounted inside the housing.

Both of the springs 333a, 333b are chosen to respond to a gentle depression; however, the first coil spring 333a is chosen to have a different stiffness than the second coil spring 333b. In some embodiments, the first coil spring 333a reacts to a depression of from 0.5 to 1 N but the second coil spring 333b reacts to a depression of from 3 to 4 N. The actuator 332 is aligned with the opening in the top wall of the housing 300, the micro switch 334 and the set of coil springs 333a, 333b along the longitudinal axis of the lamp tube to be reciprocally movable between the top wall of the housing 300 and the base. The micro switch 334, sandwiched between the first coil spring 333a and the second coil spring 333b, is actuated when the first coil spring 333a is compressed to a predetermined actuation point. The micro switch 334, when actuated, makes the circuit, directly or through a relay, between the pair of electrically conductive pins 301 and the power supply. When the pair of electrically conductive pins 301 are unplugged from the socket on a lamp holder, the pair of coil springs 333a, 333b bias the actuator 332 to its rest position until the stopping flange 337 is urged against the top wall of the housing 300. The micro switch 334 stays off and the circuit of the LED tube lamp stays open. When the pair of electrically conductive pins 301 are duly plugged into the socket on a lamp holder, the actuator 332 is depressed and compresses the first coil spring 333a to the actuation point. The micro switch 334 is turned on to, directly or through a relay, complete the circuit.

In some embodiments, two end caps of the LED tube lamp according to the embodiments of the present invention may configure two micro switches, correspondingly. In this way, the hurt resulting from leaking current to the user can be avoided when the LED tube lamp is in installation. Since the LED tube lamp has correctly been installed and the micro switch has been actuated, the connection between the conductive pin 301 and the power supply is just implemented.

When the LED tube lamp is not inserted the lamp socket, the actuator 333 moves forward outside of the housing 300 because of the tension of the coil spring 333. Hence, the micro switch 334 opens to make the power supply 5 disconnect the conductive pin 301a.

Figure 40D:
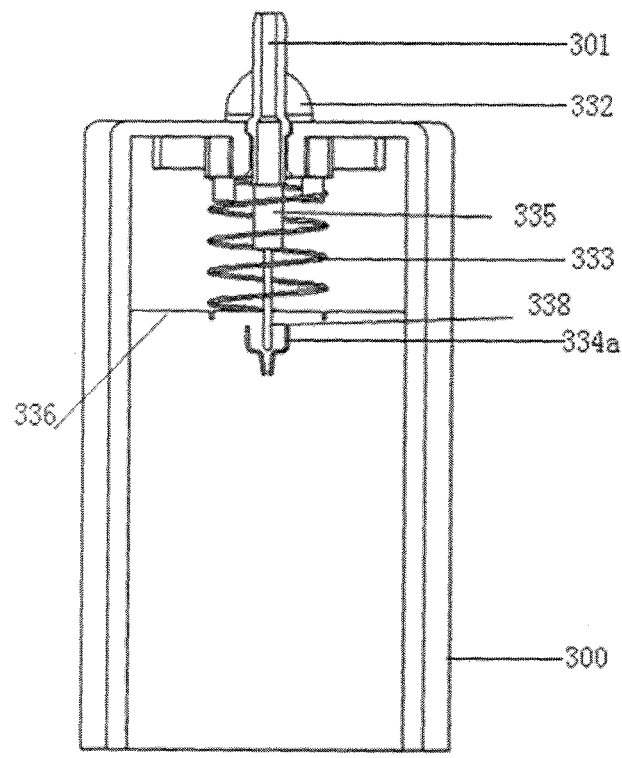

Turning to FIG. 40D, in accordance with an exemplary embodiment of the present invention, the end cap 3 includes a housing 300; a power supply (not shown); an electrically conductive pin 301 extending outwardly from a top wall of the housing 300; an actuator 332 movably connected to the housing; a first contact element 334a; and a second contact element 338. The upper portion of the actuator 332 projects out of an opening formed in the top wall of the housing 300. The actuator 332 includes, inside the housing 300, a stopping flange extending radially from its intermediary portion and a shaft 335 extending axially in its lower portion. The shaft 335 is movably connected to a base 336 rigidly mounted inside the housing 300. A preloaded coil spring 333 is retained, around the shaft 335, between the stopping flange and the base 336. An aperture is provided in the upper portion of the actuator 332 through which the electrically conductive pin 301 is arranged. The actuator 332 is aligned with the electrically conductive pin 301, the opening in the top wall of the housing 300, the coil spring 333 and the first and second contact elements 334a, 338 along the longitudinal axis of the lamp tube to be reciprocally movable between the top wall of the housing 300 and the base 336. The first contact element 334a includes a plurality of metallic pieces, which are spaced apart from one another, and is configured to form a flexible female-type receptacle, e.g. V-shaped or bell-shaped. The first contact element 334a is made from copper or copper alloy. The second contact element 338 is positioned on the shaft 335 to, when the shaft 335 moves downwards, come into the first contact element 334a and electrically connect the plurality of metallic pieces at a predetermined actuation point. The first contact element 334a is configured to impart a spring-like bias on the second contact element 338 when the second contact element 338 goes into the first contact element 334a to ensure faithful electrical connection with one another. The first and second contact elements 334a, 338 are made from, in some embodiments, copper alloy. When the electrically conductive pin 301 is unplugged from the socket, the coil spring 333 biases the actuator 332 to its rest position until the stopping flange is urged against the top wall of the housing 300. The first and second contact elements 334a, 338 stay unconnected and the circuit of the LED tube lamp stays open. When the electrically conductive pin 301 is duly plugged into the socket on a lamp holder, the actuator 332 is depressed and brings the second contact element 338 to the actuation point. The first and second contact elements 334a, 338 are connected to, directly or through a relay, complete the circuit of the LED tube lamp.

In some embodiments, two end caps of the LED tube lamp according to the embodiments of the present invention may configure two micro switches, correspondingly. In this way, the hurt resulting from leaking current to the user can be avoided when the LED tube lamp is in installation.

When the LED tube lamp is not inserted the lamp socket, the actuator 333 moves forward outside of the housing 300 because of the tension of the coil spring 333. Hence, the micro switch 334 opens to make the power supply 5 disconnect the conductive pin 301a.

Figure 40E:
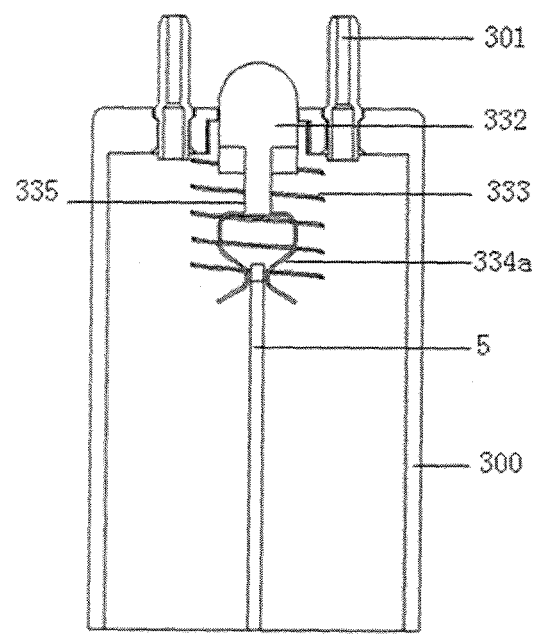

Turning to FIG. 40E, in accordance with an exemplary embodiment of the present invention, the end cap 3 includes a housing 300; a power supply (not shown); an electrically conductive pin 301 extending outwardly from a top wall of the housing 300; an actuator 332 movably connected to the housing; a first contact element 334a; and a second contact element. The upper portion of the actuator 332 projects out of an opening formed in the top wall of the housing 300. The actuator 332 includes, inside the housing 300, a stopping flange extending radially from its intermediary portion and a shaft 335 extending axially in its lower portion. The shaft 335 is movably connected to a base rigidly mounted inside the housing 300. A preloaded coil spring 333 is retained, around the shaft 335, between the stopping flange and the base. The actuator 332 is aligned with the electrically conductive pin 301, the opening in the top wall of the housing 300, the coil spring 333, the first contact element 334a and the second contact element along the longitudinal axis of the lamp tube to be reciprocally movable between the top wall of the housing 300 and the base. In some embodiments, the first contact element 334a forms an integral and flexible female-type receptacle and is made from, copper, copper alloy or both. The second contact element, made from, copper, copper alloy or both, is fixedly disposed inside the housing 300. In an embodiment, the second contact element is fixedly disposed on the power supply 5. The first contact element 334a is attached to the lower end of the shaft 335 to, when the shaft 335 moves downwards, receive and electrically connect the second contact element at a predetermined actuation point. The first contact element 334a is configured to impart a spring-like bias on the second contact element when the former receives the latter to ensure faithful electrical connection with each other. When the electrically conductive pin 301 is unplugged from the socket on a lamp holder, the coil spring 333 biases the actuator 332 to its rest position until the stopping flange is urged against the top wall of the housing 300. The first contact element 334a and the second contact element stay unconnected and the circuit of the LED tube lamp stays open. When the electrically conductive pin 301 is duly plugged into the socket, the actuator 332 is depressed and brings the first contact element 334a to the actuation point. The first contact element 334a and the second contact element are connected to, directly or through a relay, complete the circuit of the LED tube lamp.

In some embodiments, two end caps of the LED tube lamp according to the embodiments of the present invention may configure two micro switches, correspondingly. In this way, the hurt resulting from leaking current to the user can be avoided when the LED tube lamp is in installation.

Figure 40F:
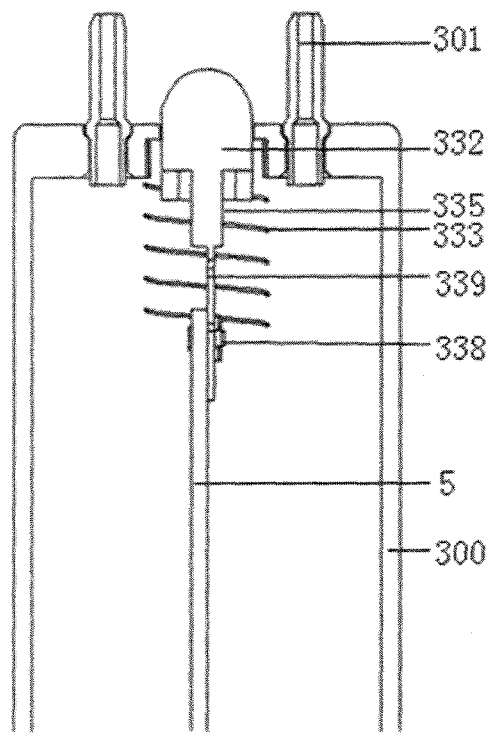

Turning to FIG. 40F, in accordance with an exemplary embodiment of the present invention, the end cap 3 includes a housing 300; a power supply (not shown); an electrically conductive pin 301 extending outwardly from a top wall of the housing 300; an actuator 332 movably connected to the housing; a first contact element; and a second contact element. The upper portion of the actuator 332 projects out of an opening formed in the top wall of the housing 300. The actuator 332 includes, inside the housing 300, a stopping flange extending radially from its intermediary portion and a shaft 335 extending axially in its lower portion. The shaft 335 is movably connected to a base rigidly mounted inside the housing 300. A preloaded coil spring 333 is retained, around the shaft 335, between the stopping flange and the base. The actuator 332 is aligned with the electrically conductive pin 301, the opening in the top wall of the housing 300, the coil spring 333, the first contact element and the second contact element along the longitudinal axis of the lamp tube to be reciprocally movable between the top wall of the housing 300 and the base. The shaft 335 includes a non-electrically conductive body in the shape of an elongated thin plank and a window 339 carved out from the body. The first contact element and the second contact element are fixedly disposed inside the housing 300 and face each other through the shaft 335. The first contact element is configured to impart a spring-like bias on the shaft 335 and to urge the shaft 335 against the second contact element. In an embodiment, the first contact element is a bow-shaped laminate bending towards the shaft 335 and the second contact element, which is disposed on the power supply. The first contact element and the second contact element are made from, for example, copper, copper alloy or both. When the actuator 332 is in its rest position, the first contact element and the second contact element are prevented by the body of the shaft 335 from engaging each other. However, the first contact element is configured to, when the shaft brings its window 339 downwards to a predetermined actuation point, engage and electrically connect the second contact element through the window 339. When the electrically conductive pin 301 is unplugged from the socket, the coil spring 333 biases the actuator 332 to its rest position until the stopping flange is urged against the top wall of the housing 300. The first contact element and the second contact element stay unconnected and the circuit of the LED tube lamp stays open. When the electrically conductive pin 301 is duly plugged into the socket on a lamp holder, the actuator 332 is depressed and brings the window 339 to the actuation point. The first contact element engages the second contact element to, directly or through a relay, complete the circuit of the LED tube lamp.

In some embodiments, two end caps of the LED tube lamp according to the embodiments of the present invention may configure two micro switches, correspondingly. In this way, the hurt resulting from leaking current to the user can be avoided when the LED tube lamp is in installation.

In some embodiments, the upper portion of the actuator 332 that projects out of the housing 300 is shorter than the electrically conductive pin 301. In some embodiments, the ratio of the depth of the upper portion of the actuator 332 to that of the electrically conductive pin 301 is from 20% to 95%.

In some embodiments, the length of the second side end cap 3 is shorter than that of the first side end cap 3. In general, the length of the second side end cap 3 is about 30% to 80% times that of the first side end cap 3, for example, the length of the second side end cap 3 is in some embodiments about ⅔ of the length of second side end cap 3. In the present embodiment, the length of the second side end cap 3 may be about half the length of the first side end cap 3. The length of the first side end cap 3 may be, e.g., in the range of about 15 mm to 65 mm, depending on practical situations.

It's worth noting that the thickness of the second conductive layer of a two-layered bendable circuit sheet is, in some embodiments, larger than that of the first conductive layer in order to reduce the voltage drop or loss along each of the positive lengthwise portion and the negative lengthwise portion disposed in the second conductive layer. Compared to a one-layered bendable circuit sheet, since a positive lengthwise portion and a negative lengthwise portion are disposed in a second conductive layer in a two-layered bendable circuit sheet, the width (between two lengthwise sides) of the two-layered bendable circuit sheet is or can be reduced. On the same fixture or plate in a production process, the number of bendable circuit sheets each with a shorter width that can be laid together at most is larger than the number of bendable circuit sheets each with a longer width that can be laid together at most. Thus adopting a bendable circuit sheet with a shorter width can increase the efficiency of production of the LED module. And reliability in the production process, such as the accuracy of welding position when welding (materials on) the LED components, can also be improved, because a two-layered bendable circuit sheet can better maintain its shape.

As a variant of the above embodiments, a type of LED tube lamp is provided that has at least some of the electronic components of its power supply module disposed on a light strip of the LED tube lamp. For example, the technique of printed electronic circuit (PEC) can be used to print, insert, or embed at least some of the electronic components onto the light strip.

In one embodiment, all electronic components of the power supply module are disposed on the light strip. The production process may include or proceed with the following steps: preparation of the circuit substrate (e.g. preparation of a flexible printed circuit board); ink jet printing of metallic nano-ink; ink jet printing of active and passive components (as of the power supply module); drying/sintering; ink jet printing of interlayer bumps; spraying of insulating ink; ink jet printing of metallic nano-ink; ink jet printing of active and passive components (to sequentially form the included layers); spraying of surface bond pad(s); and spraying of solder resist against LED components.

In certain embodiments, if all electronic components of the power supply module are disposed on the light strip, electrical connection between terminal pins of the LED tube lamp and the light strip may be achieved by connecting the pins to conductive lines which are welded with ends of the light strip. In this case, another substrate for supporting the power supply module is not required, thereby allowing of an improved design or arrangement in the end cap(s) of the LED tube lamp. In some embodiments, (components of) the power supply module are disposed at two ends of the light strip, in order to significantly reduce the impact of heat generated from the power supply module's operations on the LED components. Since no substrate other than the light strip is used to support the power supply module in this case, the total amount of welding or soldering can be significantly reduced, improving the general reliability of the power supply module.

Another case is that some of all electronic components of the power supply module, such as some resistors and/or smaller size capacitors, are printed onto the light strip, and some bigger size components, such as some inductors and/or electrolytic capacitors, are disposed in the end cap(s). The production process of the light strip in this case may be the same as that described above. And in this case disposing some of all electronic components on the light strip is conducive to achieving a reasonable layout of the power supply module in the LED tube lamp, which may allow of an improved design in the end cap(s).

As a variant embodiment of the above, electronic components of the power supply module may be disposed on the light strip by a method of embedding or inserting, e.g. by embedding the components onto a bendable or flexible light strip. In some embodiments, this embedding may be realized by a method using copper-clad laminates (CCL) for forming a resistor or capacitor; a method using ink related to silk-screen printing; or a method of ink jet printing to embed passive components, wherein an ink jet printer is used to directly print inks to constitute passive components and related functionalities to intended positions on the light strip. Then through treatment by ultraviolet (UV) light or drying/sintering, the light strip is formed where passive components are embedded. The electronic components embedded onto the light strip include, for example, resistors, capacitors, and inductors. In other embodiments, active components also may be embedded. Through embedding some components onto the light strip, a reasonable layout of the power supply module can be achieved to allow of an improved design in the end cap(s), because the surface area on a printed circuit board used for carrying components of the power supply module is reduced or smaller, and as a result the size, weight, and thickness of the resulting printed circuit board for carrying components of the power supply module is also smaller or reduced. Also in this situation, since welding points on the printed circuit board for welding resistors and/or capacitors if they were not to be disposed on the light strip are no longer used, the reliability of the power supply module is improved, in view of the fact that these welding points are most liable to (cause or incur) faults, malfunctions, or failures. Further, the length of conductive lines needed for connecting components on the printed circuit board is therefore also reduced, which allows of a more compact layout of components on the printed circuit board and thus improving the functionalities of these components.

With reference to FIGS. 19 and 20, a short circuit board 253 includes a first short circuit substrate and a second short circuit substrate respectively connected to two terminal portions of a long circuit sheet 251, and the electronic components of the power supply module are respectively disposed on the first short circuit substrate and the second short circuit substrate. The first short circuit substrate and the second short circuit substrate may have roughly the same length, or different lengths. In general, the first short circuit substrate (i.e. the right circuit substrate of short circuit board 253 in FIG. 19 and the left circuit substrate of short circuit board 253 in FIG. 20) has a length that is about 30%-80% of the length of the second short circuit substrate (i.e. the left circuit substrate of short circuit board 253 in FIG. 19 and the right circuit substrate of short circuit board 253 in FIG. 20). In some embodiments, the length of the first short circuit substrate is about ⅓-⅔ of the length of the second short circuit substrate. For example, in one embodiment, the length of the first short circuit substrate may be about half the length of the second short circuit substrate. The length of the second short circuit substrate may be, for example in the range of about 15 mm to about 65 mm, depending on actual application occasions. In certain embodiments, the first short circuit substrate is disposed in an end cap at an end of the LED tube lamp, and the second short circuit substrate is disposed in another end cap at the opposite end of the LED tube lamp.

In some embodiments, due to the external driving power, the length of the end caps are shortened. For ensuring the total length of the LED tube lamp to conform to a standard for a fluorescent lamp, a length of the lamp tube is lengthened to compensate the shortened length of the end caps. Due to the lengthened length of the lamp tube, the LED light string is correspondingly lengthened. Therefore, the interval of adjacent two LEDs disposed on the LED light string becomes greater under the same illuminance requirement. The greater interval increases the heat dissipation of the LEDs and so the operation temperature of the LEDs is lowered and the life-span of the LED tube lamp is extended.

The LED tube lamps according to various different embodiments of the present invention are described as above. With respect to an entire LED tube lamp, the features including "adopting the bendable circuit sheet as the LED light strip", and "utilizing the circuit board assembly (including a long circuit sheet and a short circuit board) to connect the LED light strip and the power supply" may be applied in practice singly or integrally such that only one of the features is practiced or a number of the features are simultaneously practiced.

Furthermore, the feature "adopting the bendable circuit sheet as the LED light strip" includes any related technical points and their variations and any combination thereof as described in the abovementioned embodiments of the present invention.

As an example, the feature "adopting the bendable circuit sheet as the LED light strip" includes "the connection between the bendable circuit sheet and the power supply is by way of wire bonding or soldering bonding; the bendable circuit sheet includes a wiring layer and a dielectric layer arranged in a stacked manner; the bendable circuit sheet has a circuit protective layer made of ink to reflect lights and has widened part along the circumferential direction of the lamp tube to function as a reflective film."

For example, according to the design of the power supply in some embodiments, the circuit board assembly has a long circuit sheet and a short circuit board that are adhered to each other with the short circuit board being adjacent to the side edge of the long circuit sheet. The short circuit board may be provided with power supply module to form the power supply.

For the drive architecture of dual-end power supply, the external driving signal may be input by using only one end thereof as single-end power supply.

The LED tube lamp may omit the rectifying circuit in the power supply module when the external driving signal is a DC signal.

According to the design of the rectifying circuit in the power supply module, there may be a signal rectifying circuit, or dual rectifying circuit. First and second rectifying circuits of the dual rectifying circuit are respectively coupled to the two end caps disposed on two ends of the LED tube lamp. The single rectifying circuit is applicable to the drive architecture of signal-end power supply, and the dual rectifying circuit is applicable to the drive architecture of dual-end power supply. Furthermore, the LED tube lamp having at least one rectifying circuit is applicable to the drive architecture of low frequency AC signal, high frequency AC signal or DC signal.

According to the design of the pin in the LED tube lamp, there may be two pins in single end (the other end has no pin), two pins in corresponding end of two ends, or four pins in corresponding end of two ends. The designs of two pins in single end and two pins in corresponding end of two ends are applicable to signal rectifying circuit design of the rectifying circuit. The design of four pins in corresponding end of two ends is applicable to dual rectifying circuit design of the rectifying circuit, and the external driving signal can be received by two pins in only one end or any pin in each of two ends.

A protection circuit may be additionally added to protect the LED module. The protection circuit detects the current and/or the voltage of the LED module to determine whether to enable corresponding over current and/or over voltage protection.

According to the design of the auxiliary power module of the power supply module, the energy storage unit may be a battery or a supercapacitor, connected in parallel with the LED module. The auxiliary power module is applicable to the LED lighting module having the driving circuit.

According to the design of the LED module of the power supply module, the LED module comprises plural strings of LEDs connected in parallel with each other, wherein each LED may have a single LED chip or plural LED chips emitting different spectrums. Each LEDs in different LED strings may be connected with each other to form a mesh connection.

The above-mentioned features of the present invention can be accomplished in any combination to improve the LED tube lamp, and the above embodiments are described by way of example only. The present invention is not herein limited, and many variations are possible without departing from the spirit of the present invention and the scope as defined in the appended claims.

What is claimed is:

1. A light-emitting diode (LED) tube lamp, comprising:
a tube comprising two end regions, two transition regions, and a main body region, the two end regions are at two opposite ends of the main body region, each of the two transition regions are respectively between a respective end region and the main body region;
two end caps, each having at least one pin, and each coupled to a respective end of the tube;
a power supply disposed in one of the end caps, or disposed in a separated manner in the two end caps; and
an LED light strip disposed inside the tube and having a plurality of LED light sources mounted thereon, the LED light sources being electrically connected to the power supply by the LED light strip;
wherein the LED light strip comprises a bendable circuit sheet or a flexible circuit board passing through at least a first of the two transition regions of the tube and disposed with a soldering pad at an end of the bendable circuit sheet or flexible circuit board, and the power supply comprises a printed circuit board disposed with a soldering pad corresponding to the soldering pad of the bendable circuit sheet or flexible circuit board, and the soldering pad of the bendable circuit sheet or flexible circuit board is electrically connected to the soldering pad of the printed circuit board of the power supply to provide electrical connection between the power supply and the LED light sources.

2. The LED tube lamp according to claim 1, wherein the soldering pad of the bendable circuit sheet or flexible circuit board and the soldering pad of the printed circuit board of the power supply face substantially the same direction.

3. The LED tube lamp according to claim 1, wherein the soldering pad of the bendable circuit sheet or flexible circuit board and the soldering pad of the printed circuit board of the power supply face opposite directions.

4. The LED tube lamp according to claim 1, wherein the bendable circuit sheet or flexible circuit board and the printed circuit board are stacked on each other.

5. A light-emitting diode (LED) tube lamp, comprising:
a tube;
two end caps, each having at least one pin, and each coupled to a respective end of the tube;
an LED light strip disposed inside the tube and mounted with a plurality of LED light sources; and
a power supply electrically connected to the LED light strip without the use of bonding wires;
wherein the LED light strip comprises at least a first soldering pad at a first end of the LED light strip, and the power supply comprises at least a second soldering pad corresponding to the first soldering pad of the LED light strip.

6. The LED tube lamp according to claim 5, wherein the LED light strip comprises a bendable circuit sheet or a flexible circuit board.

7. The LED tube lamp according to claim 6, wherein the bendable circuit sheet or flexible circuit board further comprises an ink layer.

8. The LED tube lamp according to claim 6, wherein a solder connecting the first soldering pad of the bendable circuit sheet or flexible circuit board and the second soldering pad of the power supply forms a rivet-like structure.

9. The LED tube lamp according to claim 6, wherein a solder between the first soldering pad of the bendable circuit sheet or flexible circuit board and the second soldering pad of the power supply forms a C-shaped structure.

10. The LED tube lamp according to claim 6, wherein the first soldering pad of the bendable circuit sheet or flexible circuit board is on the edge of the bendable circuit sheet.

11. The LED tube lamp according to claim 6, wherein at least two soldering pads are disposed on each of two ends of the LED light strip.

12. The LED tube lamp according to claim 6, wherein more than one soldering pad is included on the bendable circuit sheet or flexible circuit board.

13. The LED tube lamp according to claim 12, wherein two soldering pads are disposed on the bendable circuit sheet or flexible circuit board, and an electrically insulating hole is formed and disposed between the two soldering pads of the bendable circuit sheet or flexible circuit board to prevent a short circuit between the two soldering pads when soldering.

14. The LED tube lamp according to claim 13, wherein an alignment hole is configured and disposed behind the electrically insulating hole to allow a soldering machine to automatically locate the soldering pads of the bendable circuit sheet or flexible circuit board.

15. The LED tube lamp according to claim 12, wherein at least one of the soldering pads is formed with a through-hole.

16. The LED tube lamp according to claim 15, wherein the at least one soldering pad of the bendable circuit sheet or flexible circuit board is formed with a solder ball above the through-hole after soldering is completed, and a diameter of the solder ball is larger than the diameter of the through-hole.

17. The LED tube lamp according to claim 12, wherein at least one of the soldering pads of the LED light strip is formed with a notch at an edge of the bendable circuit sheet or flexible circuit board.

18. The LED tube lamp according to claim 17, wherein the at least one soldering pad of the bendable circuit sheet or flexible circuit board is formed with a solder ball above the notch after soldering is completed, and a diameter of the solder ball is larger than a diameter of the notch.

19. The LED tube lamp according to claim 6, wherein at least three soldering pads are disposed on the bendable circuit sheet or flexible circuit board and arranged in one row or two rows.

20. The LED tube lamp according to claim 5, wherein the first soldering pad of the LED light strip and the second soldering pad of the power supply are bonded directly by soldering.

21. The LED tube lamp according to claim 5, wherein the first soldering pad of the LED light strip and the second soldering pad of the power supply face substantially the same direction.

22. The LED tube lamp according to claim 5, wherein the first soldering pad of the LED light strip and the second soldering pad of the power supply face opposite directions.

23. The LED tube lamp according to claim 5, wherein the LED light strip and the power supply are stacked with respect to each other.

24. The LED tube lamp according to claim 5, wherein a filament-simulating circuit is included in one of the end caps.

25. The LED tube lamp according to claim 24, wherein the filament-simulating circuit comprises a capacitor and a resistor connected in parallel.

26. The LED tube lamp according to claim 5, wherein the LED light strip is formed of a bendable circuit sheet that can be curled.

27. The LED tube lamp according to claim 5, wherein the power supply is disposed in one of the end caps or is disposed in a separated manner in the two end caps.

28. The LED tube lamp according to claim 5, wherein the power supply is located on the light strip.

29. A light-emitting diode (LED) tube lamp, comprising:
a tube having at least one transition region;
two end caps, each having at least one pin, and each coupled to a respective end of the tube;
a power supply having one or two printed circuit board(s) disposed in one or both of the end cap(s); and
an LED light strip disposed inside the tube and comprising a plurality of LED light sources mounted thereon, the LED light sources being electrically connected to the power supply by the LED light strip;
wherein the LED light strip comprises a bendable circuit sheet or a flexible circuit board with a longitudinally projected length longer than a length of the tube to form a freely extending end portion at one end of the bendable circuit sheet or flexible circuit board passing across the transition region of the tube, the end of the bendable circuit sheet or flexible circuit board comprises at least one first soldering pad, the at least one first soldering pad is formed with either a through-hole or a notch, and the printed circuit board of the power supply is disposed with a second soldering pad corresponding to the first soldering pad of the bendable circuit sheet or flexible circuit board.

30. The LED tube lamp according to claim 29, wherein a solder between the first soldering pad of the bendable circuit sheet or flexible circuit board and the second soldering pad of the printed circuit board of the power supply forms a rivet-like structure.

31. The LED tube lamp according to claim 29, wherein a solder between the first soldering pad of the bendable circuit sheet or flexible circuit board and the second soldering pad of the power supply forms a C-shaped structure.

32. The LED tube lamp according to claim 29, wherein the first soldering pad of the bendable circuit sheet or flexible circuit board is on the edge of the bendable circuit sheet.

33. The LED tube lamp according to claim 29, wherein the bendable circuit sheet or flexible circuit board and the printed circuit board are stacked on each other.

* * * * *